(12) United States Patent
Sawai

(10) Patent No.: US 8,755,325 B2
(45) Date of Patent: Jun. 17, 2014

(54) COMMUNICATION SYSTEM, RELAY DEVICE, MANAGEMENT SERVER, AND COMMUNICATION TERMINAL

(75) Inventor: Ryo Sawai, Tokyo (JP)

(73) Assignee: Sony Corporation, Tokyo (JP)

( * ) Notice: Subject to any disclaimer, the term of this patent is extended or adjusted under 35 U.S.C. 154(b) by 93 days.

(21) Appl. No.: 13/496,560

(22) PCT Filed: Aug. 3, 2010

(86) PCT No.: PCT/JP2010/063069
§ 371 (c)(1),
(2), (4) Date: Apr. 24, 2012

(87) PCT Pub. No.: WO2011/036947
PCT Pub. Date: Mar. 31, 2011

(65) Prior Publication Data
US 2012/0201190 A1 Aug. 9, 2012

(30) Foreign Application Priority Data

Sep. 25, 2009 (JP) .................................. 2009-220480
Feb. 25, 2010 (JP) .................................. 2010-040225

(51) Int. Cl.
*H04W 4/00* (2009.01)
*H04B 7/14* (2006.01)
*H04W 36/00* (2009.01)

(52) U.S. Cl.
USPC ........................... 370/315; 370/331; 370/341

(58) Field of Classification Search
None
See application file for complete search history.

(56) References Cited

U.S. PATENT DOCUMENTS

| 2003/0125067 | A1* | 7/2003 | Takeda et al. ................. 455/522 |
| 2007/0147341 | A1* | 6/2007 | Izumikawa et al. ........... 370/351 |
| 2007/0183321 | A1* | 8/2007 | Takeda et al. ................. 370/229 |
| 2008/0045139 | A1* | 2/2008 | Chen et al. ................... 455/3.04 |
| 2009/0053994 | A1* | 2/2009 | Senarath et al. ............. 455/11.1 |
| 2010/0272009 | A1* | 10/2010 | Cheng et al. ................. 370/315 |

FOREIGN PATENT DOCUMENTS

| JP | 2002 209253 | 7/2002 |
| JP | 2002 247630 | 8/2002 |
| JP | 2004-207839 | 7/2004 |
| JP | 2006 246002 | 9/2006 |
| JP | 2006-246002 A | 9/2006 |

(Continued)

OTHER PUBLICATIONS

U.S. Appl. No. 13/496,499, filed Mar. 16, 2012, Sawai.

(Continued)

*Primary Examiner* — Chi Pham
*Assistant Examiner* — Soon-Dong D Hyun
(74) *Attorney, Agent, or Firm* — Oblon, Spivak, McClelland, Maier & Neustadt, L.L.P.

(57) ABSTRACT

Provided is a communication system including a relay device that relays communication between a base station and a communication terminal, and a management server, the management server including a receiving unit that receives from each base station information about a communication terminal belonging to the base station and about the relay device, and a determination unit that determines, on the basis of the information received from each base station by the receiving unit, a relay device that is performing communication interfering with communication in an adjacent cell. When the relay device is determined as a relay device that is performing communication interfering with the communication in the adjacent cell, the relay device determines an interference avoidance control and executes the determined interference avoidance control.

9 Claims, 37 Drawing Sheets

(56) References Cited

FOREIGN PATENT DOCUMENTS

| JP | 2008 098848 | 4/2008 |
|---|---|---|
| JP | 2008211583 | 9/2008 |
| JP | 2008 283384 | 11/2008 |
| JP | 2009-100338 | 5/2009 |

OTHER PUBLICATIONS

3GPP TSG RAN WG1 meeting#55b, "Considerations on LTE Relay", China Potevio, CATT, R1-090015, Jan. 11-16, 2009.
3GPP TSG-RAN WG RAN1 #55bis, "Joint analog network coding and Relay", Alcatel Shangahi Bell, Alcatel-Lucent, R1-090065, Jan. 12-16, 2009.
3GPP TSG RAN WG1 meeting#57, "Understanding on Type 1 and Type 2 Relay", Huawei, R1-091803, May 3-8, 2009.
International Search Report issued on Aug. 31, 2010 in PCT/JP10/063069 filed on Aug. 3, 2010.
3GPP TSG RAN WG3 Meeting #64, "Additional consideration for Type 1 Relay", Huawei, R3-091335, May 4-8, 2009.
Japanese Office action issued Jan. 14, 2014 in Japanese Application No. 2010-040225 with English Translation.
Office Action issued Apr. 1, 2014 in Chinese Patent Application No. 201080041221.3 (with English-language translation, 18 pages.
3GPP TSG RAN WG1 Meeting #57bis; Los Angeles, USA, Jun. 29-Jul. 3, 2009; Title: L1 Delay Impact on ICIC in type 1 Relay; Source: Huawei; 6 pages.

\* cited by examiner

FIG. 33

| | IF WITH MICROCELL BASE STATION | ACCESS | PRESUMED ARRANGEMENT LOCATION |
|---|---|---|---|
| RRH CELL BASE STATION | OPTICAL FIBER | OPEN TO ALL COMMUNICATION TERMINALS | OUTDOORS |
| HOT ZONE BASE STATION | X2 | OPEN TO ALL COMMUNICATION TERMINALS | OUTDOORS |
| FEMTOCELL BASE STATION | X2 TUNNELING PROTOCOL ON PBN | CLOSED GROUP | INDOORS |
| RELAY DEVICE (RELAY BASE STATION) | WIRELESS (SO-CALLED RELAY LINK) | OPEN TO ALL COMMUNICATION TERMINALS | OUTDOORS |

COMMUNICATION SYSTEM, RELAY DEVICE, MANAGEMENT SERVER, AND COMMUNICATION TERMINAL

TECHNICAL FIELD

The present invention relates to a communication system, a relay device, a management server, and a communication terminal.

BACKGROUND ART

In IEEE (Institute of Electrical and Electronics Engineers) 802.16j, a relay technology is standardized. In addition, in 3GPP (Third Generation Partnership Project) LTE-A (Long Term Evolution Advanced), a technology of using a relay device (RN: Relay node) is also actively studied in order to realize an improvement in the throughput of a communication terminal (UE: User Equipment) located at a cell edge.

Such a relay device, upon receiving a signal transmitted from a base station in a downlink, amplifies the signal and transmits the amplified signal to a communication terminal. By performing such relay, the relay device can increase the signal-to-noise ratio compared to when a signal is transmitted directly from the base station to the communication terminal. Likewise, in an uplink, the relay device can also maintain the high signal-to-noise ratio by relaying a signal transmitted from the communication terminal to the base station. Such a relay device is described in, for example, Non-Patent Literature 1 to 3.

CITATION LIST

Non-Patent Literature

Non-Patent Literature 1: R1-090015, "Consideration on Relay.ppt", China Potevio, CATT, January 2009

Non-Patent Literature 2: R1-090065, "Joint analog network coding and Relay", Alcatel-Lucent, January 2009

Non-Patent Literature 3: R1-091803, "Understanding on Type 1 and Type 2 Relay", Huawei, May 2009

SUMMARY OF INVENTION

Technical Problem

Herein, it is assumed that most parts of the communication between the relay device and the communication terminal are subjected to centralized control by the base station or a management server that is connected to a plurality of base stations. However, when a load on the base station or the management server is considered, it is desired that the communication between the relay device and the communication terminal be subjected to decentralized control.

The present invention has been made in view of the foregoing problems, and it is an object of the present invention to provide a communication system, a relay device, a management server, and a communication terminal that are novel and improved, and are capable of realizing autonomous interference avoidance control by a small-to-medium-sized base station such as a relay device.

Solution to Problem

In order to solve the aforementioned problem, according to one aspect of the present invention, there is provided a communication system including a relay device that relays communication between a base station and a communication terminal, and a management server, the management server including a receiving unit that receives from each base station information about a communication terminal belonging to the base station and about the relay device, and a determination unit that determines, on the basis of the information received from each base station by the receiving unit, a relay device that is performing communication interfering with communication in an adjacent cell. When the relay device is determined as a relay device that is performing communication interfering with the communication in the adjacent cell, the relay device determines an interference avoidance control and executes the determined interference avoidance control.

The relay device may determine as the interference avoidance control a handover to a base station that forms the adjacent cell.

The relay device may determine as the interference avoidance control a handover of a communication terminal belonging to the relay device to a relay device belonging to the adjacent cell.

The relay device may set as a target to be handed over a communication terminal whose communication quality does not meet a predetermined criteria among communication terminals belonging to the relay device.

The relay device may execute the handover when the number of the communication terminals belonging to the relay device is greater than or equal to a predetermined number.

In order to solve the aforementioned problem, according to another aspect of the present invention, there is provided a relay device that receives from each base station information about a communication terminal belonging to the base station and about the relay device, and determines, when the relay device is determined as a relay device that is performing communication interfering with communication in an adjacent cell by a management server that determines a relay device that is performing communication interfering with the communication in the adjacent cell on the basis of the information received from each base station, an interference avoidance control, and executes the determined interference avoidance control.

In order to solve the aforementioned problem, according to still another aspect of the present invention, there is provided a management server including a receiving unit that receives from each base station information about a communication terminal belonging to the base station and about a relay device that relays communication between the base station and the communication terminal, and a determination unit that determines, on the basis of the information received from each base station by the receiving unit, a relay device that is performing communication interfering with communication in an adjacent cell. The relay device, which is determined by the determination unit as a relay device that is performing communication interfering with the communication in the adjacent cell, determines an interference avoidance control and executes the determined interference avoidance control.

In order to solve the aforementioned problem, according to further another aspect of the present invention, there is provided a communication terminal. The communication terminal communicates with a base station via a relay device that determines an interference avoidance control and executes the determined interference avoidance control when the relay device is determined as a relay device that is performing communication interfering with communication in an adjacent cell by a management server that receives from each base station information about a communication terminal belonging to the base station and about a relay device and determines a relay device that is performing communication interfering with the communication in the adjacent cell on the basis of the information received from each base station. In order to solve the aforementioned problem, according to yet another aspect of the present invention, there is provided a communication system including a small-to-medium-sized base station that communicates with a communication terminal, and a management server, the management server including a receiving unit that receives information about a communication terminal belonging to the small-to-medium-sized base station, and a determination unit that determines, on the basis of the information received by the receiving unit, a small-to-medium-sized base station that is performing communication interfering with another communication. When the small-to-medium-sized base station is determined by the determination unit as a small-to-medium-sized base station that is performing communication interfering with another communication, the relay device determines an interference avoidance control and executes the determined interference avoidance control.

Advantageous Effects of Invention

As described above, according to the present invention, it is possible to realize autonomous interference avoidance control by a small-to-medium-sized base station such as a relay device.

BRIEF DESCRIPTION OF DRAWINGS

FIG. 23 is an explanatory diagram showing a specific example of the decision of the transmission timing, insertion of a non-transmission section, and the like.

FIG. 24 is an explanatory diagram showing a specific example of the decision of the transmission timing, insertion of a non-transmission section, and the like.

FIG. 25 is an explanatory diagram showing a specific example of the decision of the transmission timing, insertion of a non-transmission section, and the like.

FIG. 33 is an explanatory diagram showing an overview of a small-to-medium-sized base station.

DESCRIPTION OF EMBODIMENTS

Hereinafter, preferred embodiments of the present invention will be described in detail with reference to the appended drawings. Note that, in this specification and the drawings, structural elements that have substantially the same function and structure are denoted by the same reference signs, and repeated explanation is omitted.

In addition, in this specification and the drawings, a plurality of structural elements that have substantially the same function and structure and are denoted by the same reference signs may be followed by different alphabets for distinction purposes. For example, a plurality of structures that have substantially the same function and structure are distinguished as communication terminals 20A, 20B, and 20C as needed. However, when there is no need to particularly distinguish between each of the plurality of structural elements that have substantially the same function and structure, only reference signs are assigned. For example, when there is no need to particularly distinguish between the communication terminals 20A, 20B, and 20C, they are simply referred to as communication terminals 20.

The "Description of Embodiments" will be described in accordance with the following item order.

1. Basic Configuration of the Communication System
(Exemplary Resource Allocation to Each Link)
(Exemplary Format of Radio Frame)
(Connection Process Sequence)
(MBSFN)
(Exemplary Frequency Allocation to Each Cell)
2. Specific Configuration of the Communication System
2-1. Configuration of the Communication Terminal
2-2. Configuration of the Relay Device
2-3. Configuration of the Base Station
3. Control Range A: Centralized Control by the Management Server
4. Control Ranges B and C: Autonomous Control by the Relay Device
5. Other Examples of Application of the Present Invention
6. Conclusion <1. Basic Configuration of the Communication System>

Figure 1:
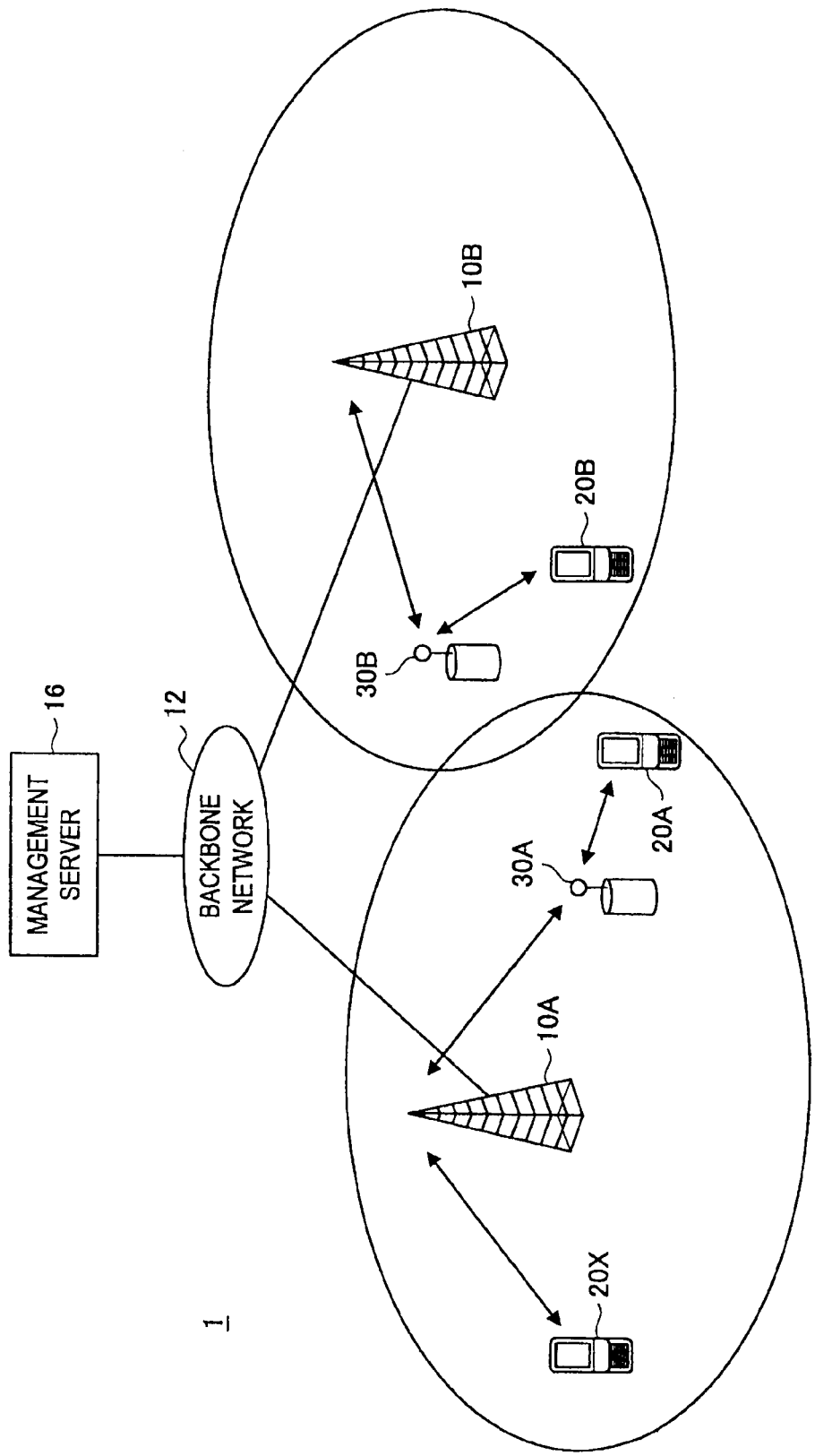
FIG. 1 is an explanatory diagram showing the configuration of a communication system in accordance with an embodiment of the present invention.

First, the basic configuration of a communication system 1 in accordance with an embodiment of the present invention will be described with reference to FIGS. 1 to 8. FIG. 1 is an explanatory diagram showing the configuration of the communication system 1 in accordance with an embodiment of the present invention. As shown in FIG. 1, the communication system 1 in accordance with an embodiment of the present invention includes base stations 10A and 10B, a backbone network 12, communication terminals 20A, 20B, and 20X, and relay devices 30A and 30B.

The base station 10 manages the communication between the relay device 30 and the communication terminal 20 existing in a cell that is formed by the base station 10. For example, the base station 10A manages scheduling information for communicating with the communication terminal 20X existing in the cell, and communicates with the communication terminal 20X in accordance with the scheduling information. In addition, the base station 10A also manages scheduling information for communicating with the relay device 30A existing in the cell and scheduling information for the relay device 30A and the communication terminal 20A to communicate with each other.

Note that the management of the scheduling information can be performed by the joint cooperation of the base station 10 and the relay device 30, by the joint cooperation of the base station 10, the relay device 30, and the communication terminal 20, or by the relay device 30.

The relay device 30 relays the communication between the base station 10 and the communication terminal 20 in accordance with the scheduling information managed by the base station 10. Specifically, the relay device 30, upon receiving a signal transmitted from the base station 10 in a downlink, transmits a signal obtained by amplifying the signal to the communication terminal 20 using the frequency/time in accordance with the scheduling information. By performing such relay, the relay device 30 can increase the signal-to-noise ratio compared to when a signal is transmitted directly from the base station 10 to the communication terminal 20 located near a cell edge.

Likewise, in an uplink, the relay device 30 can also maintain the high signal-to-noise ratio by relaying a signal transmitted from the communication terminal 20 to the base station 10 in accordance with the scheduling information managed by the base station 10. Although FIG. 1 shows an example in which only the relay device 30A exists in the cell formed by the base station 10A, a plurality of relay devices 30 can exist in the cell formed by the base station 10A.

As the types of such relay device 30, Type 1 and Type 2 have been proposed. The relay device 30 of Type 1 has an individual cell ID and is permitted to operate its own cell. Thus, the relay device 30 of Type 1 operates in such a way that it is recognized as the base station 10 by the communication terminal 20. However, the relay device 30 of Type 1 operates not entirely autonomously, and performs relay communication within the range of resources that are allocated by the base station 10.

Meanwhile, the relay device 30 of Type 2 does not have an individual cell ID unlike Type 1, and assists in the direct communication between the base station 10 and the communication terminal 20. For example, relay transmission technologies using Cooperative relay and Network coding have been studied. The characteristics of Type 1 and Type 2 that are currently studied are shown in Table 1 below.

TABLE 1

| Item | Type 1 | Type 2 |
|---|---|---|
| Decision | R1-091098 | R1-091632 |
| Type of Relay | L2 and L3 Relay | L2 |
| PHY Cell ID | Own cell ID | No cell ID |
| Transparency | Non transparent Relay node to UE | Transparent Relay node to UE |
| New cell | Create new cell (another eNB) | Not create new cell |
| RF parameters | Optimized parameters | N/A |
| HO | Inter cell HO (generic HO) | HO transparently to UE |
| Control Channel Generation | Generate synch. channel, RS, H-ARQ channel and scheduling information etc. | Not generate its own channel but decodes/forwards donor eNB's signal to UE |
| Backward compatibility | Support (appear as a Rel-8 eNB to Rel-8 UE) | Support (able to relay also to/from Rel-8 UE) |
| LTE-A (Forward compatibility) | Support (it appear differently than Rel-8 eNB to LTE-A UE) | — |
| Awareness to MS | — (>Rel-8 eNB to LTE-A UEs or Relay) | — |
| Cooperation | Inter cell cooperation | Intra cell cooperation |
| Backhaul utilization | Higher | Lower |
| Usage model | Coverage extension | Throughput enhancement and coverage extension |
| Cost | Higher | Lower |

As described above, the communication terminal 20 communicates with the base station 10 either directly or via the relay device 30 in accordance with the scheduling information managed by the base station 10. Note that examples of data that are transmitted/received by the communication terminal 20 include voice data; music data such as music, lectures, or radio programs; still image data such as photographs, documents, paintings, or charts; and moving image data such as movies, television programs, video programs, or game images. The communication terminal 20 can be an information processing device having a wireless communication function such as a portable phone or a PC (Personal computer).

The management server 16 is connected to each base station 10 via the backbone network 12. The management server 16 has a function of an MME (Mobile Management Entity). In addition, the management server 16 can also have a function of a serving gateway. The management server 16 receives from each base station 10 management information indicating the state of a cell formed by each base station 10, and controls communication in the cell formed by each base station 10 on the basis of the management information. Note that the function of the management server 16 can be implemented with a plurality of physically separated configurations.

(Exemplary Resource Allocation to Each Link)

Herein, resource allocation to each link will be described. Note that, hereinafter, the communication channel between the base station 10 and the relay device 30 will be referred to as a relay link, the communication channel between the relay device 30 and the communication terminal 20 will be referred to as an access link, and the direct communication channel between the base station 10 and the communication terminal 20 will be referred to as a direct link. In addition, the communication channel toward the base station 10 will be referred to as an UL (uplink), and the communication channel toward the communication terminal 20 will be referred to as a DL (downlink). Note also that communication through each link is performed on the basis of OFDMA.

The relay device 30, in order to prevent mutual interference between the relay link and the access link, separates the relay link and the access link from each other on the basis of the frequency or time. For example, the relay device 30 can separate the relay link and the access link in the same direction from each other on the basis of TDD (Time Division Duplexing) using a common frequency.

Figure 2:
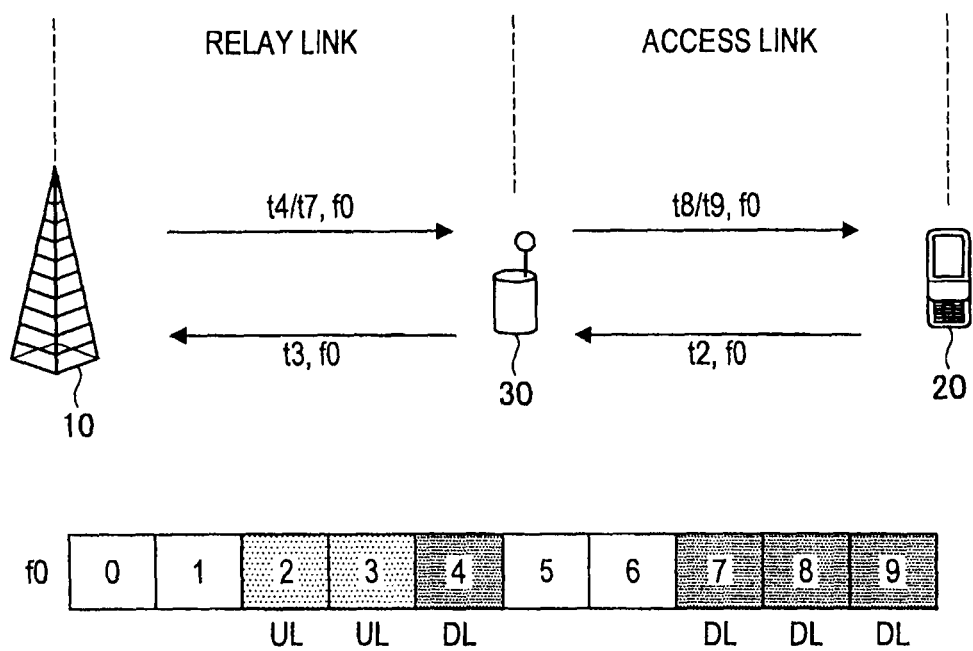
FIG. 2 is an explanatory diagram showing exemplary resource allocation when the same frequency is used in an UL and a DL.

FIG. 2 is an explanatory diagram showing exemplary resource allocation when the same frequency is used in the UL and the DL. As shown in FIG. 2, a radio frame includes a sub-frame 0 to a sub-frame 9. In the example shown in FIG. 2, the relay device 30, in accordance with an instruction from the base station 10, recognizes the sub-frames 8 and 9 as the resources for the DL of the access link, and relays a signal transmitted from the base station 10 to the communication terminal 20 using the sub-frames 8 and 9.

Note that a PSC (Primary Synchronization Channel) and a SSC (Secondary Synchronization Channel) that are synchronization signals for the downlink, and a PBCH (Physical Broadcast CHannel) are allocated to the sub-frames 0 and 5. In addition, paging channels are assigned to the sub-frames 1 and 6.

Figure 3:
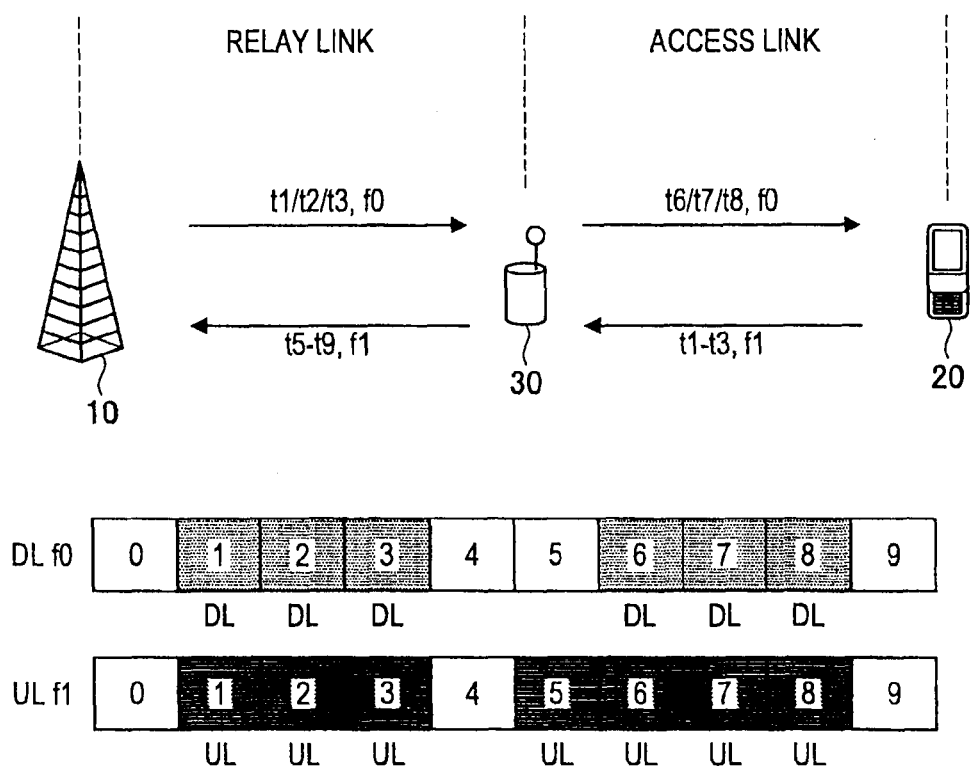
FIG. 3 is an explanatory diagram showing exemplary resource allocation when different frequencies are used in an UL and a DL.

FIG. 3 is an explanatory diagram showing exemplary resource allocation when different frequencies are used in the UL and the DL. As shown in FIG. 3, a frequency f0 is used for the DL and a frequency f1 is used for the UL. In the example shown in FIG. 3, the relay device 30, in accordance with an instruction from the base station 10, recognizes sub-frames 6 to 8 of the frequency f0 as the resources for the DL of the access link, and relays a signal transmitted from the base station 10 to the communication terminal 20 using the sub-frames 6 to 8 of the frequency f0.

Note that a PSC and an SSC that are synchronization signals for the downlink are assigned to the sub-frames 0 and 5 of the frequency f0 (for the DL), and paging channels are assigned to the sub-frame 4 and the sub-frame 9.

(Exemplary Format of Radio Frame)

Next, a specific exemplary frame format of each of a DL radio frame and an UL radio frame will be described with reference to FIG. 4 and FIG. 5.

Figure 4:
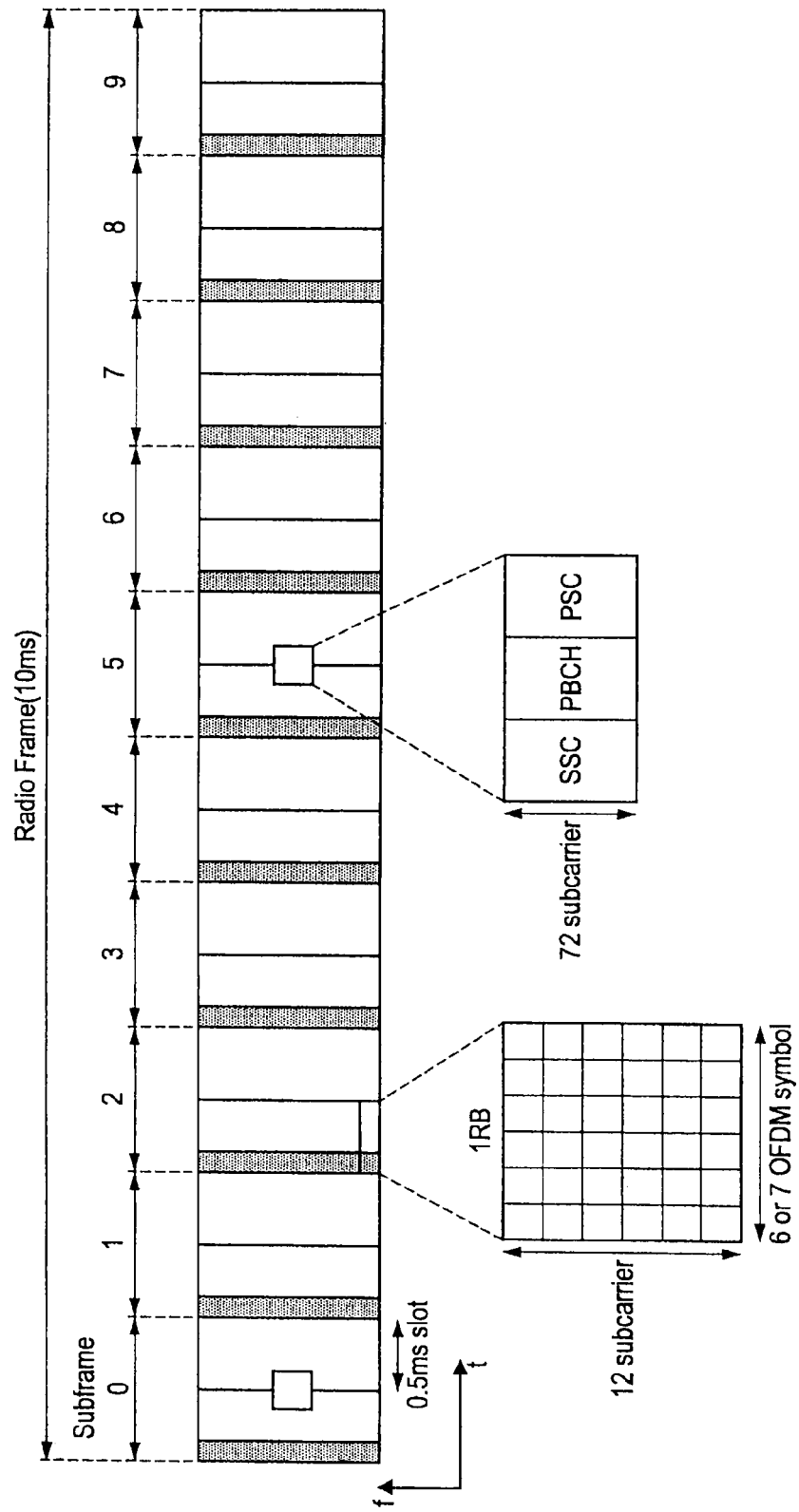
FIG. 4 is an explanatory diagram showing an exemplary format of a DL radio frame.

FIG. 4 is an explanatory diagram showing an exemplary format of a DL radio frame. The DL radio frame includes sub-frames 0 to 9, and each sub-frame includes two 0.5 ms slots. Each 0.5 ms slot includes seven OFDM (Orthogonal Frequency Division Multiplexing) symbols.

As shown in FIG. 4, in the head 1 to 3 OFDM symbols of each sub-frame, control channels such as PCFICH (Physical Control Format Indicator CHannel), PHICH (Physical Hybrid ARQ Indicator CHannel), and PDCCH (Physical Downlink Control CHannel) and arranged.

Note that each of the aforementioned channels includes the following information as an example.

PCFICH: the number of symbols of PDCCH related to Layer 1 and Layer 2

PHICH: ACK/NACK in response to PUSCH

PDCCH: downlink control information, scheduling information for PDSCH/PUSC (the format of a modulation method, encoding ratio, or the like)

In addition, one resource block (1 RB), which is the minimum unit of resource allocation, includes six or seven OFDM symbols and 12 sub-carriers as shown in FIG. 4. A demodulation reference (a reference signal) is arranged in part of the resource block.

Further, SSC, PBCH, and PSC are arranged in the sub-frames 0 and 5. Furthermore, a free portion in the radio frame shown in FIG. 4 is used as a PDSCH (Physical Downlink Shared CHannel).

Figure 5:
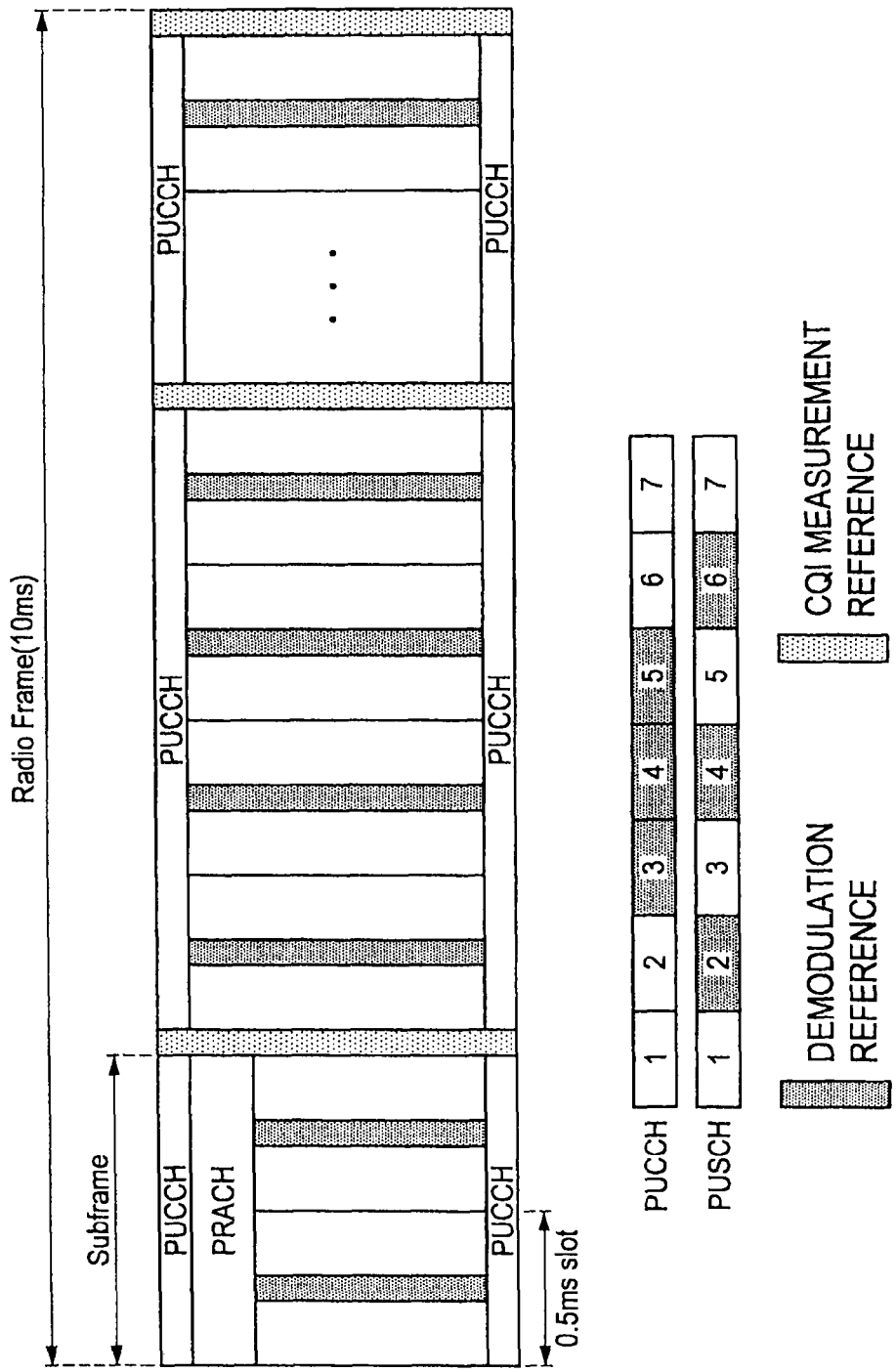
FIG. 5 is an explanatory diagram showing an exemplary format of an UL radio frame.

FIG. 5 is an explanatory diagram showing an exemplary format of the UL radio frame. Like the DL radio frame, the UL radio frame includes sub-frames 0 to 9, and each sub-frame includes two 0.5 ms slots. Each 0.5 ms slot includes seven OFDM symbols.

As shown in FIG. 5, a demodulation reference (a reference signal) is arranged in each of the 0.5 ms slots, and CQI measurement references are arranged in a dispersed manner. The base station 10 or the relay device 30 on the receiving side performs channel estimation using the demodulation reference, and demodulates a received signal in accordance with the channel estimation result. In addition, the base station 10 or the relay device 30 on the receiving side acquires CQI between the base station 10 or the relay device 30 and the relay device 30 or the communication terminal 20 on the transmitting side by measuring the CQI measurement reference.

Further, a free portion in the radio frame shown in FIG. 5 is used as a PUSCH (Physical Uplink Shared CHannel). Note that, when a CQI report is requested, the communication terminal 20 or the relay device 30 transmits the CQI report using the PUSCH.

(Connection Process Sequence)

Next, a process sequence for connecting the relay device 30 or the communication terminal 20 and the base station 10 will be described with reference to FIG. 6.

Figure 6:
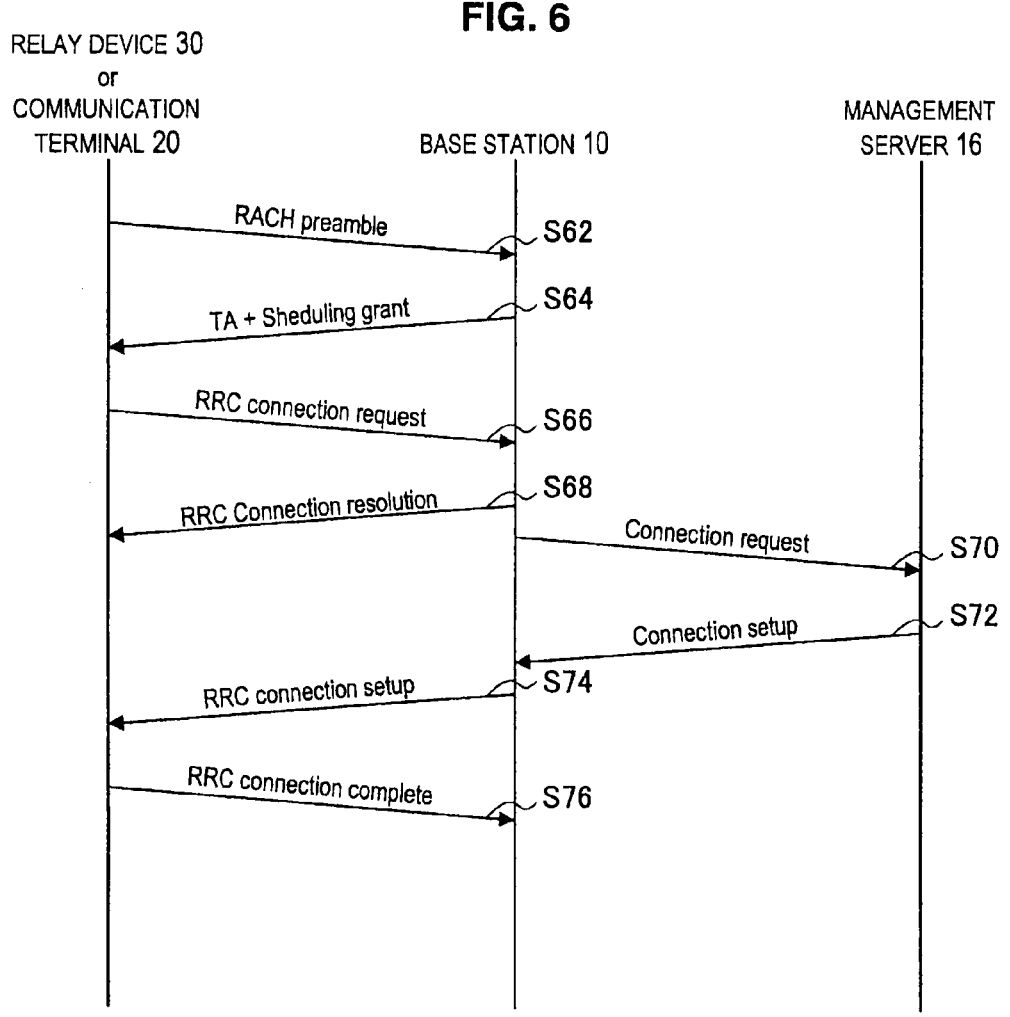
FIG. 6 is an explanatory diagram showing a connection process sequence.

FIG. 6 is an explanatory diagram showing a connection process sequence. First, as shown in FIG. 6, the relay device 30 or the communication terminal 20 transmits an RACH (Random Access CHannel) preamble to the base station 10 (S62). The base station 10, upon receiving the RACH preamble, acquires TA (Timing Advance) information, and transmits the TA information together with allocation resource information to the relay device 30 or the communication terminal 20 (S64). If the base station 10 is able to grasp the transmission timing of the RACH preamble, for example, the base station 10 can acquire as the TA information the difference between the transmission timing and the reception timing of the RACH preamble.

After that, the relay device 30 or the communication terminal 20 transmits an RRC connection request to the base station 10 using resources indicated by the allocation resource information (S66). The base station 10, upon receiving the RRC connection request, transmits an RRC connection resolution indicating the source of transmission of the RRC connection request (S68). Accordingly, the relay device 30 or the communication terminal 20 is able to check if the base station 10 has received the RRC connection request or not.

Next, the base station 10 transmits to the management server 16, which has a function of an MME, a connection request indicating that the relay device 30 or the communication terminal 20 is requesting a service (S70). The management server 16, upon receiving the connection request, transmits information for performing setup on the relay device 30 or the communication terminal 20 through connection setup (S72).

Then, the base station 10 transmits RRC connection setup to the relay device 30 or the communication terminal 20 on the basis of the connection setup from the management server 16 (S74), whereupon the relay device 30 or the communication terminal 20 performs a connection setup. After that, the relay device 30 or the communication terminal 20 transmits to the base station 10 RRC connection complete indicating that the connection setup is complete (S76).

Accordingly, the connection between the relay device 30 or the communication terminal 20 and the base station 10 is completed, whereby they become able to communicate with each other. Note that the aforementioned connection process sequence is only exemplary, and the relay device 30 or the communication terminal 20 and the base station 10 can be connected through another sequence.

(MBSFN)

Next, MBSFN (Multi-media Broadcasting Single Frequency Network) transmission performed by the base station 10, and an exemplary operation of the relay device 30 performed in response to the MBSFN transmission will be described.

MBSFN is a mode in which a plurality of base stations 10 concurrently performs data broadcast transmission using the same frequency. Thus, according to MBSFN, the relay device 30 of Type 1, which virtually operates as a base station, transmits a control channel and the like for the DL using the same frequency as that of the base station 10. Hereinafter, a specific flow of the MBSFN transmission/reception process will be described with reference to FIG. 7.

Figure 7:
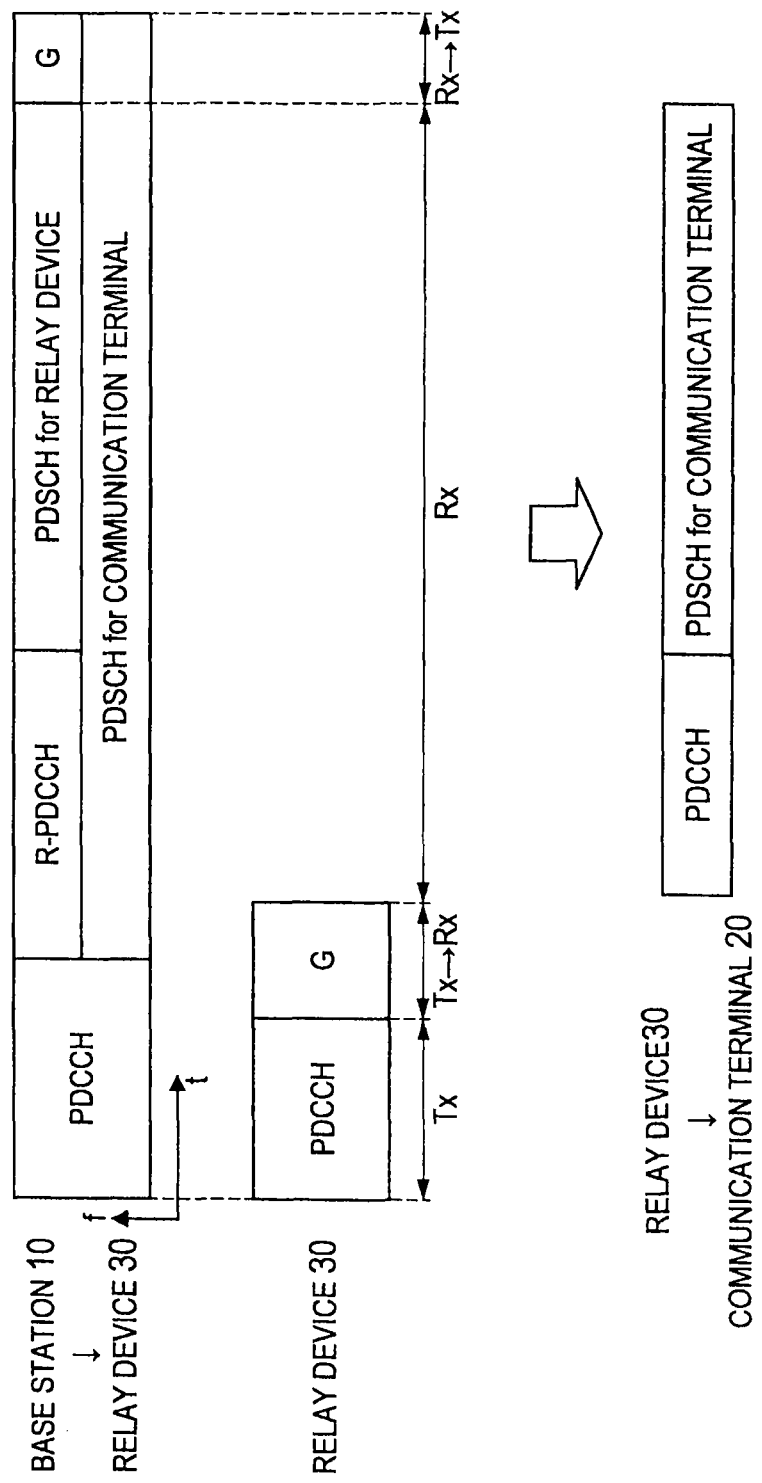
FIG. 7 is an explanatory diagram showing a specific example of a MBSFN transmission/reception process.

FIG. 7 is an explanatory diagram showing a specific example of the MBSFN transmission/reception process. First, as shown in FIG. 7, the base station 10 and the relay device 30 concurrently transmit PDCCH. Herein, following the PDCCH, the base station 10 transmits R-PDCCH for controlling the relay in addition to the PDSCH for the communication terminal 20. After the R-PDCCH, PDSCH (data to be relayed) for the relay device 30 is transmitted. Note that a non-transmission section is provided after the PDSCH for the relay device 30.

The relay device 30, after transmitting the PDCCH, undergoes a section of switching to a reception process, and receives the PDSCH (data to be relayed) from the base station 10. Then, the relay device 30 switches the reception process to a transmission process in the non-transmission section provided after the PDSCH (data to be relayed) from the base station 10. Further, the relay device 30 adds PDCCH to the decoded PDSCH (data to be relayed) in the next step, and relay-transmits it to the communication terminal 20.

Accordingly, existing communication terminals, which are not based on the presence of the relay device 30, can relish the relay by the relay device 30 without confusion.

(Exemplary Frequency Allocation to Each Cell)

Next, exemplary frequency allocation to each cell when a plurality of cells is adjacent to one another will be described.

Figure 8:
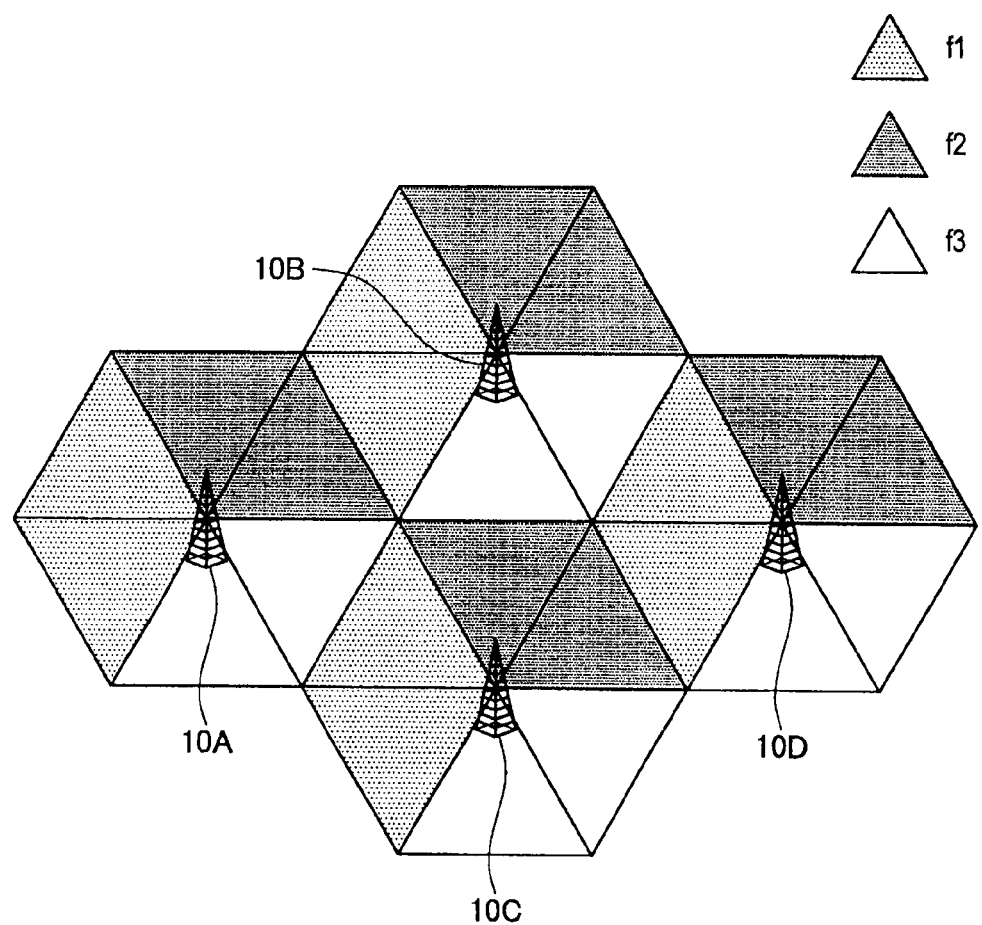
FIG. 8 is an explanatory diagram showing exemplary frequency allocation to each cell.

FIG. 8 is an explanatory diagram showing exemplary frequency allocation to each cell. When each cell includes three sectors, allocating frequencies f1 to f3 to the respective sectors as shown in FIG. 8 allows interference of the frequencies at the cell boundary to be suppressed. Such allocation is particularly effective in a densely populated area with high traffic.

Note that in LTE-A, in order to realize high end-to-end throughput, a variety of new technologies have been studied such as spectrum aggregation, network MIMO, uplink multiuser MIMO, and relay technologies. Therefore, with the advent of a new mobile application with high throughput, there is a possibility that frequency resources may become depleted even in suburban areas. Further, in the introduction of LTE-A, there is a possibility that introduction of the relay device 30 may become activated in order to realize low-cost infrastructure development.

<2. Specific Configuration of the Communication System>

The basic configuration of the communication system 1 in accordance with the present embodiment has been described above with reference to FIG. 1 to FIG. 8. Next, the specific configuration of the communication system 1 in accordance with the present embodiment will be described with reference to FIGS. 9 to 11.

(2-1. Configuration of the Communication Terminal)

Figure 9:
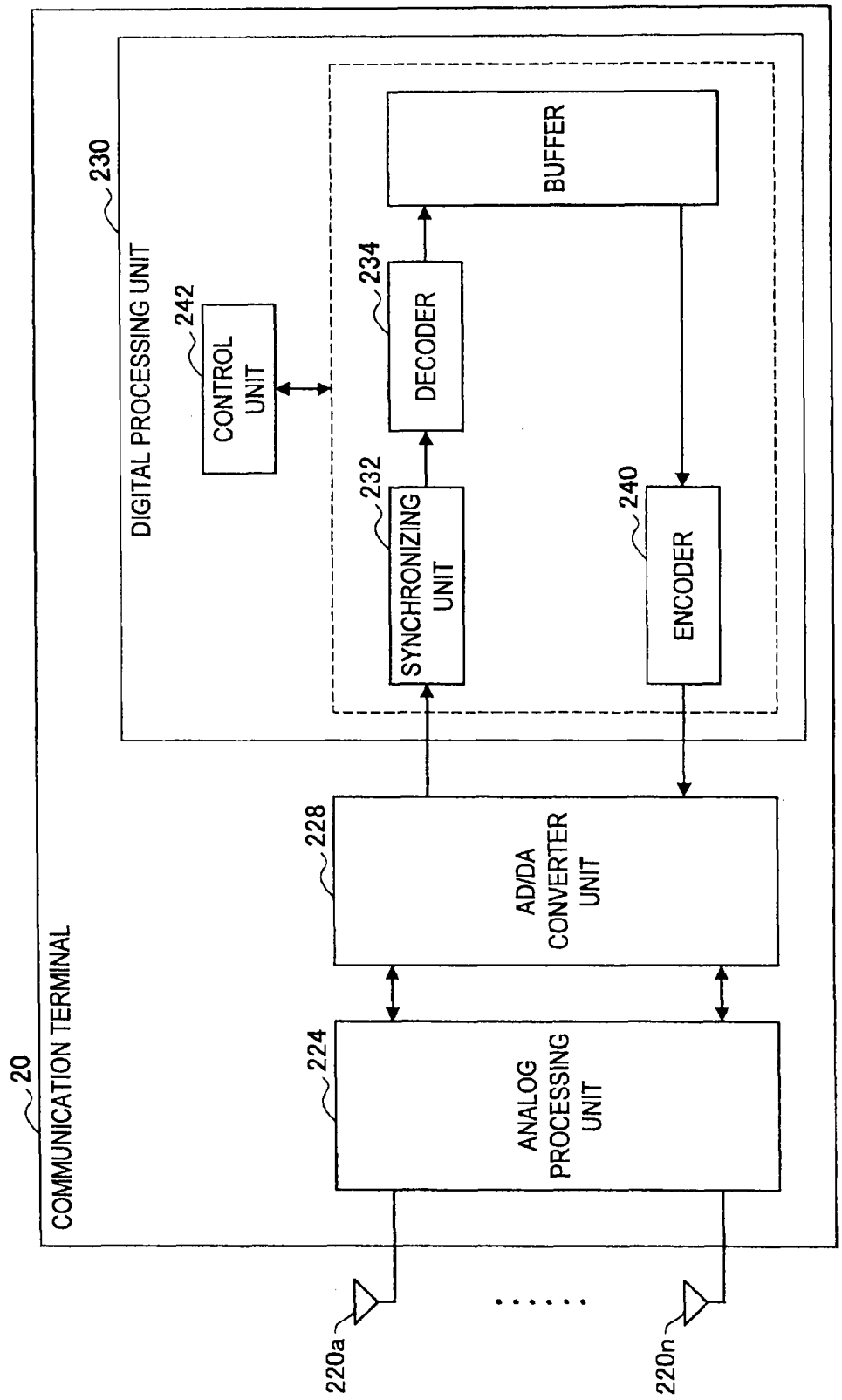
FIG. 9 is a functional diagram showing the configuration of a communication terminal.

FIG. 9 is a functional diagram showing the configuration of the communication terminal 20. As shown in FIG. 9, the communication terminal 20 includes a plurality of antennae 220a to 220n, an analog processing unit 224, an AD/DA converter unit 228, and a digital processing unit 230.

Each of the plurality of antennae 220a to 220n receives a radio signal from the base station 10 or the relay device 30 and acquires a high-frequency electrical signal, and then supplies the high-frequency signal to the analog processing unit 224. In addition, each of the plurality of antennae 220a to 220n transmits a radio signal to the base station 10 or the relay device 30 on the basis of a high-frequency signal supplied from the analog processing unit 224. As the communication terminal 20 has a plurality of antennae 220a to 220n as described above, it can perform MIMO (Multiple Input Multiple Output) communication or diversity communication.

The analog processing unit 224 converts a high-frequency signal transmitted from the plurality of antennae 220a to 220n into a baseband signal by performing analog processing such as amplification, filtering, or down conversion. In addition, the analog processing unit 224 converts a baseband signal supplied from the AD/DA converter unit 228 into a high-frequency signal.

The AD/DA converter unit 228 converts the baseband signal in an analog format supplied from the analog processing unit 224 into a digital format, and supplies it to the digital processing unit 230. In addition, the AD/DA converter unit 228 converts the baseband signal in a digital format supplied from the digital processing unit 230 into an analog format, and supplies it to the analog processing unit 224.

The digital processing unit 230 includes a synchronizing unit 232, a decoder 234, an encoder 240, and a control unit 242. Among them, the synchronizing unit 232, the decoder 234, the encoder 240, and the like function as a communication unit for communicating with the base station 10 or the relay device 30, together with the plurality of antennae 220a to 220n, the analog processing unit 224, and the AD/DA converter unit 228.

The synchronizing unit 232 is supplied with a synchronization signal such as a PSC or a SSC, which has been transmitted from the base station 10 or the relay device 30, from the AD/DA converter unit 228, and performs a synchronization process on a radio frame on the basis of the synchronization signal. Specifically, the synchronizing unit 232 computes the correlation between the synchronization signal and a known sequence pattern, and detects the peak position of the correlation, thereby synchronizing a radio frame.

The decoder 234 decodes the baseband signal supplied from the AD/DA converter unit 228 to obtain the received data. Note that the decoding can include, for example, a MIMO reception process and an OFDM demodulation process.

The encoder 240 encodes the data to be transmitted such as PUSCH, and supplies it to the AD/DA converter unit 228. Note that the encoding can include, for example, a MIMO transmission process and an OFDM modulation process.

The control unit 242 controls the entire operation in the communication terminal 20 such as a transmission process, a reception process, and a process of connecting to the relay device 30 or the base station 10. For example, the communication terminal 20, under the control of the control unit 242, performs a transmission process and a reception process using resource blocks allocated by the base station 10. Note that the control unit 242 controls a transmission process in accordance with a transmission parameter specified by the base station 10 or the relay device 30. For example, when the base station 10 has specified a TPC (Transmit Power Control) parameter for the communication terminal 20 using PDCCH, the control unit 242 controls a transmission process in accordance with the TPC parameter specified by the base station 10.

Meanwhile, when the base station 10 or the relay device 30 has requested a CQI report to the communication terminal 20 using PDCCH, the digital processing unit 230 measures the channel quality (e.g., received power) using a demodulation reference transmitted from the base station 10 or the relay device 30. The control unit 242 generates a CQI report on the basis of the aforementioned measurement result, and supplies the generated CQI report to the encoder 240. Consequently, the CQI report is transmitted to the base station 10 or the relay device 30 using PUSCH.

(2-2. Configuration of the Relay Device)

Next, the configuration of the relay device 30 will be described with reference to FIG. 10.

Figure 10:
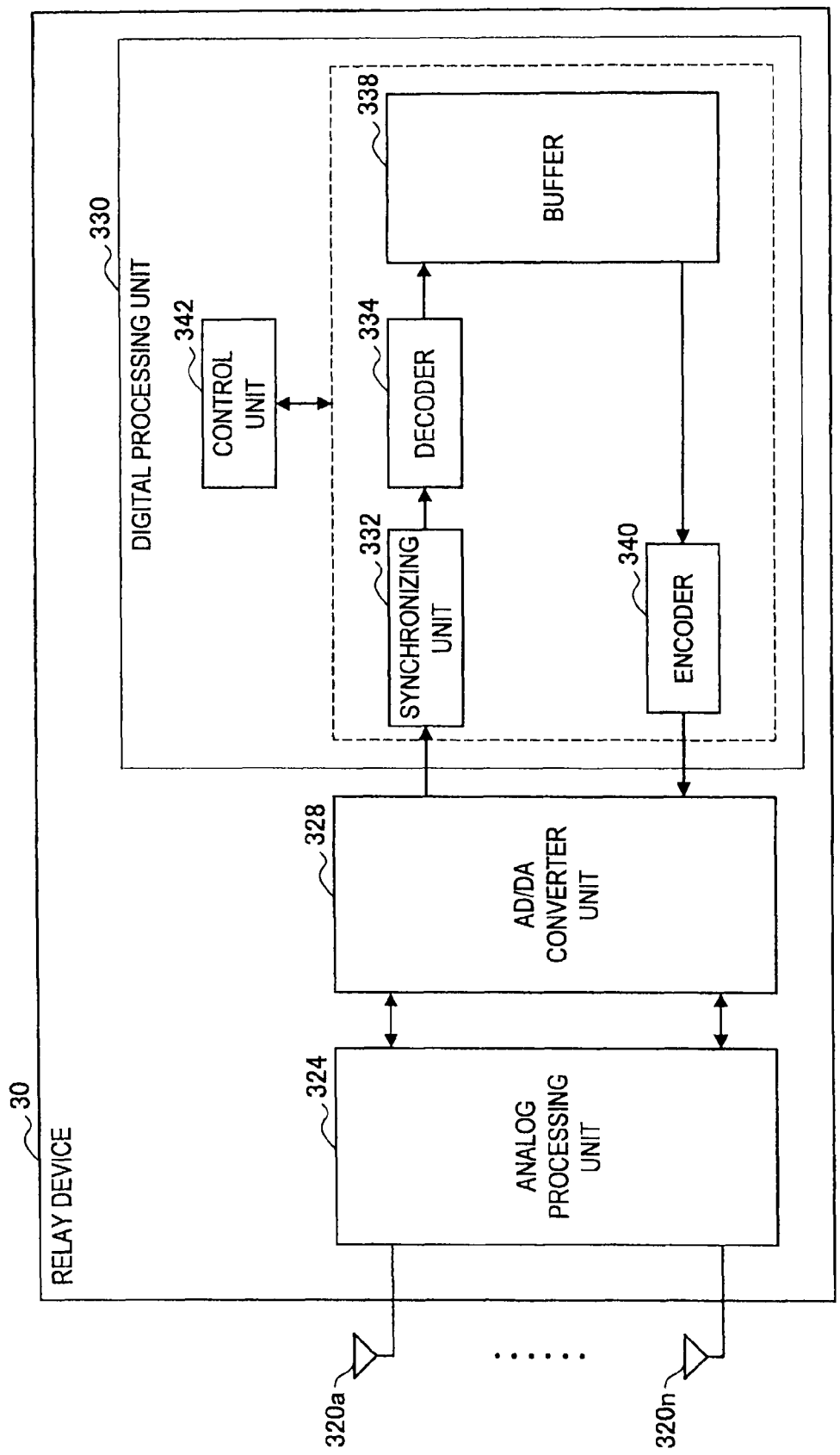
FIG. 10 is a functional diagram showing the configuration of a relay device.

FIG. 10 is a functional block diagram showing the configuration of the relay device 30. As shown in FIG. 10, the relay device 30 includes a plurality of antennae 320a to 320n, an analog processing unit 324, an AD/DA converter unit 328, and a digital processing unit 330.

Each of the plurality of antennae 320a to 320n receives a radio signal from the base station 10 or the communication terminal 20 and acquires a high-frequency electrical signal, and then supplies the high-frequency signal to the analog processing unit 324. In addition, each of the plurality of antennae 320a to 320n transmits a radio signal to the base station 10 or the communication terminal 20 on the basis of a high-frequency signal supplied from the analog processing unit 324. As the relay device 30 has a plurality of antennae 320a to 320n as described above, it can perform MIMO communication or diversity communication.

The analog processing unit 324 converts a high-frequency signal supplied from the plurality of antennae 320a to 320n into a baseband signal by performing analog processing such as amplification, filtering, or down conversion. In addition, the analog processing unit 324 converts a baseband signal supplied from the AD/DA converter unit 328 into a high-frequency signal.

The AD/DA converter unit 328 converts the baseband signal in an analog format supplied from the analog processing unit 324 into a digital format, and supplies it to the digital processing unit 330. In addition, the AD/DA converter unit 328 converts the baseband signal in a digital format supplied from the digital processing unit 330 into an analog format, and supplies it to the analog processing unit 324.

The digital processing unit 330 includes a synchronizing unit 332, a decoder 334, a buffer 338, an encoder 340, and a control unit 342. Among them, the synchronizing unit 332, the decoder 334, the encoder 340, and the like function as a receiving unit, a transmitting unit, and a relay unit for communicating with the base station 10 or the communication terminal 20, together with the plurality of antennae 320a to 320n, the analog processing unit 324, and the AD/DA converter unit 328.

The synchronizing unit 332 is supplied with a synchronization signal, which has been transmitted from the base station 10, from the AD/DA converter unit 328, and performs a synchronization process on a radio frame on the basis of the synchronization signal. Specifically, the synchronizing unit 332 computes the correlation between the synchronization signal and a known sequence pattern, and detects the peak position of the correlation, thereby synchronizing a radio frame.

The decoder 334 decodes the baseband signal supplied from the AD/DA converter unit 328, and obtains relay data addressed to the base station 10 or to the communication terminal 20. Note that the decoding can include, for example, a MIMO reception process, an OFDM demodulation process, and an error correction process.

The buffer 338 temporally stores the relay data addressed to the base station 10 or to the communication terminal 20 obtained by the decoder 334. Then, under the control of the control unit 342, the relay data addressed to the communication terminal 20 is read from the buffer 338 into the encoder 340 using resource blocks for the DL of the access link. Likewise, under the control of the control unit 342, the relay data addressed to the base station 10 is read from the buffer 338 into the encoder 340 using resource block for the UL of the relay link.

The encoder 340 encodes the relay data supplied from the buffer 338, and supplies it to the AD/DA converter unit 328. Note that the encoding can include, for example, a MIMO transmission process and OFDM modulation process.

The control unit 342 controls the entire operation in the relay device 30 such as a transmission process, a reception process, and a process of connecting to the base station 10 or the communication terminal 20. For example, the relay device 30, under the control of the control unit 342, performs a transmission process and a reception process using resource blocks allocated by the base station 10.

The range that can be controlled by the control unit 342 is selected by the base station 10. Specifically, one of the control ranges A to C is selected by the base station 10, and the control unit 342 controls the communication in accordance with the control range selected by the base station 10. The criteria for selecting the control range with the base station 10 and the details of the control ranges A to C are described below. Although this specification mainly describes an example in which the control range of the control unit 342 is selected by the base station 10, the control range of the control unit 342 can also be selected by the management server 16.

(2-3. Configuration of the Base Station)

Figure 11:
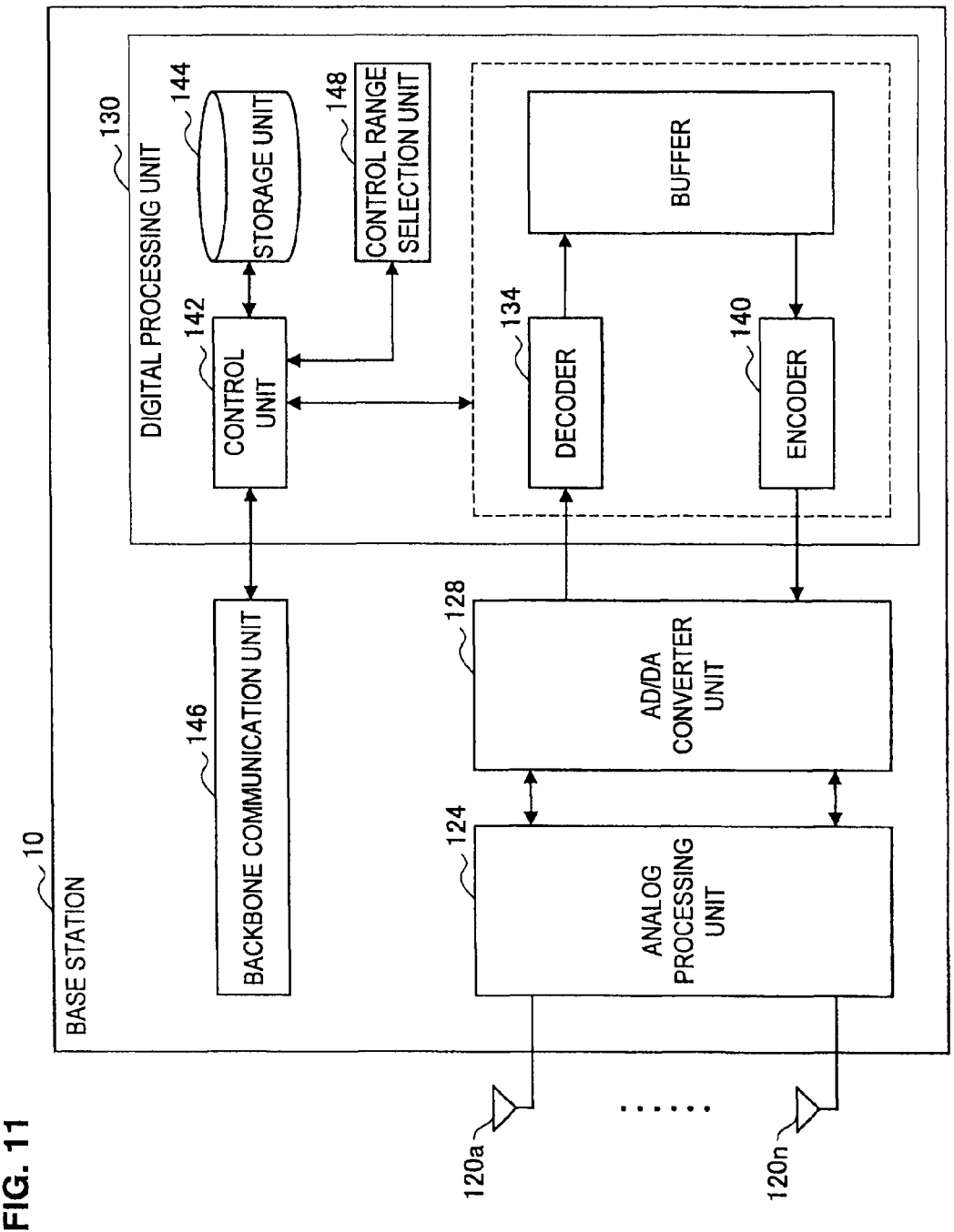
FIG. 11 is a functional block diagram showing the configuration of a base station.

FIG. 11 is a functional block diagram showing the configuration of the base station 10. As shown in FIG. 11, the base station 10 includes a plurality of antennae 120a to 120n, an analog processing unit 124, an AD/DA converter unit 128, a digital processing unit 130, and a backbone communication unit 146.

Each of the plurality of antennae 120a to 120n receives a radio signal from the relay device 30 or the communication terminal 20 and acquires a high-frequency electrical signal, and then supplies the high-frequency signal to the analog processing unit 124. In addition, each of the plurality of antennae 120a to 120n transmits a radio signal to the relay device 30 or the communication terminal 20 on the basis of a high-frequency signal supplied from the analog processing unit 124. As the base station 10 has a plurality of antennae 120a to 120n as described above, it can perform MIMO communication or diversity communication.

The analog processing unit 124 converts a high-frequency signal supplied from the plurality of antennae 120a to 120n into a baseband signal by performing analog processing such as amplification, filtering, or down conversion. In addition, the analog processing unit 124 converts a baseband signal supplied from the AD/DA converter unit 128 into a high-frequency signal.

The AD/DA converter unit 128 converts the baseband signal in an analog format supplied from the analog processing unit 124 into a digital format, and supplies it to the digital processing unit 130. In addition, the AD/DA converter unit 128 converts the baseband signal in a digital format supplied from the digital processing unit 130 into an analog format, and supplies it to the analog processing unit 124.

The digital processing unit 130 includes a decoder 134, an encoder 140, a control unit 142, a storage unit 144, and a control range selection unit 148. Among them, the decoder 134, the encoder 140, and the like function as a communication unit for communicating with the relay device 30 or the communication terminal 20, together with the plurality of antennae 120a to 120n, the analog processing unit 124, and the AD/DA converter unit 128.

The decoder 134 decodes the baseband signal supplied from the AD/DA converter unit 128 to obtain the received data. Note that the decoding can include, for example, a MIMO reception process, an OFDM demodulation process, and an error correction process.

The encoder 140, for example, encodes PDSCH and supplies it to the AD/DA converter unit 128. Note that the encoding can include, for example, a MIMO transmission process and an OFDM modulation process.

The control unit 142 controls the entire communication in a cell formed by the base station 10, such as a transmission process, a reception process, a process of connecting to the relay device 30 or the communication terminal 20, and management of the scheduling information. For example, the control unit 142 schedules the relay link communication between the base station 10 and the relay device 30 and the access link communication between the relay device 30 and the communication terminal 20.

Further, the control unit 142 causes the storage unit 144 to hold management information indicating the state of the cell formed by the base station 10. Examples of the management information are shown below.

(1) Information about the location of each relay device 30 and each communication terminal 20 belonging to the base station 10

(2) ID, Qos class, and scheduling information of each relay device 30 and each communication terminal 20 belonging to the base station 10

(3) Communication quality information of each direct link, each relay link, and each access link (e.g., CQI information, TPC communication, or both)

(4) Permissible interference level of each communication terminal 20 belonging to the base station 10 (e.g., the difference between the necessary SNIR on the Qos basis expected for each communication link and the actually measured SINR)

Note that the information about the location of the relay device 30 can include positional information acquired with a GPS, TA information indicating the distance between the base station 10 and the relay device 30, or information indicating the direction of the relay device 30. The direction of the relay device 30 can be acquired with an algorithm that estimates the arrival direction of a signal transmitted from the relay device 30 or by receiving the directivity. Similarly, the information about the location of the communication terminal 20 can include positional information acquired with a GPS, TA information indicating the distance between the communication terminal 20 and the relay device 30, or information indicating the direction of the communication terminal 20.

The control range selection unit 148 selects a control range to be granted for the relay device 30 belonging to the base station 10, from among a plurality of control ranges. For example, the plurality of control ranges includes a control range A (a first control range) a control range B (a second control range), and a control range C (a third control range). Hereinafter, each control range will be briefly described first, and then the criteria for selecting the control range will be described.

The control range A includes control that doe not require "addition" of extra resources by the relay device 30 (e.g., link adaptation in the range that TPC or addition of resources is unnecessary), and does not include control that requires a change or setting of resources. Thus, when the control range A is selected, most parts of the operation of the relay device 30 are controlled by the base station 10.

The control range B includes link adaptation in the range that addition of resources is necessary, handover of the relay device 30, and handover of the communication terminal 20 belonging to the relay device 30. The control range C includes, in addition to the control range B, flexible resource scheduling for the communication terminal 20 within the range of the extra resources allocated by the base station 10. Herein, the resource scheduling indicates an operation that is necessary for creating a link for a terminal to be newly connected. For example, in the case of the control range B, there may be cases in which a handover request or a receiving operation would not be able to be fully implemented with the amount of resources allocated in the control range B. In such cases, it is possible to, for example, allocate further extra resources to a handover destination, or allocate further extra resources to the relay device 30 and then change the control range to C.

The control range selection unit 148 selects one of the aforementioned control ranges A to C in accordance with the amount of traffic in the cell formed by the base station 10. For example, the control range selection unit 148 can select the control range B when the amount of traffic falls within a predetermined range, select the control range A when the amount of traffic is above the predetermined range, and select the control range C when the amount of traffic is below the predetermined range.

Specifically, the control range selection unit 148 can select the control range A when there is congested traffic and thus there are no available resources, select the control range B when the available resources account for less than or equal to 30%, and select the control range C when the available resources account for more than 30%.

Note that the control unit 142, when the control range A is selected, allocates the minimum required resources to the relay device 30, but in order to respond to an UL connection request from the communication terminal 20, preferentially secures resources for the UL.

Meanwhile, the control unit 142, when the control range B is selected, allocates a relatively large amount of resources to the relay device 30. For example, provided that the amount of resources that are currently used by the relay device 30 is "10," the control unit 142 can set the amount of resources allocated to the relay device 30 to "15." Accordingly, it becomes possible for the relay device 30 to immediately perform link adaptation that requires new resources.

Further, the control unit 142, when the control range C is selected, allocates extra resources to the relay device 30 in accordance with the number of communication terminals 20 belonging to the relay device 30. For example, the control unit 142 can allocate more extra resources to the relay device 30 that has a larger number of communication terminals 20 belonging thereto. More specifically, for example, provided that the amount of extra resources is "40," a single communication terminal 20 belongs to the relay device 30A, and three communication terminals 20 belong to the relay device 30B, the control unit 142 can set the amount of extra resources allocated to the relay device 30A to "10," and set the amount of extra resources allocated to the relay device 30B to "30." Accordingly, it becomes possible for the relay device 30 to autonomously perform resource scheduling within the range of the allocated resources. Herein, when access to a given relay device 30 from communication terminals 20 is concentrated, the control unit 142 can cause the communication terminals 20 to be handed over to the base station 10 or to another relay device 30 for load distribution purposes.

Although the description has been made above of an example in which the control range selection unit 148 selects the control range in accordance with the amount of traffic, the selection method is not limited thereto. For example, the control range selection unit 148 can dynamically select the control range on the basis of one or any combination of a variety of elements such as a load on the base station 10, power consumption, the number of communication terminals 20, information about whether or not the relay device 30 is disposed temporally for an outdoor event, and the relationship with another base station.

The backbone communication unit 146 communicates with the management server 16 via the backbone network 12. For example, the backbone communication unit 146 transmits to the management server 16 information indicated by (1) to (4) above stored in the storage unit 144. In that case, the backbone communication unit 146 can, regarding (2) above, further transmit reference counter information for detecting mis-synchronization between the base station 10 and another base station, by considering a case in which the base station 10 operates asynchronously with the other base station.

As described above, the relay device 30 performs control in accordance with the control range selected by the base station 10. Therefore, the entire operation of the communication system changes in accordance with the control range of the relay device 30 selected by the base station 10. Thus, hereinafter, interference avoidance operations performed when the control range A is selected or when the control range B or the control range C is selected will be described in detail.

<3. Control Range A: Centralized Control by the Management Server>

When the base station 10 has selected the control range A, the relay device 30 is not permitted to perform an autonomous operation almost at all. Thus, the management server 16 determines the presence or absence of interference and issues an instruction to execute interference avoidance control. Hereinafter, the configuration of such management server 16 will be described. Note that the present embodiment is based on the following points.

- The relay device 30 uses a direct link, and terminates the procedures of up to "RRC connection complete" with the base station 10 in accordance with similar procedures to those of the communication terminal 20, and also determines the sub-cell ID, reference pattern allocation, and the like.
- The base station 10 and the relay device 30 belonging thereto are synchronized with each other.
- Grouping information that indicates the relay device 30 and the communication terminal 20 belonging to the relay device 30 is given by the base station 10 in advance (the base station 10 determines the necessity of relay from a CQI report or TA information, and allocates resources for relay if necessary).
- Ptx_DL>>Ptx_RL and Ptx_AL (Ptx: the maximum transmission power, DL: direct link (direct link between the base station 10 and the communication terminal 20), AL: access link, and RL: relay link)
- The primary object to be achieved is to take measures against interference to the direct link, in particular, interference to the direct link of the communication device (LTE UE) that is not based on the presence of the relay device 30.

Figure 12:
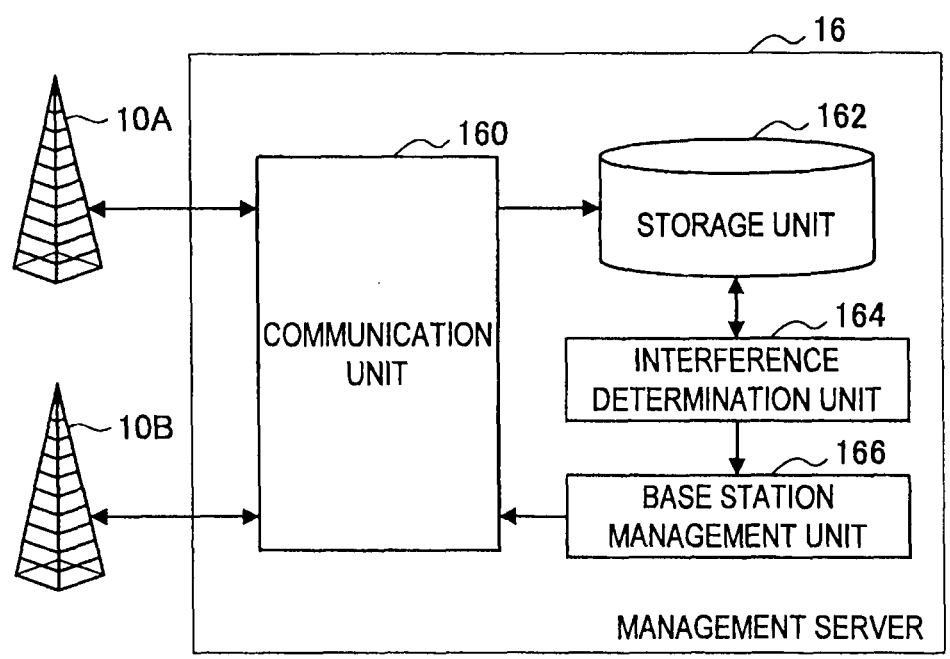
FIG. 12 is a functional block diagram showing the configuration of a management server.

FIG. 12 is a functional block diagram showing the configuration of the management server 16. As shown in FIG. 12, the management server 16 includes a communication unit 160, a storage unit 162, an interference determination unit 164, and a base station management unit 166. Note that the function of the management server 16 can be implemented on a single base station 10 to realize centralized control or be implemented on a plurality of base stations 10 to realize autonomous control.

The communication unit 160 is connected to each base station 10, and has the functions of a receiving unit that receives information from each base station 10 and a transmitting unit that transmits information to each base station 10. For example, the communication unit 160 receives management information indicated by (1) to (4) above from each base station 10. The management information received by the communication unit 160 is recorded on the storage unit 162.

The interference determination unit 164 determines whether or not mutual interference would occur between the communications controlled by different base stations 10, using part or all of the management information indicated by (1) to (4) above. For example, the interference determination unit 164 can determine that interference would occur when the distance between a relay device 30 or a communication terminal 20, which belongs to a given base station 10, and a relay device 30 or a communication terminal 20, which belongs to another base station 10, is less than or equal to a set value. Further, the interference determination unit 164 can determine that interference would occur when resources, which are used by each of the pair whose distance is less than or equal to the set value, overlap each other. Furthermore, the interference determination unit 164 can determine the presence or absence of interference on the basis of information from the adjacent base station 10 or the adjacent relay device 30 obtained by measurement at the communication terminal 20.

The base station management unit 166 permits the base station 10, for which the interference determination unit 164 has determined that interference would not occur, to perform a typical autonomous operation until when there is an update to the scheduling information, an update to the location of the communication terminal 20, or the like, or until when predetermined report cycles have elapsed. Meanwhile, the base station management unit 166 instructs the base station 10, for which the interference determination unit 164 has determined that interference would occur, to perform an interference avoidance operation. Interference avoidance control indicates control by which interference may possibly be avoided, or control by which interference can be avoided under given conditions. Hereinafter, such interference avoidance control will be described.

(Interference Avoidance Control)

When there is no congestion of traffic in one of the base stations 10 that controls the communication for which it has been determined that interference would occur, which means that the resource scheduling for one of the base stations 10 can be changed, the base station management unit 166 issues an instruction to change the scheduling information of the one of the base stations 10 as the interference avoidance control. Specifically, the base station management unit 166 can, in the scheduling information of the one of the base stations 10, change resources allocated to the communication, for which it has been determined that interference would occur, to different resources, and transmit the changed scheduling information to the one of the base stations 10. In this case, the base station management unit 166 can only send information about the change in the scheduling. Herein, the base station management unit 166 not only changes the scheduling information for the communication between the one of the base stations 10 and the relay device 30 but also changes the scheduling information for the communication between the relay device 30 and the communication terminal 20.

Further, the base station management unit 166 can also allocate resources to the communication terminal 20 while avoiding resource blocks or sub-carriers whose interference components to the communication terminal 20 are large. This will be described hereinafter in conjunction with a summary of OFDMA.

In OFDMA, adjacent base stations perform communication using carriers with the same center frequency in a densely populated area. In this case, for the communication with a communication terminal located at a cell edge where coverage of a plurality of base stations overlaps, the plurality of base stations use sub-carriers that are orthogonal to each other or use different time slots to avoid interference, whereby limited resources are effectively utilized. Meanwhile, in a non-densely populated area, there are sufficient available resources in many cases. Thus, different orthogonal sub-carriers are fixedly allocated to the respective base stations.

As described above, when adjacent base stations operate adjacent cells using sub-carriers that are orthogonal to each other, there may be cases in which due to a frequency deviation caused by various factors (e.g., influence of Doppler frequency), radiated power outside the band would overlap the sub-carriers at the edges, causing interference. Thus, frequency allocation and out-of-band suppression filtering are important.

Alternatively, when adjacent base stations operate adjacent cells by allocating different time slots, it is important that the transmission timing be adjusted so that the boundaries of the time slots are orthogonal to one another other (so that they are within the GuardIntervals (GI) of the head symbol) on the basis of the accurate propagation channel delay for the communication terminal located at the cell edge.

Herein, the influence of the frequency selective fading will be described with reference to FIGS. 13 and 14.

Figure 13:
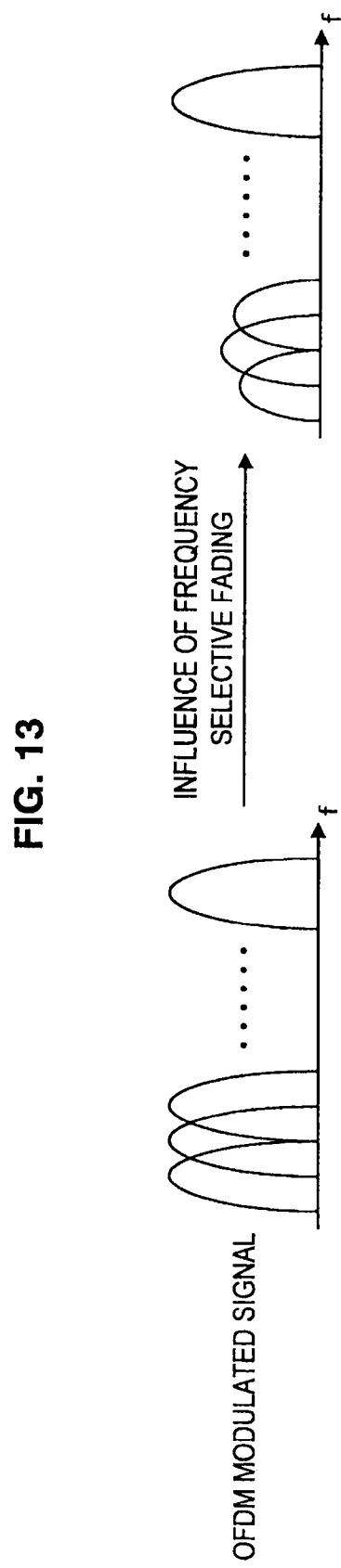
FIG. 13 is an explanatory diagram showing the influence of the frequency selective fading.
Figure 14:
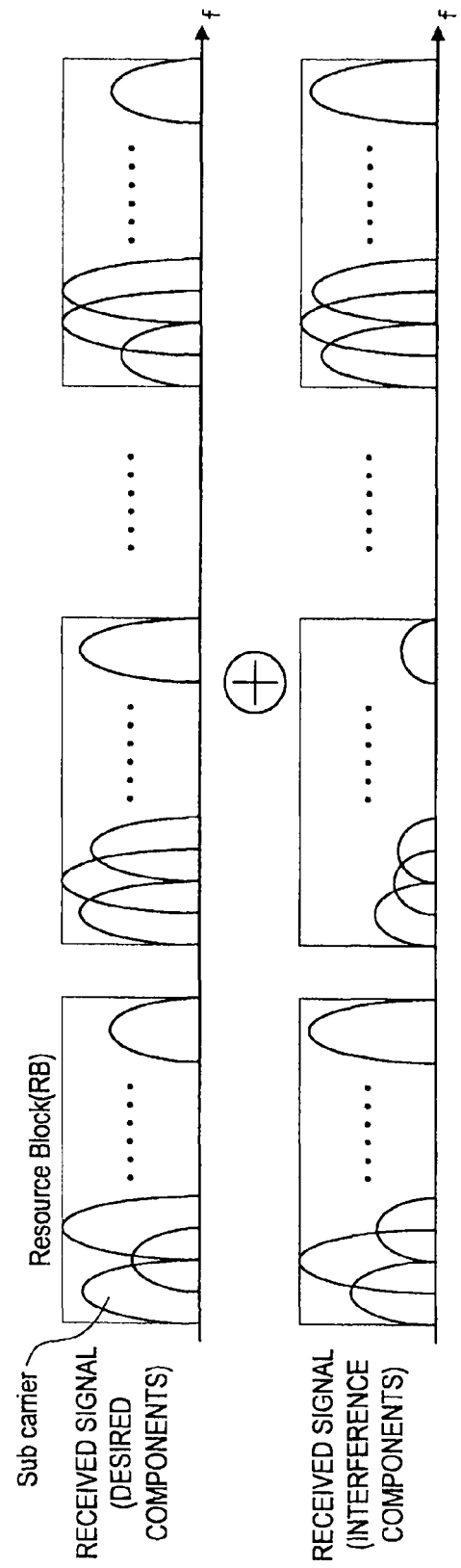
FIG. 14 is an explanatory diagram showing the influence of the frequency selective fading.

FIGS. 13 and 14 are explanatory diagrams each showing the influence of the frequency selective fading. As shown in FIG. 3, an OFDM modulated signal has, even when the transmission power of each sub-carrier is the same at the time of transmission, variations in the received power of each sub-carrier at the time of reception due to the influence of the frequency selective fading. In addition, as shown in FIG. 14, the magnitudes of interference components differ from resource block to resource block.

Thus, when the base station management unit 166 can recognize the magnitudes of interference components in each resource block at the communication terminal 20, the base station management unit 166 can avoid interference by allocating resources to the communication terminal 20 while avoiding resource blocks having large interference components. Further, when the base station management unit 166 can recognize the magnitudes of interference components in each sub-carrier, the base station management unit 166 can avoid interference by avoiding the use of sub-carriers having large interference within the resource block or lowering the modulation method.

Note that the base station management unit 166 can, without changing the scheduling information by itself, inform one of the base stations 10 of the communication for which it has been determined that interference would occur, and prompt the one of the base stations 10 to change the scheduling information.

Further, the base station management unit 166 can also issue, as the interference avoidance control, an instruction to hand over a relay device 30 or a base station 20 belonging to one of the base stations 10 that controls the communication for which it has been determined that interference would occur, to the other base station 10 or to a relay device 30 belonging to the other base station 10. Note that the base station management unit 166 can also premise that there are extra available resources for accepting handover in the other base station 10 or the relay device 30 belonging to the other base station 10.

For example, if it is determined that interference would be avoided by handing over the relay device 30 belonging to one of the base stations 10 to the other base station 10, the base station management unit 166 instructs the one of the base stations 10 to perform the handover. In that case, the base station management unit 166 informs the base station 10 of the ID of the base station 10, which is the handover destination, information for connection, and the like. In response, a series of operations for handover is performed. Herein, examples of the information for connection include the relative distance from the base station 10, which is the handover destination, and information indicating the aforementioned resource blocks or sub-carriers having large interference components. Hereinafter, referring to FIG. 15 to FIG. 18, typical handover procedures and the like will be described first, and then a specific flow of the handover of the relay device 30 in accordance with the present embodiment will be described.

Figure 15:
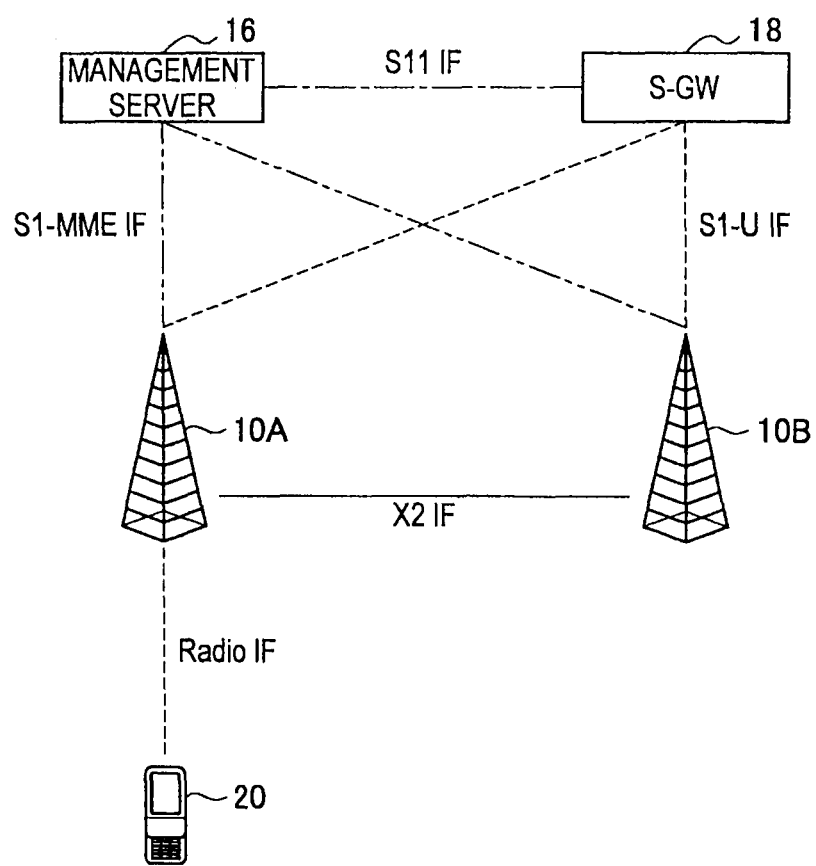
FIG. 15 is an explanatory diagram showing an LTE network configuration.

FIG. 15 is an explanatory diagram showing an LTE network configuration. As shown in FIG. 15, the LTE network includes, in addition to the management server 16 having a function of an MME and the base stations 10, an S-GW (Serving GW) 18 that manages the user data. Handover between the base stations in such a network configuration is performed in accordance with the procedures shown in FIG. 16.

Figure 16:
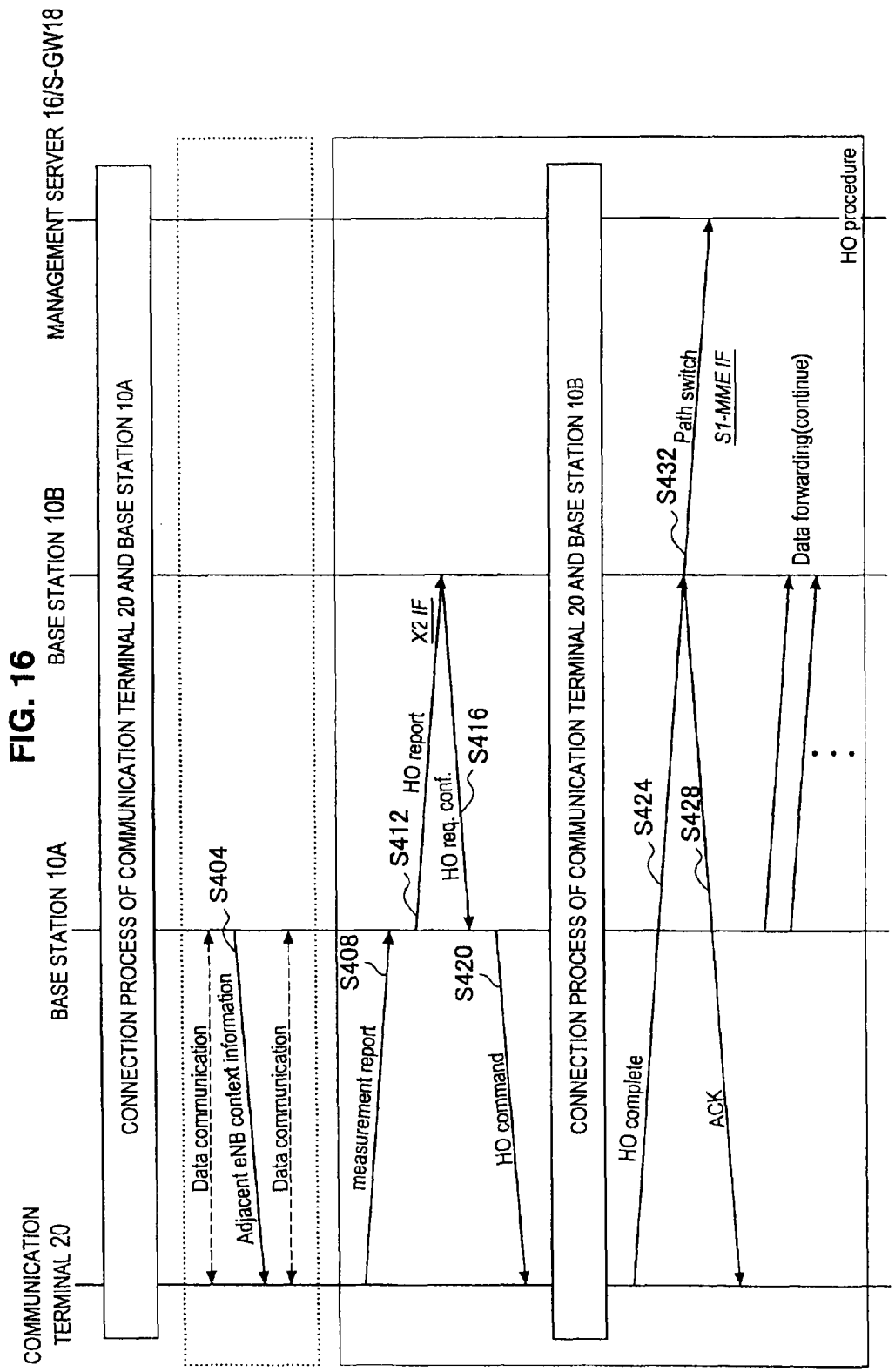
FIG. 16 is an explanatory diagram showing the procedures of handover between base stations.

FIG. 16 is an explanatory diagram showing the procedures of handover between base stations. As shown in FIG. 16, when the communication terminal 20 and the base station 10A are connected, the base station 10A transmits to the communication terminal 20 context information (Adjacent eNB context information) indicating the target to be measured such as an adjacent base station 10B (S404). After that, the communication terminal 20 measures the radio field intensity or the like of a signal transmitted from the base station 10B or the like in accordance with the context information while at the same time communicating with the base station 10A. Then, the communication terminal 20 reports to the base station 10A the measurement information (Mesurement report) in accordance with predetermined cycles or rule (S408). Note that S404 and S408 can be omitted if the base station 10A hands over the communication terminal 20 based on the forced determination on the network side.

After that, the base station 10A requests the base station 10B to accept handover of the communication terminal 20 (S412), and once the base station 10B has accepted the request (S416), the base station 10A instructs execution of handover of the communication terminal 20 (S420). Then, the communication terminal 20 performs a process of connecting to the base station 10B, and informs the base station 10B that preparation for handover is ready (S424). The base station 10B returns ACK in response to the information (S428), and also reports to the management server 16/S-GW16 that the communication terminal 20 has been handed over to the base station 10B (S432).

Although the description has been made above of a case in which the network side such as the management server 16 or the S-GW18 determines the execution of handover on the basis of the measurement information measured with the communication terminal 20 (a case in which the communication terminal 20 cooperatively operates), a trigger for the handover is not limited to such example. For example, handover can be performed on the basis of the forced determination on the network side such as the management server 16 or the S-GW 18. Alternatively, the communication terminal 20 can voluntarily perform handover by selecting the base station 10 in accordance with the measurement information and performing a connection process. As a further alternative, the management server 16 can be arranged such that it physically manages a plurality of base stations 10 (eNB) like MME or S-GW. Moreover, the management server 16 can be presumed to be included in the base stations 10 so that information can be logically exchanged using X2 IF between the plurality of base stations 10.

Herein, in LTE-A, coordinated transmission between base stations called CoMP (Cordinated Multipoint Transmission and reception) and the like have been studied, and there is a high possibility that each IF (S11 IF, S1-MME IF, or S1-UIF) may be enhanced, and management may be performed as if a single communication terminal 20 belongs to a plurality of base stations 10.

Thus far, a link management method such as handover for which the presence of the relay device 30 is taken into consideration has not been discussed specifically. Thus, hereinafter, a flow of up to the connection of the relay device 30 will be described first, and then the procedures for handing over the relay device 30 will be described. Note that the following description is based on the premise that the management server 16 includes the function of the S-GW16.

Figure 17:
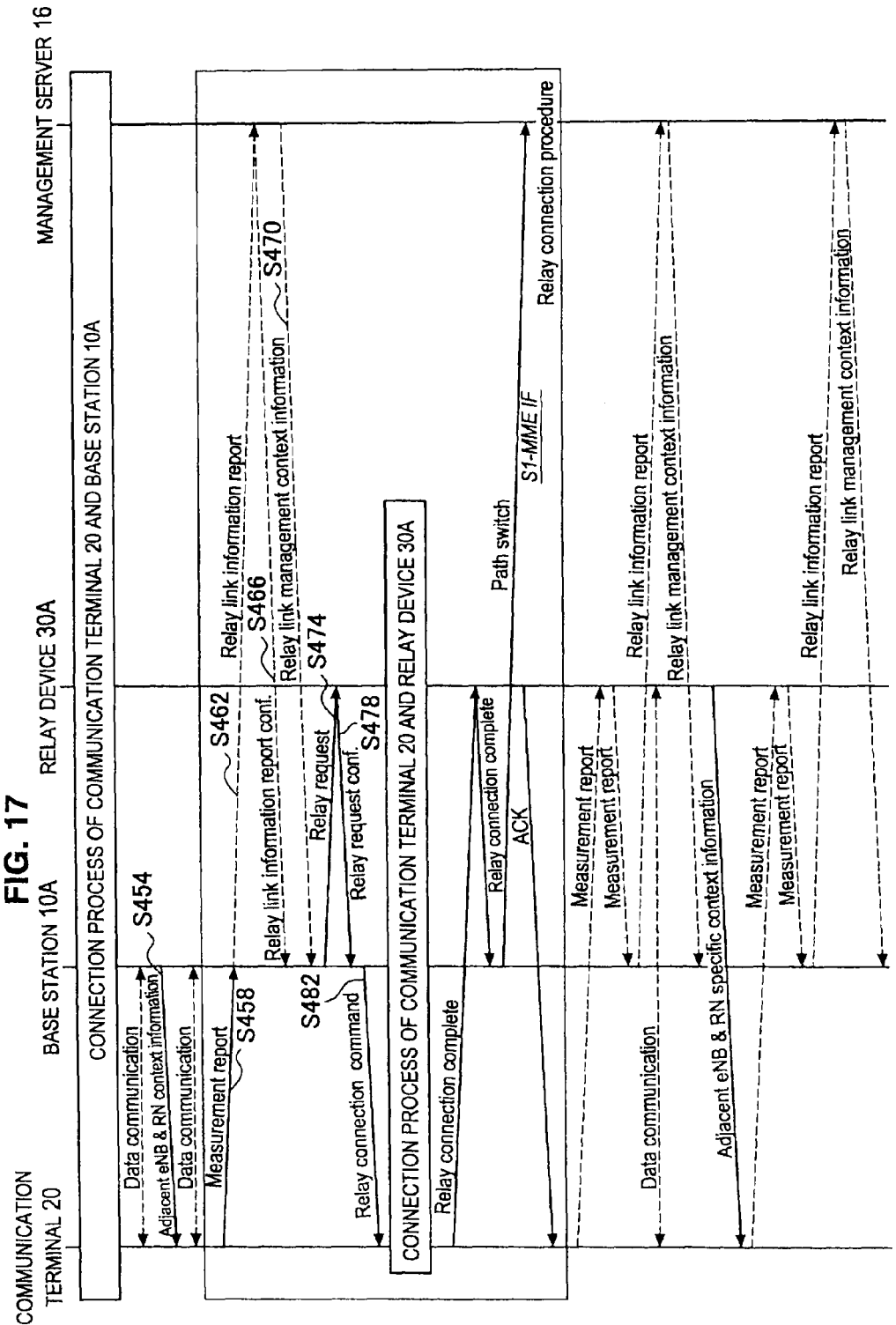
FIG. 17 is a sequence diagram showing the connection procedures of a communication terminal and a relay device.

FIG. 17 is a sequence diagram showing the connection procedures of the communication terminal 20 and the relay device 30. As shown in FIG. 17, when the communication terminal 20 and the base station 10A are connected, the base station 10 transmits to the communication terminal 20 context information (Adjacent eNB & RN context information) indicating the target to be measured such as an adjacent base station or a nearby relay device 30 (S454). After that, the communication terminal 20 measures the radio field intensity or the like of a signal transmitted from the relay device 30A or the like in accordance with the context information while at the same time communicating with the base station 10A. Then, the communication terminal 20 reports to the base station 10A the measurement information in accordance with predetermined cycles or rule (S458).

After that, the base station 10A reports to the management server 16 the measurement information (Relay link information report) of the nearby relay device 30 (S462). Note that the base station 10A can also report the measurement information of the adjacent base station at the same time. Then, the management server 16 transmits to the base station 10A a confirmation in response to the measurement information (S466). Further, the management server 16 determines the information to be used for the communication terminal 20 to connect to the relay device 30 (e.g., ID of the relay device 30 to be connected), and transmits it to the base station 10A (S470). Then, the base station 10A issues, on the basis of the information received from the management server 16, a relay request to the target relay device 30 (the relay device 30A in the example shown in FIG. 17) (S474).

Next, when the relay device 30A has transmitted to the base station 10A a confirmation in response to the relay request (S478), the base station 10A instructs the communication terminal 20 to connect to the relay device 30A (S482). Herein, the base station 10A can send the ID (sub-cell ID) of the relay device 30A for which connection is recommended. Accordingly, a process of connecting the communication terminal 20 and the relay device 30A is performed, and thus, it becomes possible for the communication terminal 20 to communicate with the base station 10A via the relay device 30A. Note that the steps of S462, S466, and S470 can be omitted in the case of an autonomous operation or a decentralized operation in which the management server 16 is not needed. In addition, although FIG. 17 shows an example in which "Adjacent eNB & RN specific context information" is transmitted from the relay device 30A, it can be transmitted directly from the base station 10A to the communication terminal 20.

Figure 18:
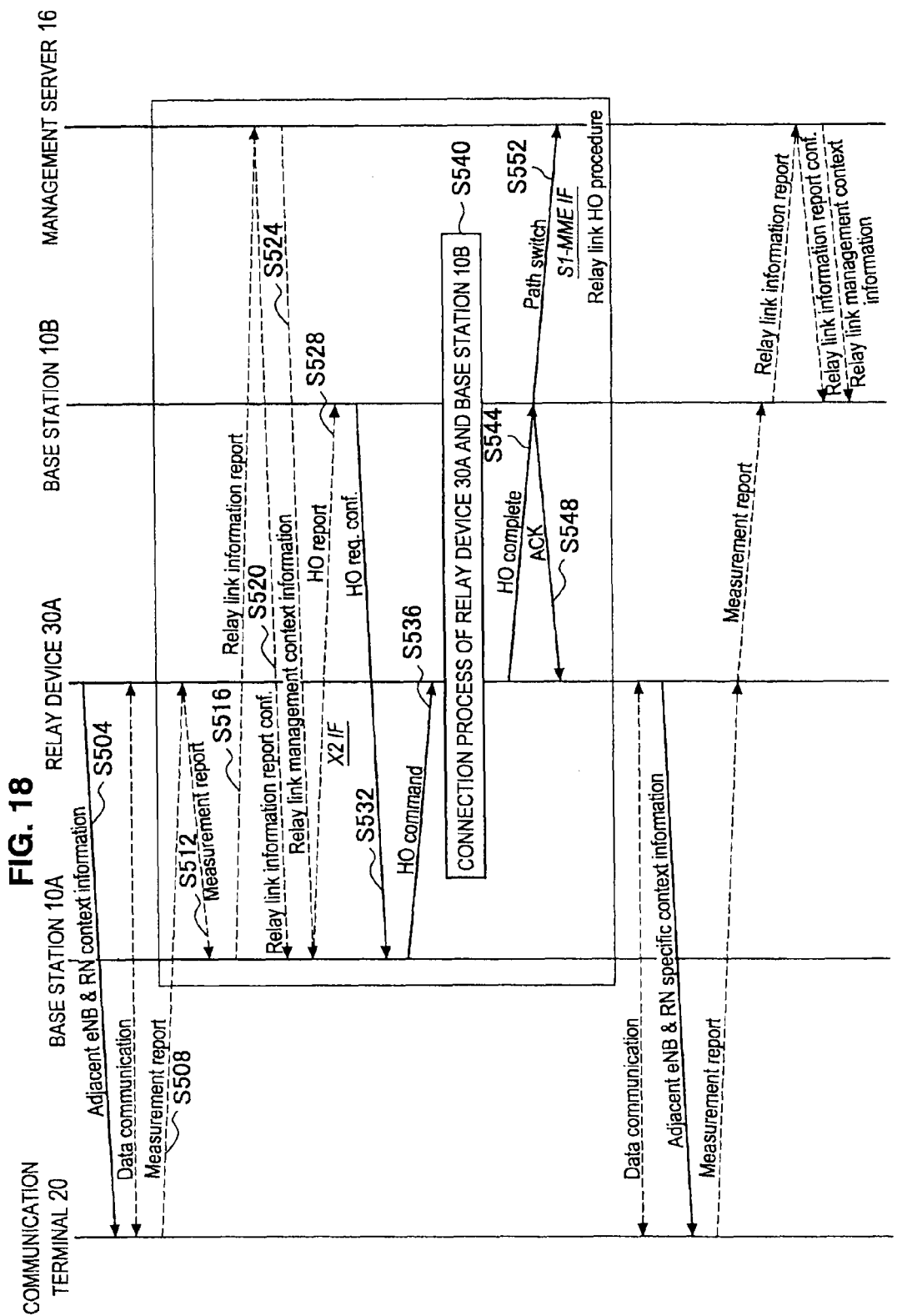
FIG. 18 is a sequence diagram showing the procedures for handing over a relay device.

FIG. 18 is a sequence diagram showing the procedures for handing over the relay device 30. In the example shown in FIG. 18, the communication terminal 20 is connected to the relay device 30A belonging to the base station 10A. In this case, the relay device 30A transmits to the communication terminal 20 context information (Adjacent eNB & RN context information) indicating the target to be measured such as an adjacent base station or a nearby relay device 30 (S504). After that, the communication terminal 20 measures the radio field intensity or the like of a signal transmitted from the base station 10B or the like in accordance with the context information while at the same time communicating with the relay device 30A. Then, the communication terminal 20 reports the measurement information to the base station 10A via the relay device 30 (S508, S512).

Herein, the measurement information can include the interfered sub-carriers, resource blocks, the center frequency or bandwidth, ID of the interfering node, link ID (ID indicating any of the direct link, the access link, and the relay link), the interference level or SINR level of each sub-carrier or resource block, and the like.

After that, the base station 10A reports the measurement information (Relay link information report) to the management server 16 (S516), and the management server 16 transmits to the base station 10A a confirmation in response to the measurement information (S520). Then, if the management server 16 has determined that the communication of the relay device 30A would interfere with another communication on the basis of the reported measurement information or a variety of other information, the management server 16 transmits to the base station 10A link management information about interference avoidance control (S524). Herein, examples of the information about interference avoidance control include ID of a relay device that performs communication interfering with the relay device 30A, a channel used, the maximum transmission power, positional information, and scheduling information.

The base station 10A requests the base station 10B to, on the basis of the link management information about interference avoidance control received from the management server 16, accept handover of the relay device 30A (S528), and once the base station 10B has accepted the request (S532), the base station 10A instructs execution of handover of the relay device 30A (S536). Then, the relay device 30A performs a process of connecting to the base station 10B (S540), and informs the base station 10B that preparation for handover is ready (S544). The base station 10B returns ACK in response to the information (S548), and also reports to the management server 16 that the relay device 30A has been handed over to the base station 10B (S552).

Herein, the relay device 30A can be in a multi-link connection state in which the relay device 30A is connected to both the base station 10A and the base station 10B. In such a case, the relay device 30A can switch the relay link to the base station 10B only in the relay communication through the access link of the communication terminal 20. Consequently, as the communication terminal 20 belongs to the base station 10B, it becomes possible for the base station 10B to centrally control the interference avoidance between the communication terminals belonging to the base station 10B, including the communication terminal 20.

Note that the relay device 30 can also generate a signal for the management server 16 in accordance with the format of S1-MMEIF or S1-UIF, and wirelessly transmit it to the base station 10. In this case, the base station 10 can allow a signal received from the relay device 30 to tunnel through to the management server 16. Thus, as the connection relationship between the relay device 30 and the management server 16 becomes equivalent to the direct connection, it is possible to increase the efficiency of the centralized control of the management server 16. In addition, although FIG. 18 shows an example in which the "Mesurement report" is transmitted from the communication terminal 20 to the relay device 30A in S508, the "Mesurement report" can be transmitted directly from the communication terminal 20 to the base station 10A. Likewise, although the bottom portion in FIG. 18 shows an example in which the relay device 30A transmits the "Mesurement report" transmitted from the communication terminal 20 to the base station 10B, the communication terminal 20 can transmit the "Mesurement report" directly to the base station 10B. Further, although FIG. 18 shows an example in which the "Adjacent eNB & RN specific context information" is transmitted from the relay device 30A, it can be transmitted directly from the base station 10A to the communication terminal 20.

Further, as another example of handover, if it is determined that interference would be avoided by handing over the communication terminal 20 belonging to the base station 10 to another relay device 30 belonging to the same base station 10, the base station management unit 166 instructs the base station 10 to perform the handover. In that case, the base station management unit 166 informs the base station 10 of the ID of the relay device 30, which is the handover destination, information for connection, and the like. In response, a series of operations for handover is performed. Hereinafter, a flow of the handover of the communication terminal 20 will be specifically described with reference to FIG. 19.

Figure 19:
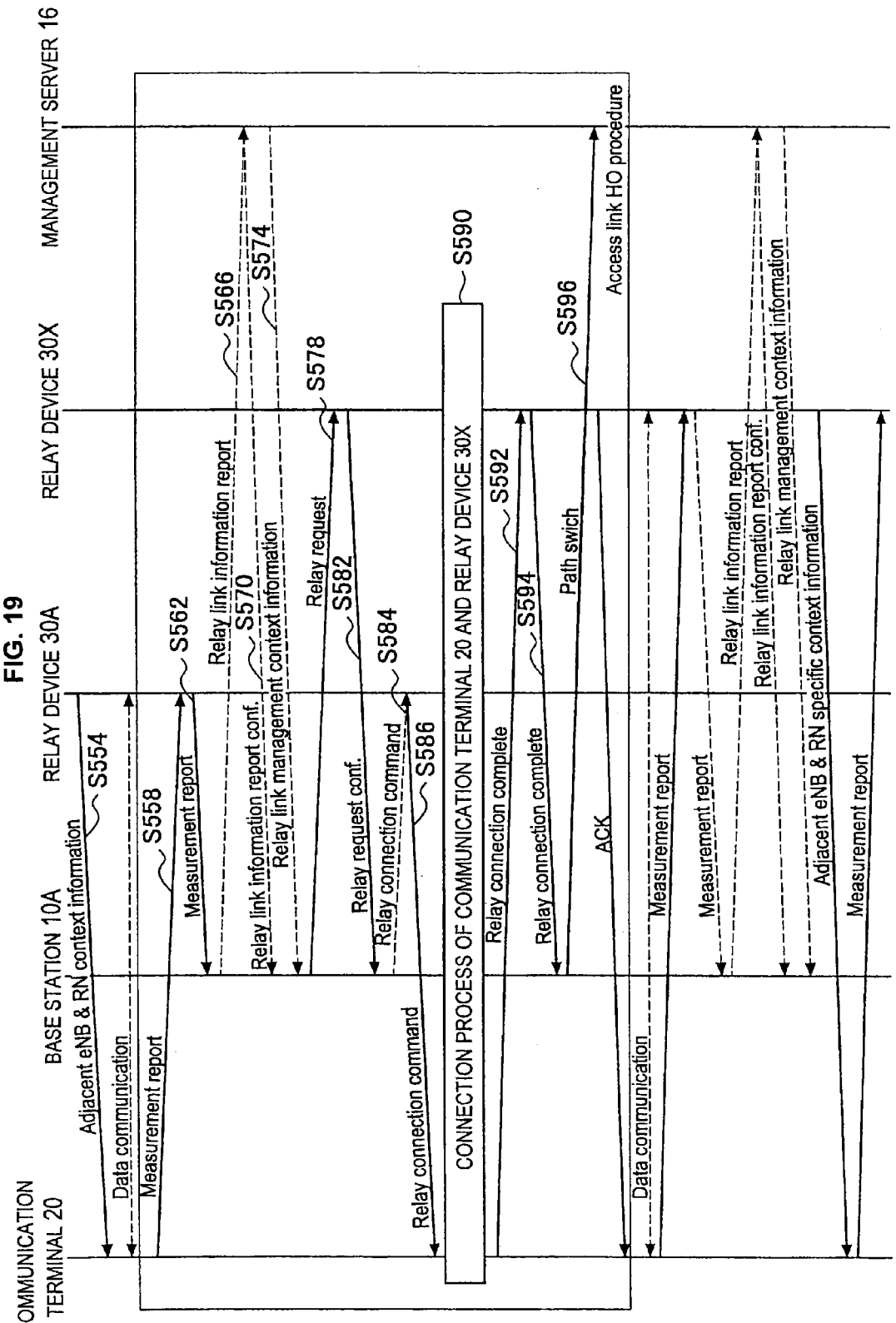
FIG. 19 is a sequence diagram showing the procedures for handing over a communication terminal.

FIG. 19 is a sequence diagram showing the procedures for handing over the communication terminal 20. In the example shown in FIG. 19, the relay devices 30A and 30X belong to the base station 10A, and the communication terminal 20 is connected to the relay device 30A. In addition, as the processes in S554 to S570 in FIG. 19 are substantially the same as those in S504 to S520 shown in FIG. 18, the detailed description thereof will be omitted.

If the management server 16 has determined on the basis of the measurement information received from the base station 10A in S566 or a variety of other information that interference to the communication of the communication terminal 20 would be eliminated by handing over the communication terminal 20 to the relay device 30X, the management server 16 issues an instruction to hand over the communication terminal 20 to the relay device 30X using link management information (S574).

The base station 10A requests the relay device 30X to, on the basis of the link management information received from the management server 16, accept handover of the communication terminal 20 (S578), and once the relay device 30X has accepted the request (S582), the base station 10A instructs execution of handover of the communication terminal 20 via the relay device 30A (S584, S586). Then, the communication terminal 20 performs a process of connecting to the relay device 30X (S590), and informs the base station 10A that preparation for handover is ready via the relay device 30X (S592, S594). Then, the base station 10A reports to the management server 16 that the communication terminal 20 has been handed over to the relay device 30X (S596). Although FIG. 19 shows an example in which the "Adjacent eNB & RN specific context information" is transmitted from the relay device 30A, it can be transmitted directly from the base station 10A to the communication terminal 20. In addition, although FIG. 19 shows an example in which the "Mesurement report" is transmitted from the communication terminal 20 to the relay device 30A, the "Mesurement report" can be transmitted directly from the communication terminal 20 to the base station 10A. Further, the steps of S566, S570, and S574 can be omitted. Furthermore, the "Relay connection command" in S586 can be transmitted directly from the base station 10A to the communication terminal 20. Although FIG. 19 shows an example in which the "Mesurement report" transmitted from the communication terminal 20 is relayed by the relay device 30X to the base station 10A, the communication terminal 20 can transmit the "Mesurement report" directly to the base station 10A. In addition, the "Adjacent eNB & RN specific context information" can be transmitted from not the relay device 30X but the base station 10A.

Further, as another example of handover, if it is determined that interference would be avoided by handing over the communication terminal 20 belonging to one of the base stations 10 to the relay device 30 belonging to the other base station 10, the base station management unit 166 instructs the one of the base stations 10 to perform the handover. In that case, the base station management unit 166 informs the base station 10 of the ID of the relay device 30, which is the handover destination, information for connection, and the like. In response, a series of operations for handover is performed. Hereinafter, a flow of the handover of the communication terminal 20 will be specifically described with reference to FIG. 20.

Figure 20:
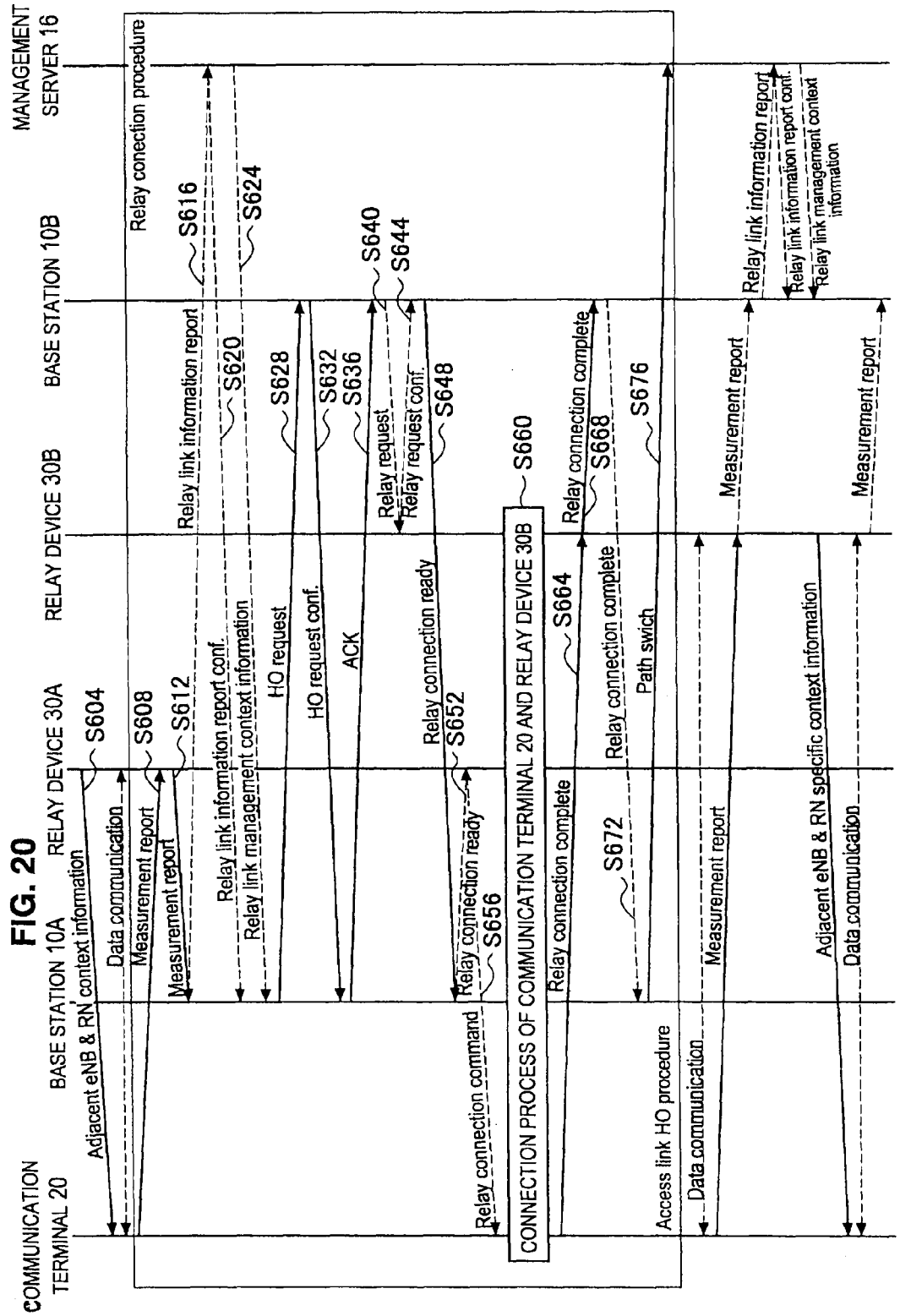
FIG. 20 is a sequence diagram showing the procedures for handing over a communication terminal.

FIG. 20 is a sequence diagram showing the procedures for handing over the communication terminal 20. In the example shown in FIG. 20, the relay device 30A belongs to the base station 10A, the relay device 30B belongs to the base station 10B, and the communication terminal 20 is connected to the relay device 30A. As the processes in S604 to S620 in FIG. 20 are substantially the same as those in S504 to S520 shown in FIG. 18, the detailed description thereof will be omitted.

If the management server 16 has determined on the basis of the measurement information received from the base station 10A in S616 or a variety of other information that communication of the communication terminal 20 would interfere with communication of the relay device 30B, the management server 16 issues an instruction to hand over the communication terminal 20 to the relay device 30B using link management information (S624).

The base station 10A requests the base station 10B to, on the basis of the link management information received from the management server 16, accept handover of the communication terminal 20 to the relay device 30B (S628), and once the base station 10B has accepted the request (S632), the base station 10A returns ASK (S636).

After that, the base station 10B inquires of the relay device 30B if it is able to accept the handover (S640). Then, if the relay device 30B is able to accept the handover (S644), the base station 10B informs the relay device 30A that the relay device 30B is able to accept the handover, via the base station 10A (S648, S652). Thus, such information is not transmitted when traffic in the relay device 30B is congested or when there are no extra resources available.

Then, when the relay device 30A has instructed the communication terminal 20 to connect to the relay device 30B (S656), the communication terminal 20 performs a process of connecting to the relay device 30B (S660), and informs the relay device 30B that preparation for handover is ready (S664). Then, the relay device 30B transmits the information to the base station 10B (S668), and the base station 10B transmits it to the base station 10A (S672). Then, the base station 10A reports to the management server 16 that the communication terminal 20 has been handed over to the relay device 30B (S676). Although FIG. 20 shows an example in which the "Adjacent eNB & RN specific context information" is transmitted from the relay device 30A, it can be transmitted directly from the base station 10A to the communication terminal 20. In addition, although FIG. 20 shows an example in which the "Mesurement report" is transmitted from the communication terminal 20 to the relay device 30A in S608, the "Mesurement report" can be transmitted directly from the communication terminal 20 to the base station 10A. Further, the "Relay connection command" in S652 can be transmitted directly from the base station 10A to the communication terminal 20.

Meanwhile, the base station management unit 166 can, when traffic in one of the base stations, which controls the communication for which it has been determined that interference would occur, is congested to the extent that the scheduling information cannot be changed, instruct the one of the base stations 10 to prohibit the use of the relay device 30, which is the cause of the interference, as the interference avoidance control. The prohibition of the use of the relay device 30 is instructed when, for example, resources allocated to relay devices 30 belonging to adjacent, different base stations 10 overlap, or when there exists a communication terminal 20 between the adjacent, different base stations 10 that belongs to each of the base stations 10.

Alternatively, if it is determined that interference would be avoided by adjusting a control parameter on the basis of location-related information or scheduling information received from each base station 10, the base station management unit 166 can determine a control parameter for the communication controlled by one of the base stations 10, and instruct the use of the determined control parameter as the interference avoidance control. Herein, examples of the control parameter include parameters related to the transmission power, beam forming, transmission timing, a change in the guard intervals, and insertion of a non-transmission section. The base station 10, upon receiving the control parameter from the management server 16, informs the relay device 30 of the control parameter. Then, the relay device 30 performs communication through the relay link and the access link in accordance with the control parameter determined by the management server 16. Hereinafter, a specific example of the determination of a control parameter will be described with reference to the drawings.

Figure 21:
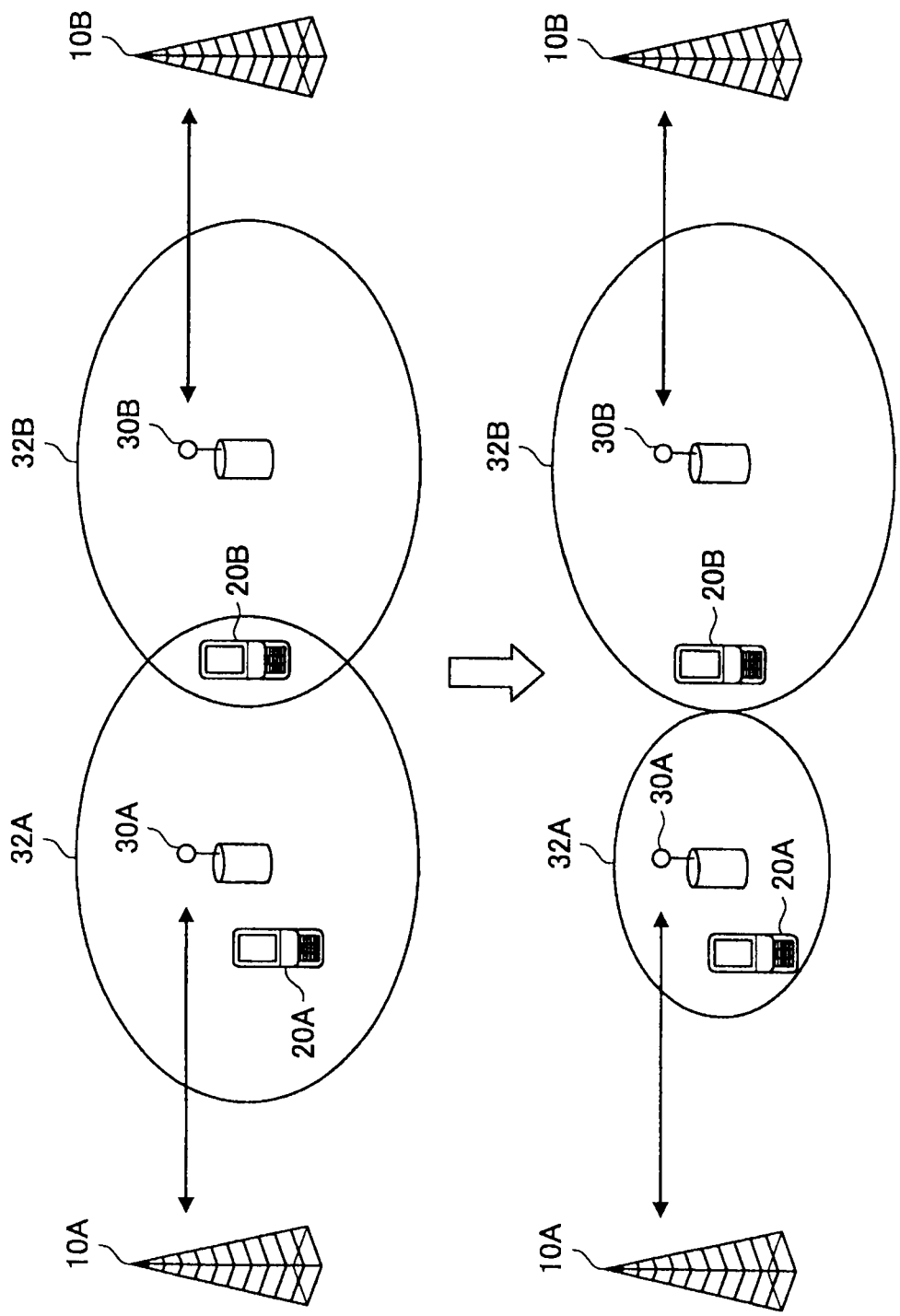
FIG. 21 is an explanatory diagram showing a specific example of the decision of the transmission power.

FIG. 21 is an explanatory diagram showing a specific example of the determination of the transmission power. In the example shown in the upper view of FIG. 21, the relay device 30A belongs to the base station 10A, the communication terminal 20A belongs to the relay device 30A, the relay device 30B belongs to the base station 10B, and the communication terminal 20B belongs to the relay device 30B. In addition, the communication terminal 20B is included not only in the radio wave coverage 32B of the relay device 30B but also in the radio wave coverage 32A of the relay device 30A. Thus, the interference determination unit 164 of the management server 16 determines that a signal transmitted from the relay device 30A to the communication terminal 20A and a signal transmitted from the relay device 30B to the communication terminal 20B would interfere with each other at the communication terminal 20B.

In this case, the base station management unit 166 determines the transmission power that can avoid interference as the transmission power of a signal from the relay device 30A to the communication terminal 20A. Specifically, as shown in the lower view of FIG. 21, the base station management unit 166 reduces the transmission power so that the communication terminal 20B will not be included in the radio wave coverage 32A of the signal transmitted from the relay device 30A to the communication terminal 20A. Accordingly, interference caused by the relay device 30A can be avoided.

Figure 22:
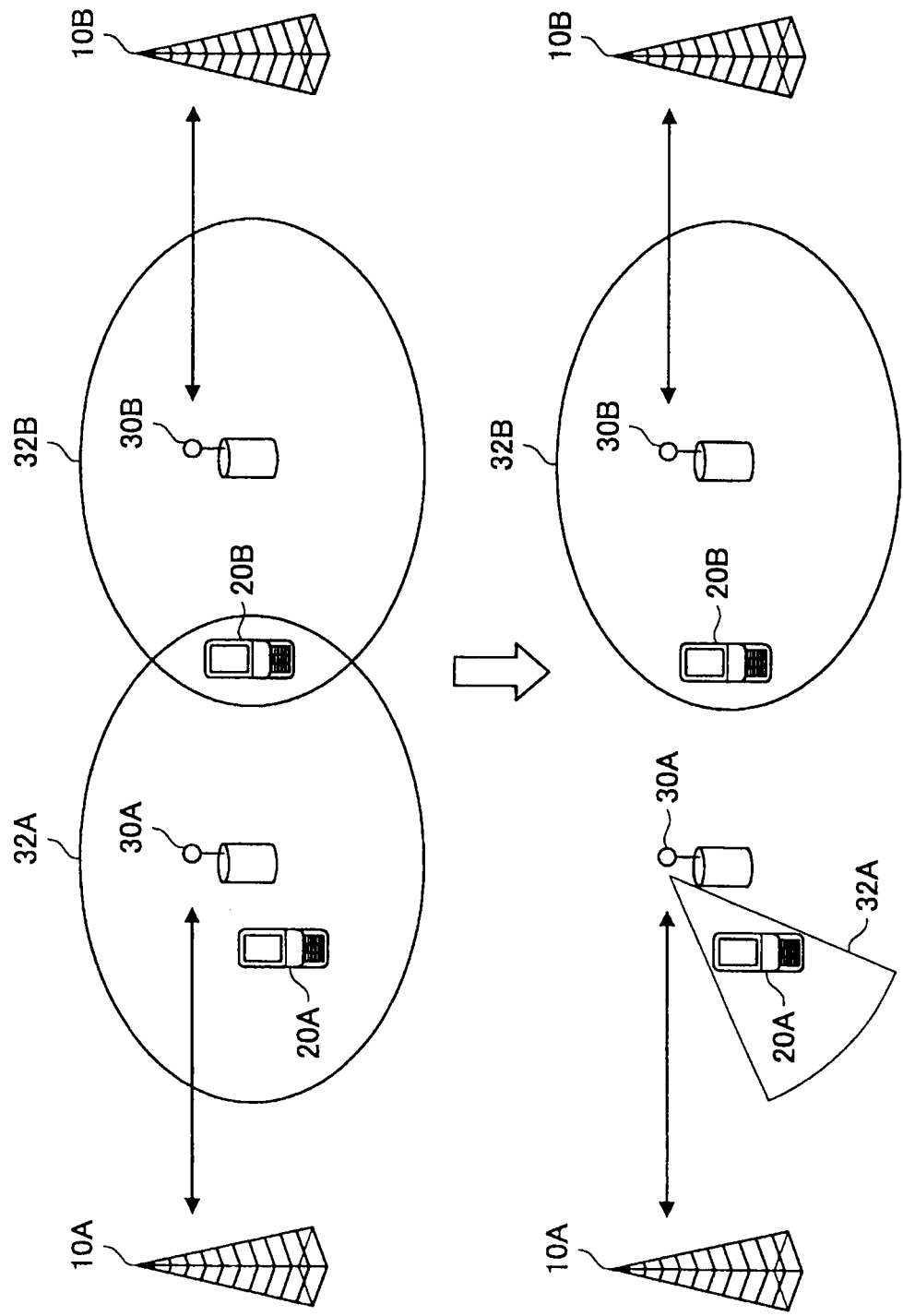
FIG. 22 is an explanatory diagram showing a specific example of the decision of beam forming.

FIG. 22 is an explanatory diagram showing a specific example of the determination of beam forming. In the example shown in the upper view of FIG. 22, the relay device 30A belongs to the base station 10A, the communication terminal 20A belongs to the relay device 30A, the relay device 30B belongs to the base station 10B, and the communication terminal 20B belongs to the relay device 30B. In addition, the communication terminal 20B is included not only in the radio wave coverage 32B of the relay device 30B but also in the radio wave coverage 32A of the relay device 30A. Thus, the interference determination unit 164 of the management server 16 determines that a signal transmitted from the relay device 30A to the communication terminal 20A and a signal transmitted from the relay device 30B to the communication terminal 20B would interfere with each other at the communication terminal 20B.

In this case, the base station management unit 166 determines that beam forming should be performed so that the signal transmitted from the relay device 30A to the communication terminal 20A would not cause interference. Specifically, as shown in the lower view of FIG. 22, the base station management unit 166 causes beam forming to be performed so that the communication terminal 20B will not be included in the radio wave coverage 32A of the signal transmitted from the relay device 30A to the communication terminal 20A. In this manner, interference caused by the relay device 30A can also be avoided by beam forming.

Figure 23:
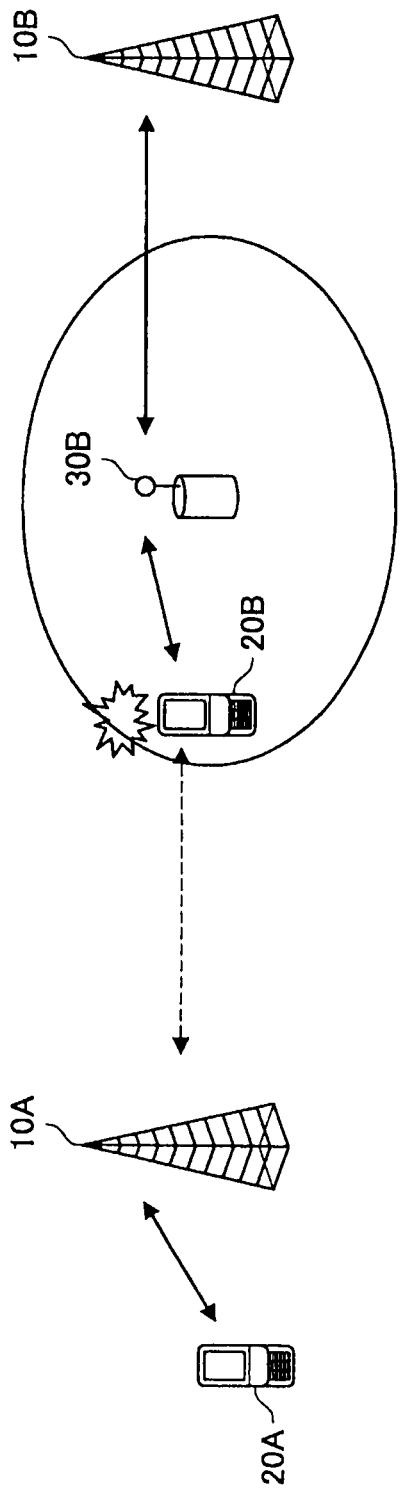
Figure 24:
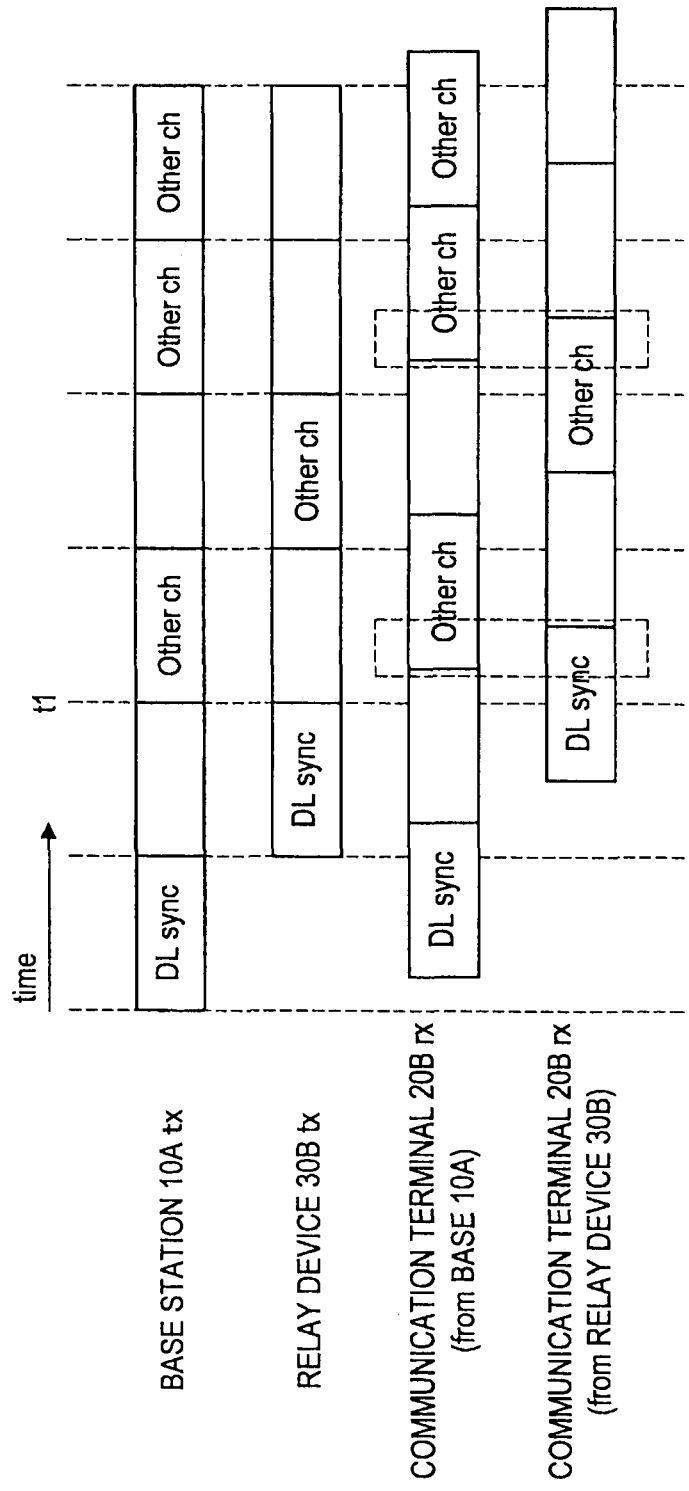
Figure 25:
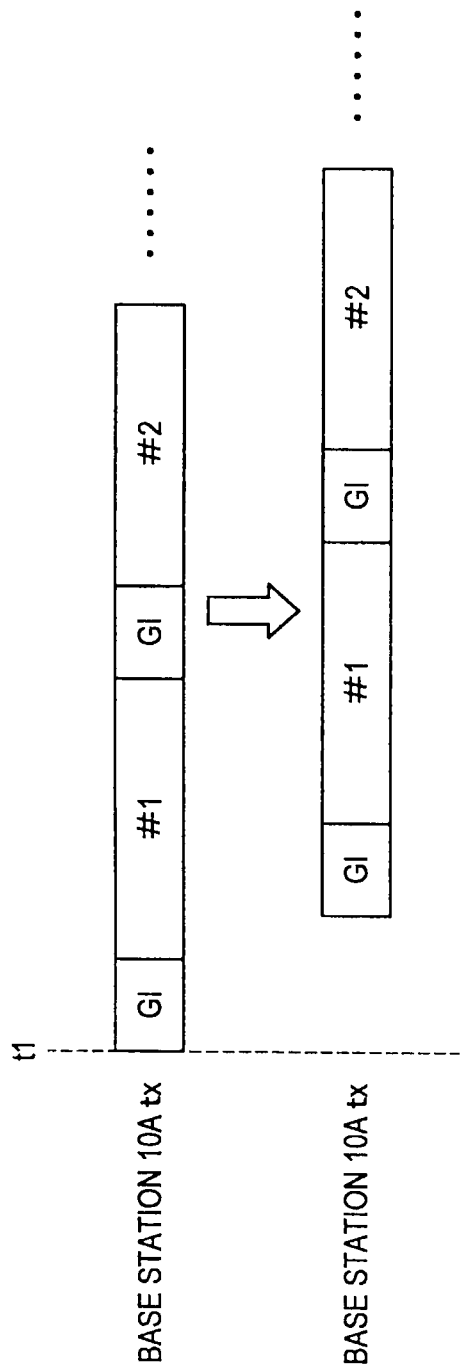

FIGS. 23 to 25 are explanatory diagrams showing specific examples of the determination of the transmission timing, insertion of a non-transmission section, and the like. In the example shown in FIG. 23, the communication terminal 20B is included in the signal coverage of the base station 10A and the relay device 30B. Herein, even when the base station 10A and the relay device 30B transmit signals using slots that are temporally orthogonal to each other as shown in FIG. 24, there may be cases in which the reception times at the communication terminal 20B may overlap. Specifically, FIG. 24 shows an example in which the former half of a signal transmitted from the base station 10A and the latter half of a signal transmitted from the relay device 30B interfere with each other.

In this case, as shown in FIG. 25, the base station management unit 166 can delay the signal transmission timing of the base station 10A. Alternatively, the base station management unit 166 can set a few head OFDM symbols of a signal transmitted from the base station 10A as a non-transmission section, or lengthen the GIs. As a further alternative, the base station management unit 166 can advance the transmission timing of the relay device 30B. As described above, it is also possible to avoid interference by adjusting the transmission timing, inserting a non-transmission section, or the like according to circumstances.

As described above, the base station management unit 166 can instruct execution of various types of interference avoidance control. Further, each base station 10 reports to the management server 16 the execution process of the interference avoidance control or communication quality information after the execution, and the base station management unit 166 adequately adjusts a control parameter in accordance with the reported communication quality information. Note that each base station 10 can, when requested for communication quality information from the management server 16, report the communication quality information to the management server 16 as soon as the preparation is ready.

For example, the base station management unit 166 can issue an instruction to, when the number of generations of HARQ (Hybrid Automatic Repeat Request) reported from the base station 10 is greater than or equal to a prescribed number or when a packet loss is greater than or equal to a predetermined level, increase the transmission power using TPC of the relevant link.

In addition, in the arrangement shown in FIG. 21, when a signal from the relay device 30B to the base station 10B interferes with a signal from the communication terminal 20A to the relay device 30A, the base station management unit 166 can issue instruction to reduce the rate of a signal from the communication terminal 20A to the relay device 30A or change the HARQ. Note that exemplary methods of HARQ include Chase Combining and Incremental Redundancy.

<4. Control Ranges B and C: Autonomous Control by the Relay Device>

When the base station 10 has selected the control range B or C, the relay device 30 is permitted to perform an autonomous operation. Thus, the relay device 30 autonomously determines the interference avoidance control, and executes the interference avoidance control. Hereinafter, the autonomous operation performed by the relay device 30 will be described.

(Information Supplied from Management Server 16)

The management server 16 supplies the following information to the relay device 30, which has been determined to cause interference by the interference determination unit 164, via the base station 10.

Information about the locations of a relay device 30 and a communication terminal belonging to an adjacent base station 10 that controls the communication interfering with the relay device 30. Note that this information includes information in both the case in which the communication of the relay device 30 interferes and the case in which the communication of the relay device 30 is interfered.

ID, Qos information, and scheduling information of a relay device 30 and a communication terminal belonging to an adjacent base station 10 that controls the communication interfering with the relay device 30. Note that when the relay device 30 is not synchronous with the adjacent base station 10, reference counter information for detecting a deviation in the synchronization is also included.

Herein, the management server 16 can also select and supply only part of the aforementioned location-related information and scheduling information. Further, the management server 16 can also inform the relay device 30 of the recommended interference avoidance control (e.g., a control parameter).

The relay device 30, on the basis of the aforementioned information supplied from the management server 16, determines and executes the interference avoidance control. Examples of the interference avoidance control include handover and link adaptation. Hereinafter, such interference avoidance control will be described in detail.

(Interference Avoidance Control: Handover)

Figure 26:
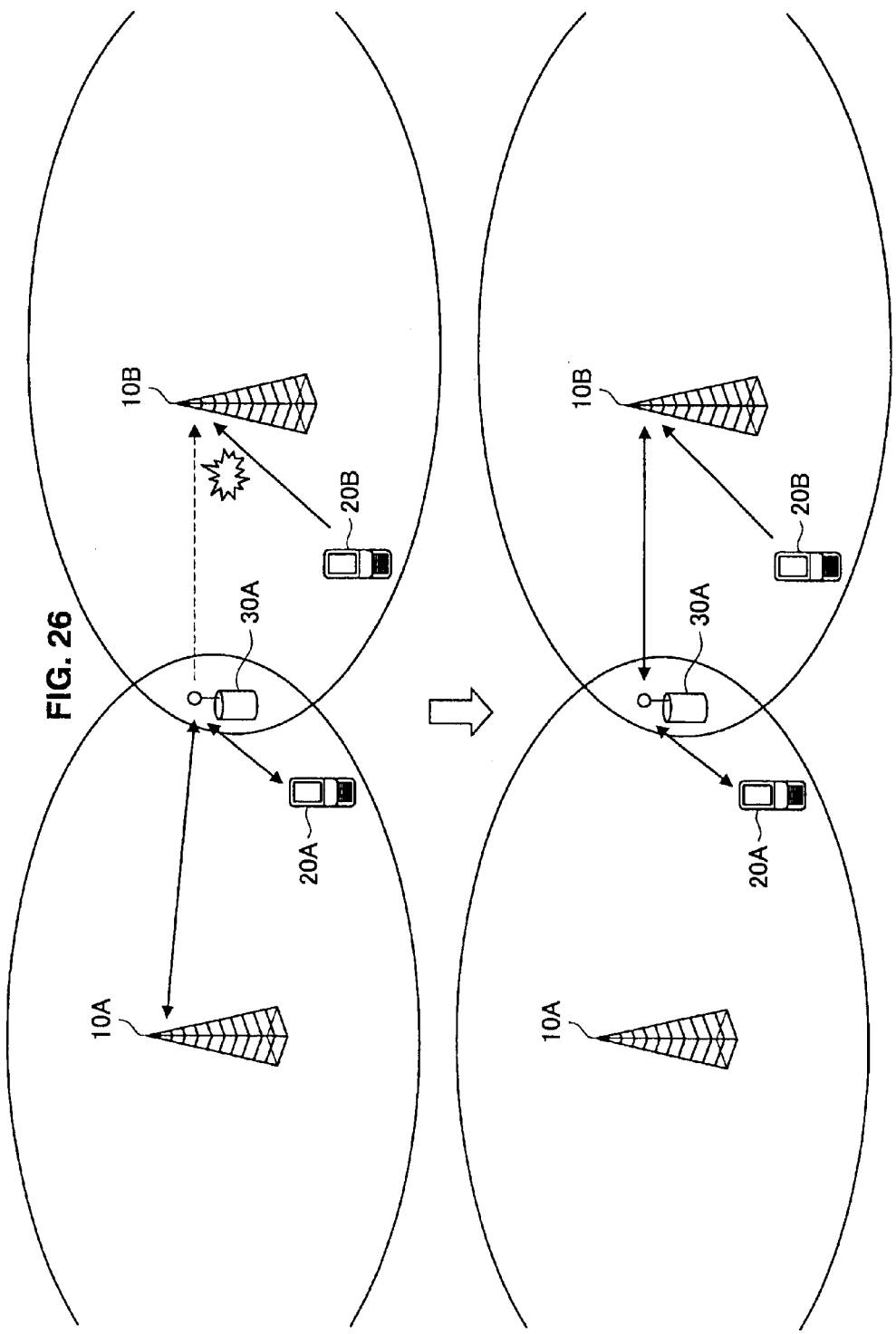
FIG. 26 is an explanatory diagram showing a specific example of handover of a relay device.

FIG. 26 is an explanatory diagram showing a specific example of handover of the relay device 30. In the example shown in the upper view of FIG. 26, the relay device 30A belongs to the base station 10A, the communication terminal 20A belongs to the relay device 30A, and the communication terminal 20B belongs to the base station 10B. Note that the relay device 30A can grasp the cell structure shown in the upper view of FIG. 26 on the basis of the location-related information supplied from the management server 16.

In the example shown in the upper view of FIG. 26, there are cases in which, when the communication terminal 20B transmits a signal to the base station 10B through the direct link UL at the same time as when the relay device 30A transmits a signal to the base station 10A through the relay link UL, both the signals may interfere with each other at the base station 10B. Herein, the control unit 342 of the relay device 30A can refer to the scheduling information of the base station 10B supplied from the management server 16, and execute the handover of the relay device 30A to the base station 10B if the base station 10B has extra available resources for accepting the handover.

Accordingly, as shown in the lower view of FIG. 26, the relay device 30A is connected to the base station 10B, and thus belongs to the base station 10B. When the relay device 30A belongs to the base station 10B, the base station 10B performs scheduling so that the communication terminal 20B and the relay device 30A will not interfere with each other. Thus, it is possible to avoid mutual interference between a signal transmitted from the relay device 30A and a signal transmitted from the communication terminal 20B.

Note that handover of the relay device 30A can be executed on the basis of the measurement information reported from the communication terminal 20A. Hereinafter, a variation of the connection procedures of the communication terminal 20A and the relay device 30A will be described first, and then, handover procedures will be described.

Figure 27:
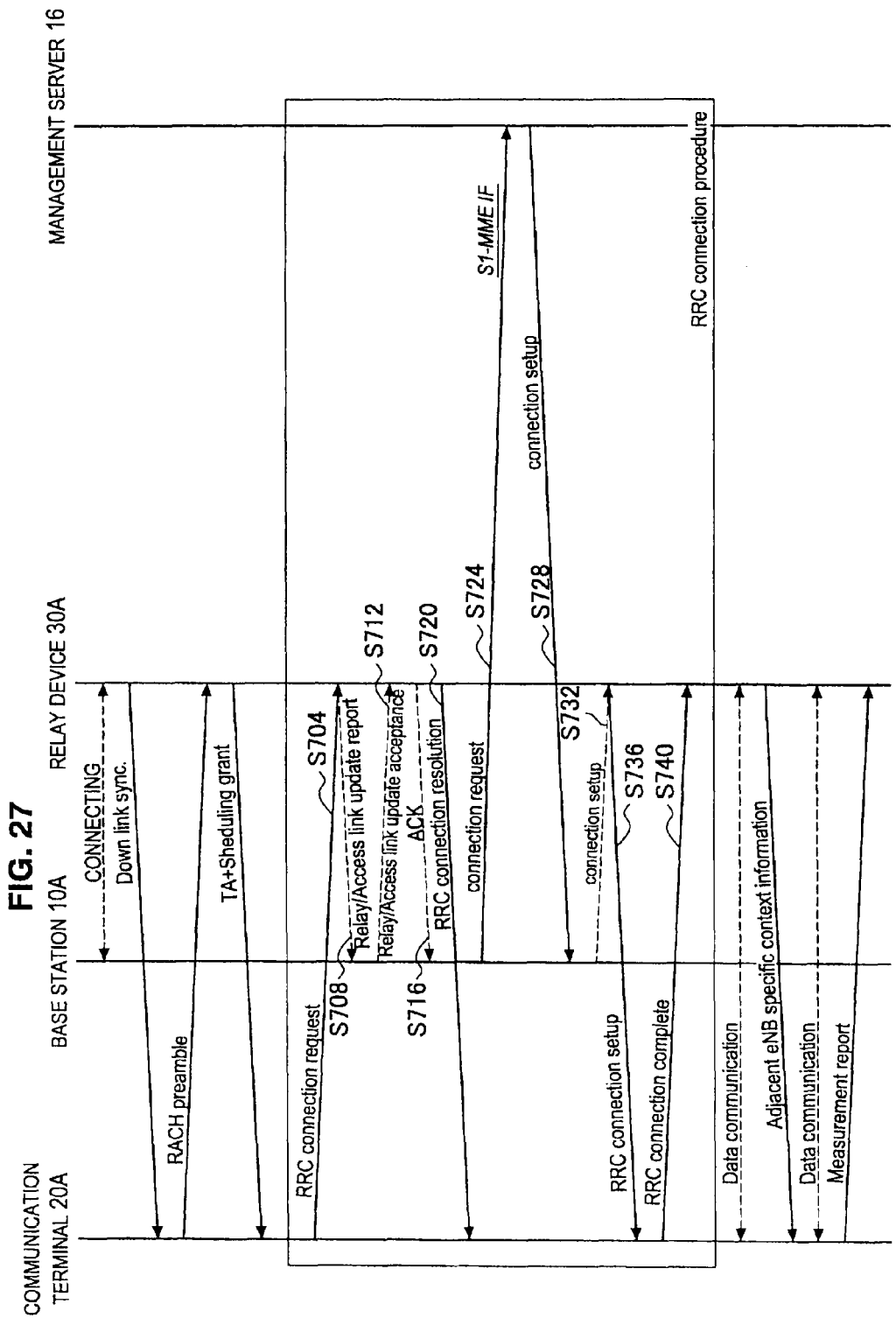
FIG. 27 is a sequence diagram showing a variation of the connection procedures of a communication terminal and a relay device.

FIG. 27 is a sequence diagram showing a variation of the connection procedures of the communication terminal 20A and the relay device 30A. The communication terminal 20A transmits an RRC connection request to the relay device 30A using resources allocated by the relay device 30A (S704). The relay device 30A, upon receiving the RRC connection request from the communication terminal 20A, requests the base station 10A to allocate resources for the relay link and the access link (S708). If the base station 10A is able to allocate the resources requested from the relay device 30A, the base station 10A transmits to the relay device 30A information to the effect that the allocation is possible as well as the resources to be allocated (S712).

Next, after the relay device 30A has transmitted ACK to the base station 10A (S716), the relay device 30A transmits an RRC connection resolution indicating the source of transmission of the RRC connection request (S720). Then, the base station 10A transmits to the management server 16 a connection request indicating that the communication terminal 20A is requesting a service (S724). The management server 16, upon receiving the connection request, transmits information for performing setup on the communication terminal 20 through connection setup (S728).

Then, the base station 10 transfers the connection setup from the management server 16 to the relay device 30A (S732), and the relay device 30A transmits RRC connection setup to the communication terminal 20A (S736), and then the communication terminal 20A performs connection setup. After that, the communication terminal 20A transmits to the relay device 30A RRC connection complete indicating that the connection setup is complete (S740). Accordingly, the communication terminal 20A and the relay device 30A are connected, whereby it becomes possible for the communication terminal 20A to communicate with the base station 10A via the relay device 30A.

Figure 28:
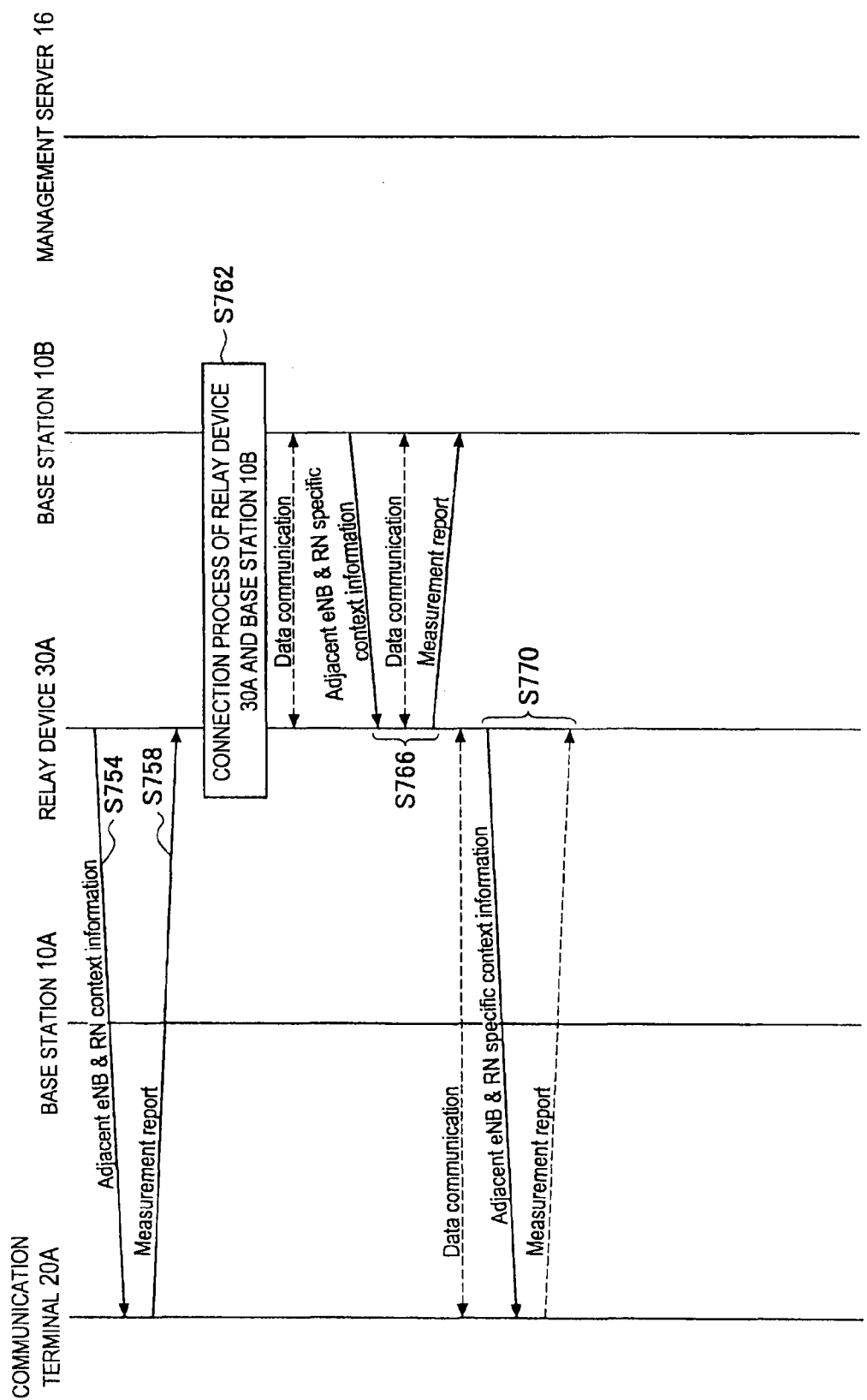
FIG. 28 is a sequence diagram showing the procedures for handing over a relay device.

FIG. 28 is a sequence diagram showing the procedures for handing over the relay device 30A. In the example shown in FIG. 28, the relay device 30A belongs to the base station 10A, and the base station 20A and the relay device 30A are connected. In this case, the relay device 30A transmits to the communication terminal 20A context information (Adjacent eNB & RN context information) indicating the target to be measured such as an adjacent base station, a nearby relay device 30, or the like (S754). After that, the communication terminal 20A measures the radio field intensity or the like of a signal transmitted from the base station 10B or the like in accordance with the context information while at the same time communicating with the relay device 30A. Then, the communication terminal 20A reports the measurement information to the relay device 30A (S758).

Next, if the relay device 30A has determined on the basis of the measurement information received from the communication terminal 20A, information from the management server 16, or the like that handover to the base station 10B would be effectively performed while avoiding interference, the relay device 30A performs a process of connecting to the base station 10B (S762). Herein, while the relay device 30A is performing a connection process, it is difficult for the relay device 30A to relay the communication with the communication terminal 20A. Thus, if the relay device 30A has transmission/reception resources (e.g., a plurality of antennae) with which a plurality of processes can be performed in parallel, it is possible to use some of the transmission/reception resources to communicate with the communication terminal 20A, and use the other of the transmission/reception resources to perform the process of connecting to the base station 10B. Alternatively, the relay device 30A can cause the communication terminal 20A to be directly connected to the base station 10A and, when the process of connecting to the base station 10B is completed, return the communication terminal 20A to a position belonging to the relay device 30A.

After that, the relay device 30A performs measurement on the basis of the context information received from the base station 10B, and transmits the measurement information to the base station 10B (S766). In addition, the relay device 30A transmits context information to the communication terminal 20A and receives measurement information, which has been obtained through measurement by the communication terminal 20A, from the communication terminal 20A (S770).

Meanwhile, as described below, there are also cases in which interference can be avoided by handing over not the relay device 30 but the communication terminal 20.

Figure 29:
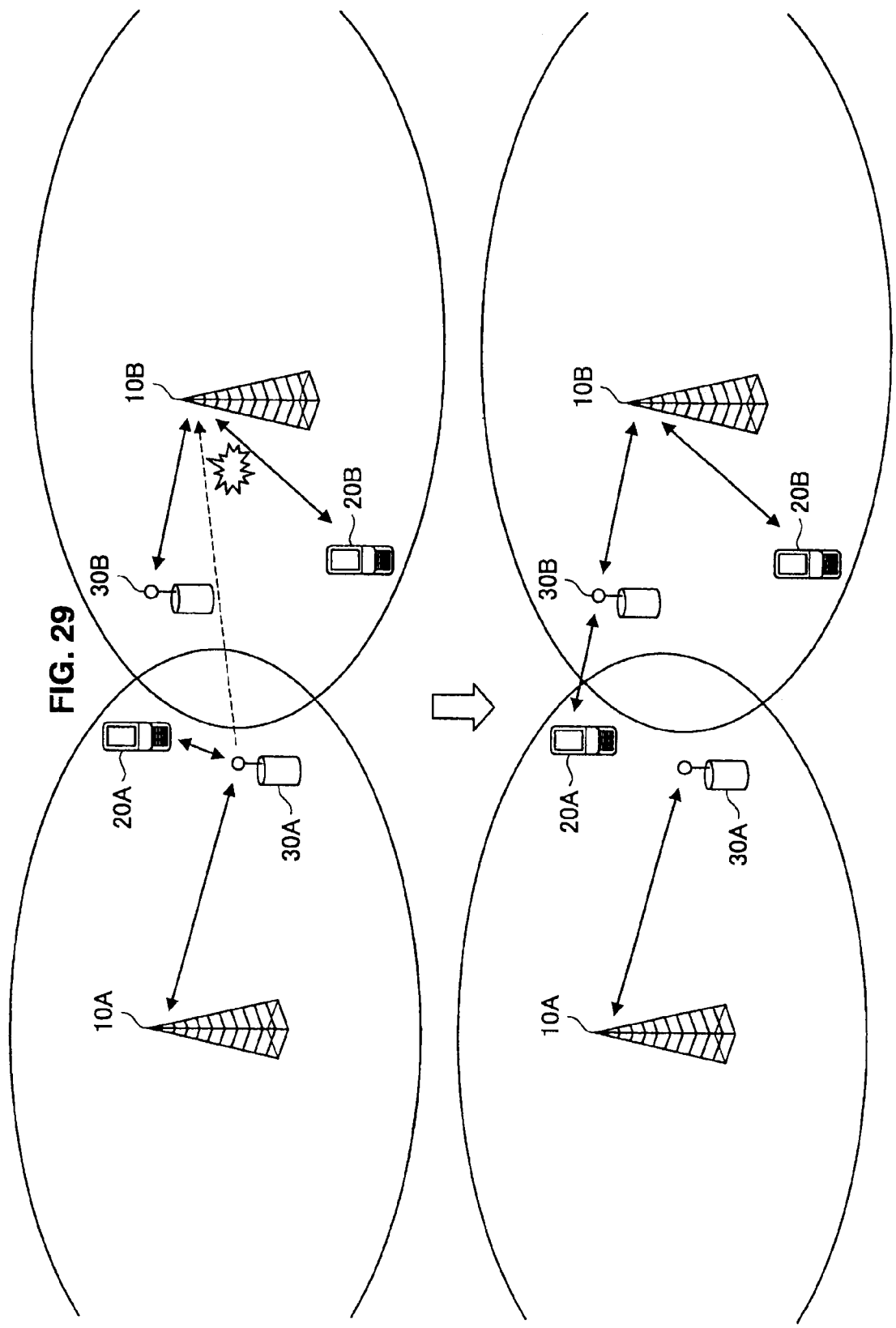
FIG. 29 is an explanatory diagram showing a specific example of handover of a communication terminal.

FIG. 29 is an explanatory diagram showing a specific example of handover of the communication terminal 20. In the example shown in the upper view of FIG. 29, the relay device 30A belongs to the base station 10A, the communication terminal 20A belongs to the relay device 30A, and the relay device 30B and the communication terminal 20B belong to the base station 10B.

In the example shown in the upper view of FIG. 29, there are cases in which, when the communication terminal 20B transmits a signal to the base station 10B via the direct link UL at the same time as when the relay device 30A transmits a signal received from the communication terminal 20A to the base station 10A via the relay link UL, both the signals may interfere with each other at the base station 10B. Herein, the control unit 342 of the relay device 30A can refer to the scheduling information of the base station 10B supplied from the management server 16, and execute the handover of the communication terminal 20A to the base station 10B if the base station 10B has extra available resources for accepting the handover.

Specifically, the relay device 30A can terminate the connection with the communication terminal 20A. This is because it is considered that the communication terminal 20A will attempt connection with the base station 10B thereafter. Alternatively, the relay device 30A can explicitly request for handover of the communication terminal 20A to the base station 10B or the relay device 30B.

As shown in the lower diagram of FIG. 29, when the communication terminal 20A is handed over to the relay device 30B, a signal transmitted from the communication terminal 20A will no more be relayed by the relay device 30A. Thus, interference shown in the upper view of FIG. 20 can be avoided. Note that the relay device 30A can also control the handover of the communication terminal 20 when the number of the communication terminals 20 belonging to the relay device 30A is greater than or equal to a predetermined number (when the number that can be handled is approaching the limit). Alternatively, the relay device 30A can also select as the target to be handed over the communication terminal 20 whose access link CQI does not meet a predetermined standard.

Note that the relay device 30A can also execute the handover on the basis of the measurement information reported from the communication terminal 20A. Hereinafter, the procedures for handing over the communication terminal 20A will be described with reference to FIG. 30.

Figure 30:
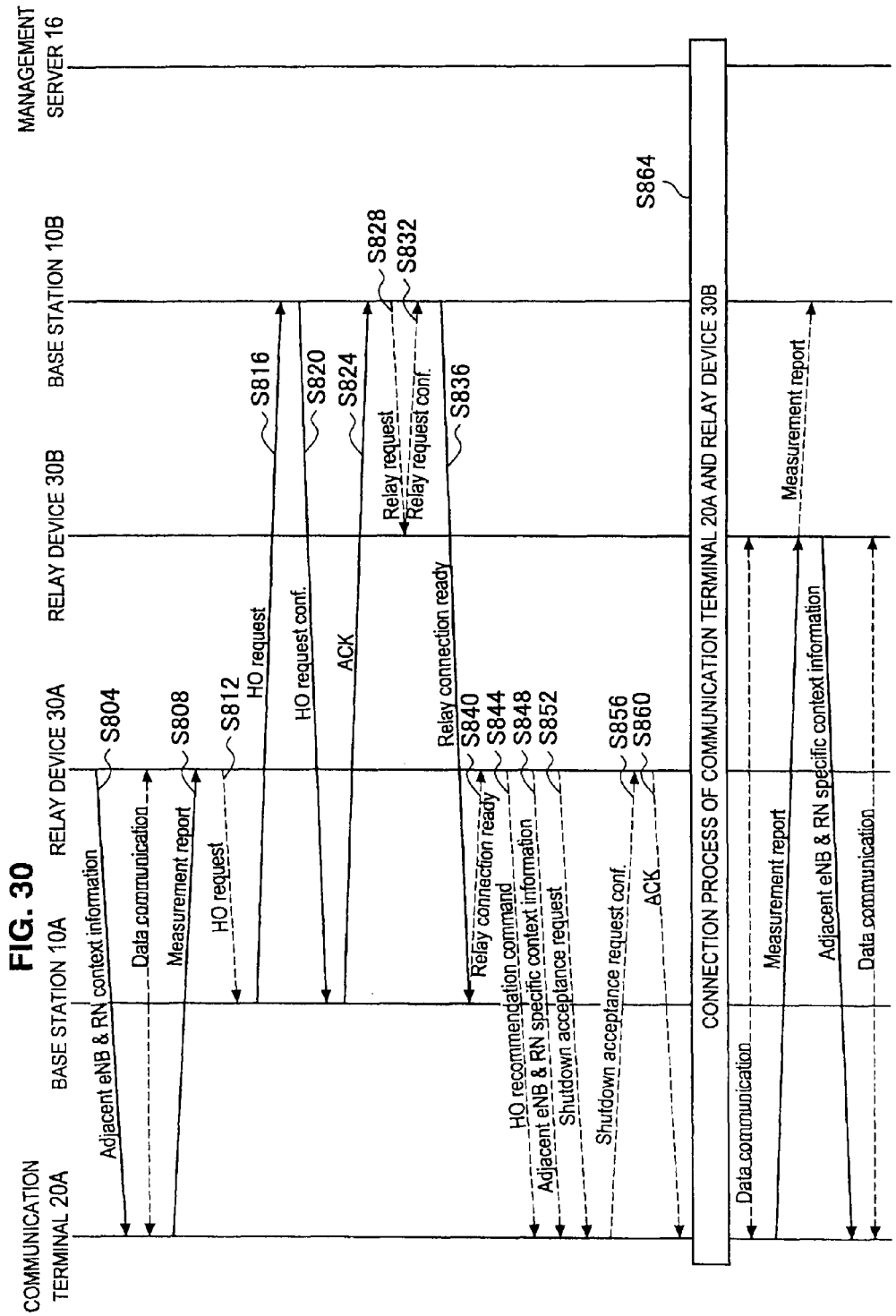
FIG. 30 is a sequence diagram showing the procedures for handing over a communication terminal.

FIG. 30 is a sequence diagram showing the procedures for handing over the communication terminal 20A. In the example shown in FIG. 30, the relay device 30A belongs to the base station 10A, the relay device 30B belongs to the base station 10B, and the communication terminal 20A is connected to the relay device 30A. In this case, the relay device 30A transmits to the communication terminal 20A context information indicating the target to be measured such as an adjacent base station, a nearby relay device 30, and the like (S804). After that, the communication terminal 20A measures the radio field intensity or the like of a signal transmitted from the base station 10B, the relay device 30B, or the like in accordance with the context information while at the same time communicating with the relay device 30A. Then, the communication terminal 20A reports the measurement information to the relay device 30A (S808).

Next, it is assumed that the relay device 30A has determined on the basis of the measurement information received from the communication terminal 20A, information from the management server 16, or the like that handover of the communication terminal 20A to the relay device 30B would be effectively performed while avoiding interference. In this case, the relay device 30A requests for handover of the communication terminal 20A to the relay device 30B to the base station 10B via the base station 10A (S812, S816). Then, the base station 10B transmits to the base station 10A a confirmation in response to the handover request (S820), and receives ACK from the base station 10A (S824).

Then, the base station 10B inquires of the relay device 30B if it is able to accept the handover (S828). Then, if the relay device 30B is able to accept the communication terminal 20A (S832), the base station 10B informs the relay device 30A that the relay device 30B is able to accept the handover, via the base station 10A (S836, S840).

Then, the relay device 30A transmits context information and a signal recommending the handover to the relay device 30B (S844, S848). Further, the relay device 30A requests the communication terminal 20A to cancel the connection with the relay device 30A (S852), and, upon receiving a confirmation in response to the connection cancelation from the communication terminal 20A (S856), returns ACK to the communication terminal 20A (S860). Accordingly, the connection between the communication terminal 20A and the relay device 30A is cancelled, and the communication terminal 20A performs a process of connecting to the relay device 30B that is the recommended handover destination (S864).

Although the description has been made above of an example in which both the recommendation of the handover to the relay device 30B and requesting for cancellation of the connection with the relay device 30A are performed, one or both of them need not be performed. For example, the relay device 30A can forcibly cancel the connection with the communication terminal 20B without performing each of the aforementioned processes. In that case, it is expected that the communication terminal 20B voluntarily performs a process of connecting to the base station 10 or the relay device 30 included in the context information.

In addition, although the description has been made above of an example in which the communication terminal 20A is handed over to the relay device 30B belonging to a different base station, the communication terminal 20A can also be handed over to the relay device 30X belonging to the same base station 10A as described below.

Figure 31:
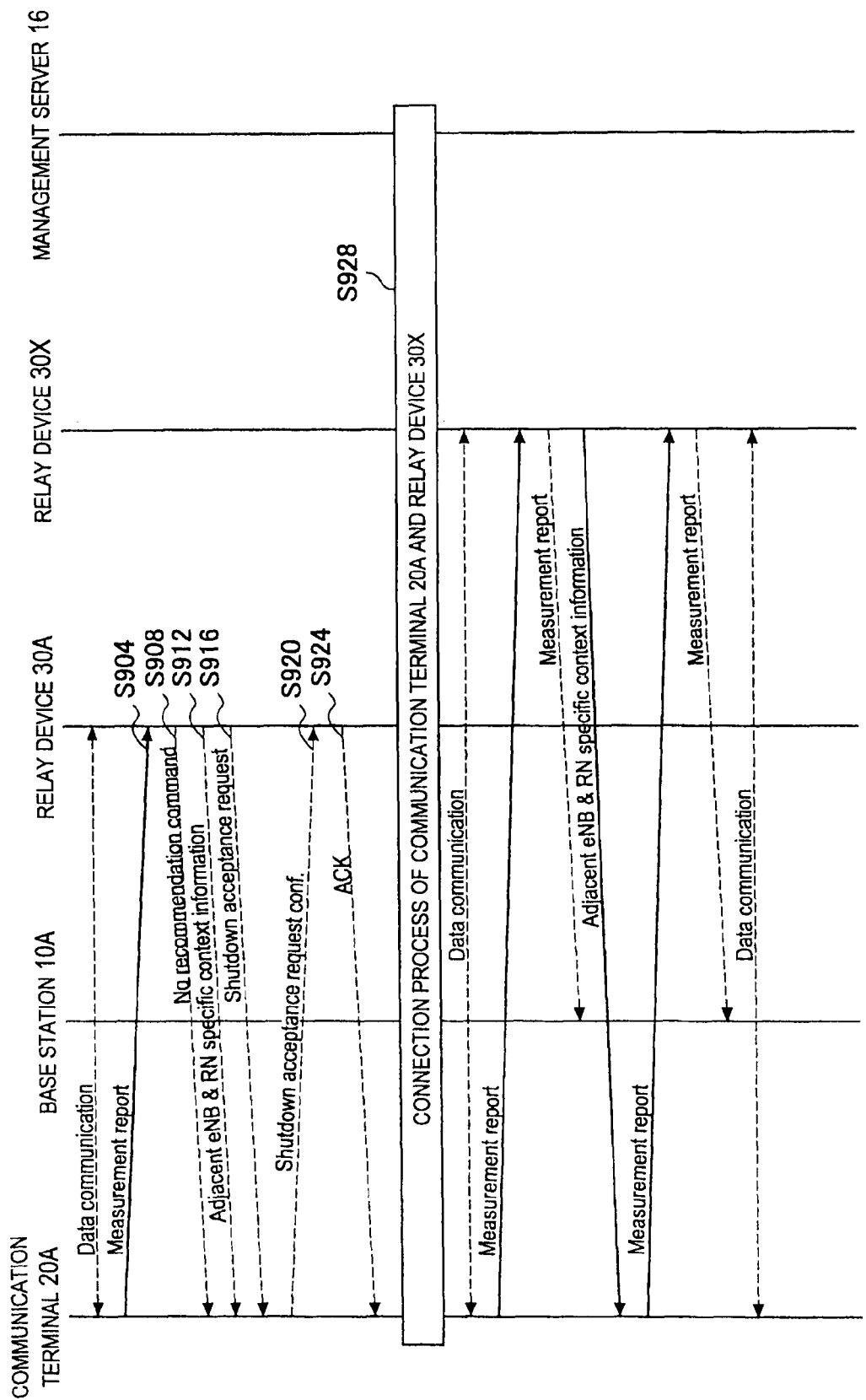
FIG. 31 is a sequence diagram showing the procedures for handing over a communication terminal.

FIG. 31 is a sequence diagram showing the procedures for handing over the communication terminal 20A. In the example shown in FIG. 31, the relay device 30A and the relay device 30X belong to the base station 10A, and the communication terminal 20A is connected to the relay device 30A. The relay device 30A receives measurement information from the communication terminal 20A (S904), and determines the interference avoidance control for the communication of the communication terminal 20A, on the basis of the measurement information, information supplied from the management server 16, or the like. Herein, if the relay device 30A has determined that handover of the communication terminal 20A to the relay device 30X would be effectively performed while avoiding interference, the relay device 30A transmits context information and a signal recommending the handover to the relay device 30X (S908, S912).

Further, when the relay device 30A requests the communication terminal 20A to cancel the communication with the relay device 30A (S916) and receives a confirmation in response to the connection cancellation from the communication terminal 20A (S920), the relay device 30A returns ACK to the communication terminal 20A (S924). Accordingly, the connection between the communication terminal 20A and the relay device 30A is cancelled, and the communication terminal 20A performs a process of connecting to the relay device 30X that is the recommended handover destination (S928).

As described above, the relay device 30 can avoid interference by executing handover to the adjacent base station 10 or by handing over the communication terminal 20 belonging to the relay device 30 to another relay device 30.

(Interference Avoidance Control: Link Adaptation)

There are cases in which the relay device 30 can avoid interference by performing link adaptation when it is informed by the management server 16 of a slot that has a possibility of generating interference, or of the ID, location-related information, and permissible interference level of the relay device 30, the communication terminal 20, or the base station 10 to interfere with or to be interfered with. Examples of the link adaptation for the access link that can be controlled by the relay device 30 include TPC, AMC (Advanced Modulation Control), and HARQ. Hereinafter, each link adaptation will be specifically described.

The relay device 30, when instructed by the management server 16 or the like to suppress the level of interference to another communication, or when having determined that the level of interference to another communication should be suppressed, executes any of the following link adaptation.

(1) Lower the transmission power, and improve the reception SNIR using HARQ.

(2) Lower the transmission power, and lower the necessary SNIR by lowering the Modulation and Coding rate.

The relay device 30 needs additional resources when either of (1) or (2) above is executed. Thus, the relay device 30, when allocated extra resources in advance from the base station 10, uses the extra resources, and when running short of extra resources, requests the base station 10 or the management server 16 to allocate resources. Note that the base station 10 or the management server 16, when requested to allocate resources to avoid interference, prioritizes the resource allocation over other requests.

Meanwhile, when the relay device 30 performs communication even through the level of interference from another communication is high, the relay device 30 executes any of the following link adaptation.

(3) Increase the transmission power.

(4) Improve the reception SNIR using HARQ.

(5) Lower the necessary SN IR by lowering the Modulation and Coding rate.

In order to execute (4) and (5) above, additional resources are needed. Thus, the relay device 30, when allocated extra resources in advance from the base station 10, uses the extra resources, and when running short of extra resources, requests the base station 10 or the management server 16 to allocate resources. Note that the base station 10 or the management server 16, when requested to allocate resources to avoid interference, prioritizes the resource allocation over other requests.

In OFDMA, link adaptation can be performed in units of resource blocks or sub-carriers. Thus, the relay device 30 can execute the link adaptation shown in (1) to (5) above to only the sub-carrier or resource block whose interference level is above a predetermined level. Specifically, the relay device 30 can, when transmitting a signal using a resource block A whose level of interference from another communication is above the predetermined level and a resource block B whose level of interference from another communication is below the predetermined level, execute any of (3) to (5) above only to the resource block A.

<5. Other Examples of Application of the Present Invention>

The description has been made above of selecting the control range granted for the relay device 30 from among a plurality types of control range, implementing centralized control with the management server 16 for avoiding interference between cells formed by the base stations 10, and executing interference avoidance control with the relay device 30 by autonomously determining the interference avoidance control. However, the aforementioned relay device 30 is merely an example of a small-to-medium-sized base station in a heterogeneous network described below.

That is, the following also fall within the technical scope of the present invention: selecting the control range granted for a small-to-medium-sized base station from among a plurality of types of control range, implementing centralized control with the management server 16 for avoiding interference between cells formed by the base stations 10 or small-to-medium-sized base stations, and executing interference avoidance control with a small-to-medium-sized base station by autonomously determining the interference avoidance control.

A heterogeneous network is a network in which a plurality of types of small-to-medium-sized base stations coexists within a macrocell by performing overlay transmission or spectrum sharing. Examples of small-to-medium-sized base stations include an RRH (Remote RadioHeaD) cell base station, a hot zone base station (Pico/micro cell eNB), a femtocell base station (Home eNB), and a relay device (relay base station). Hereinafter, the configuration of the heterogeneous network will be specifically described.

Figure 32:
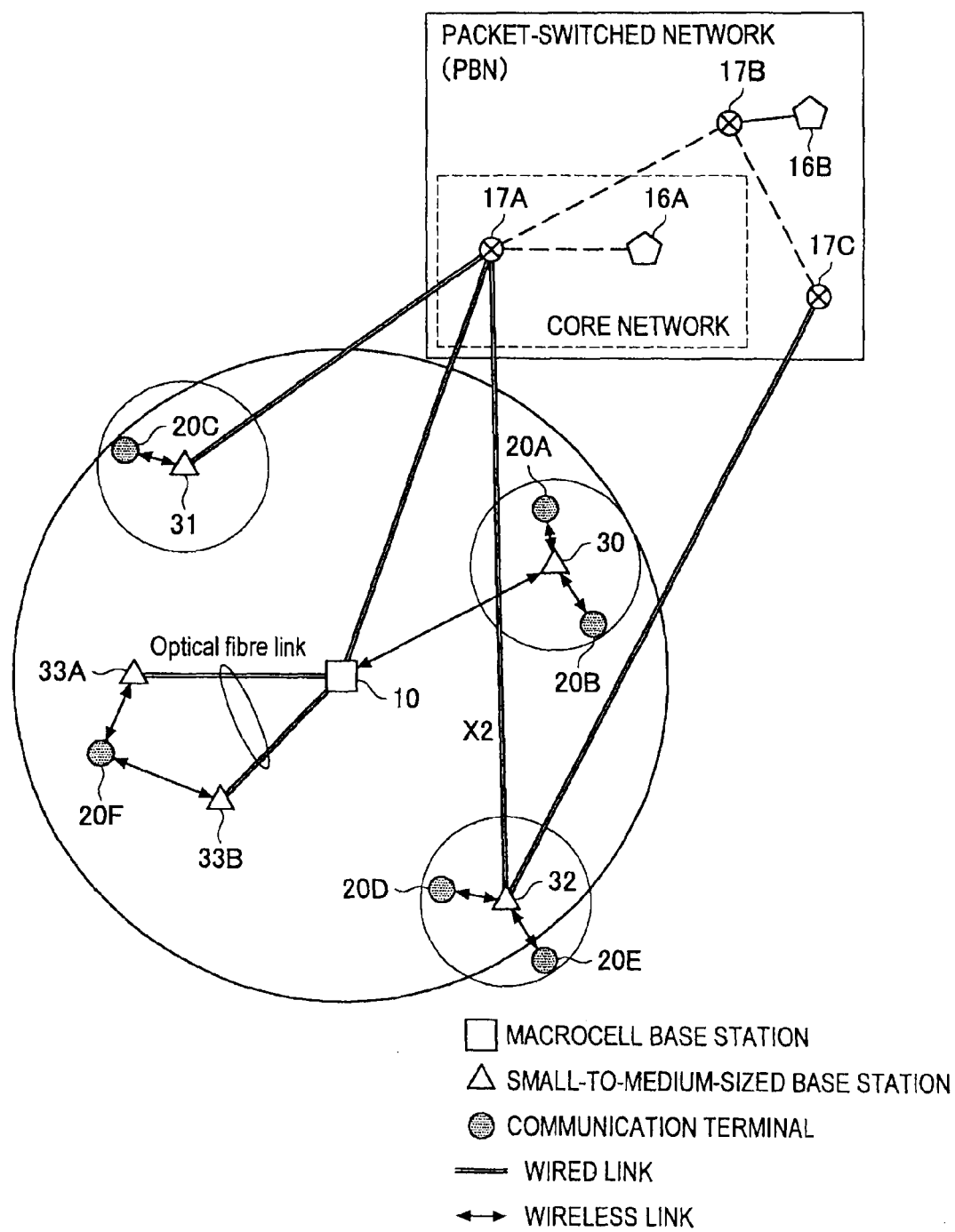
FIG. 32 is an explanatory diagram showing a configuration example of a heterogeneous network.

FIG. 32 is an explanatory diagram showing a configuration example of a heterogeneous network. As shown in FIG. 32, the heterogeneous network includes a macrocell base station 10 (which is synonymous with the base station 10), a relay device 30, a hot zone base station 31, a femtocell base station 32, an RRH cell base station 33, and management servers 16A and 16B.

The management servers 16A and 16B have functions with which the macrocell base station 10 and the small-to-medium-sized base stations operate cooperatively. For example, as described in "3. Control Range A: Centralized Control by the Management Server," the management server 16A receives information about the macrocell base station 10, the small-to-medium-sized base stations, and the communication terminals 20 belonging to the small-to-medium-sized base stations (positional information, scheduling information, Qos information, and the like), and determines the macrocell base station 10 or the small-to-medium-sized base station that controls the communication interfering with another communication, and further issues an instruction to execute an interference avoidance operation. Note that the function of the management server 16 can also be implemented by the macrocell base station 10 or the small-to-medium-sized base stations.

The macrocell base station 10 manages the small-to-medium-sized base stations and the communication terminals 20 within the macrocell. For example, as described in "2-3. Configuration of the Base Station," the macrocell base station 10 selects the control range granted for each small-to-medium-sized base station from among the control range A, the control range B, and the control range C. Then, each small-to-medium-sized base station controls the communication with the communication terminal 20 in accordance with the control range selected by the macrocell base station 10.

The hot zone base station 31 (a picocell base station or a microcell base station) has a lower maximum transmission power than the macrocell base station 10, and communicates with the macrocell base station 10 using an interface such as X2 or S1 of a core network. Note that the hot zone base station 31 forms an OSG (Open Subscriber Group) that is accessible from any communication terminal 20.

The femtocell base station 32 has a lower maximum transmission power than the macrocell base station 10, and communicates with the macrocell base station 10 using a packet-switched network such as ADSL. Further, the femtocell base station 32 can also communicate with the macrocell base station 10 through a wireless link. Note that the femtocell base station 32 forms a CSG (Closed Subscriber Group) that is accessible from only the limited communication terminals 20.

The RRH cell base station 33 is connected to the macrocell base station 10 through an optical fiber. Therefore, the macrocell base station 10 can transmit signals to the RRH cell base stations 33A and 33B arranged in different geographical locations via optical fibers, and can cause the RRH cell base stations 33A and 33B to wirelessly transmit signals. For example, the macrocell base station 10 can use only the RRH cell base station 33 located near the communication terminal 20. Note that the function of the control system is implemented by the macrocell base station 10, and an optimum transmission form is selected in accordance with the distribution of the communication terminals 20.

FIG. 33 shows the outline of each small-to-medium-sized base station described above. The small-to-medium-sized base station such as the hot zone base station 31 or the femtocell base station 32 can autonomously determine the interference avoidance control and execute the determined interference avoidance control in accordance with the method described in "4. Control Ranges B and C: Autonomous Control by the Relay Device." Hereinafter, an interference model in a heterogeneous network and interference avoidance control will be described.

(Interference Model in Heterogeneous Network)

Figure 34:
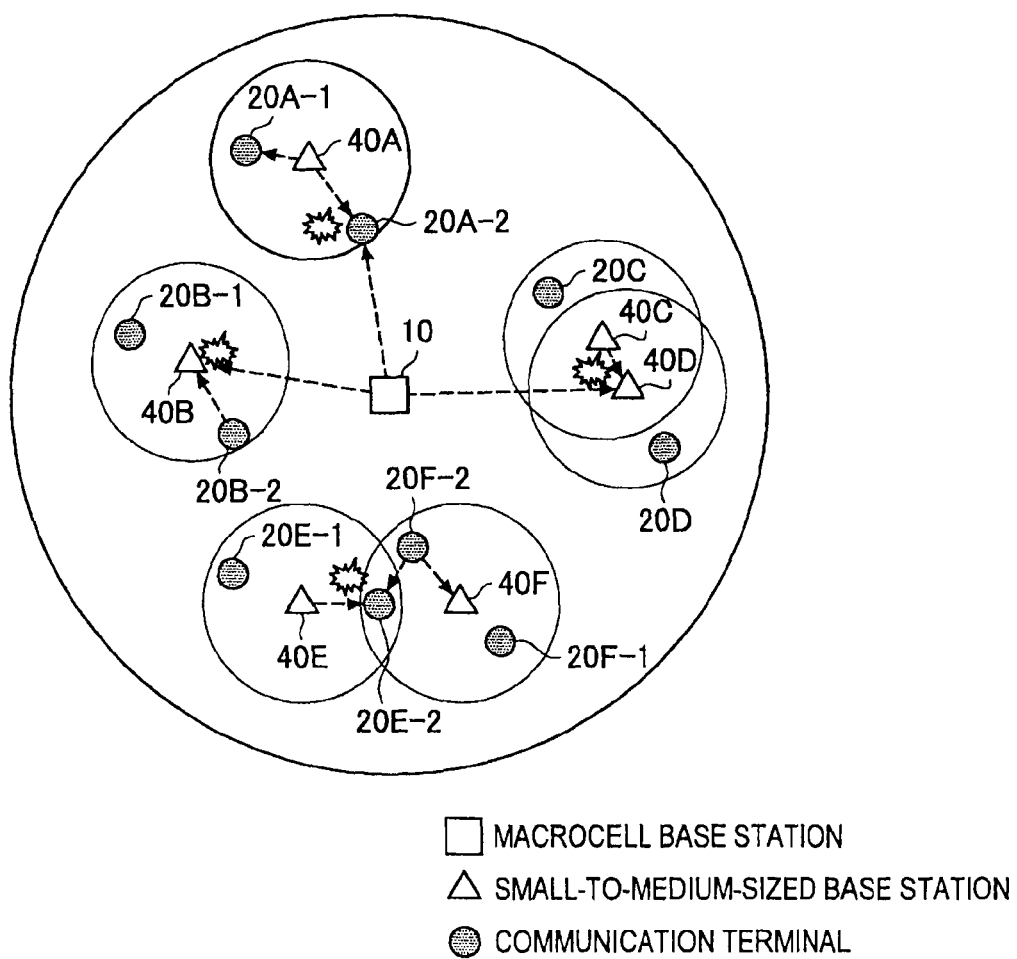
FIG. 34 is an explanatory diagram showing an interference model in a heterogeneous network.

FIG. 34 is an explanatory diagram showing an interference model in a heterogeneous network. Note that in FIG. 34 and FIGS. 35 to 37 described below, the relay device 30, the hot zone base station 31, the femtocell base station 32, and the like are not particularly distinguished from each other, and are collectively shown as small-to-medium-sized base stations 40.

As shown in FIG. 34, in a heterogeneous network, it is supposed that interference as shown below will be generated.

(1) A case in which a signal transmitted from a small-to-medium-sized base station 40A and a signal transmitted from the macrocell base station 10 interfere with each other at a communication terminal 20A-2

(2) A case in which a signal transmitted from a communication terminal 20B-2 and a signal transmitted from the macrocell base station 10 interfere with each other at a small-to-medium-sized base station 40B.

(3) A case in which a signal transmitted from a small-to-medium-sized base station 40C and a signal transmitted from the macrocell base station 10 interfere with each other at a small-to-medium-sized base station 40D.

(4) A case in which a signal transmitted from a small-to-medium-sized base station 40E and a signal transmitted from a communication terminal 20E-2 interfere with each other at a communication terminal 20E-2.

(Interference Avoidance Control in Heterogeneous Network)

As described above, various types of interference are generated in the heterogeneous network. However, such interference can be addressed by performing the interference avoidance control described in "3. Control Range A: Centralized Control by the Management Server" or "4. Control Ranges B and C: Autonomous Control by the Relay Device." Hereinafter, an example of the interference avoidance control will be specifically described.

Figure 35:
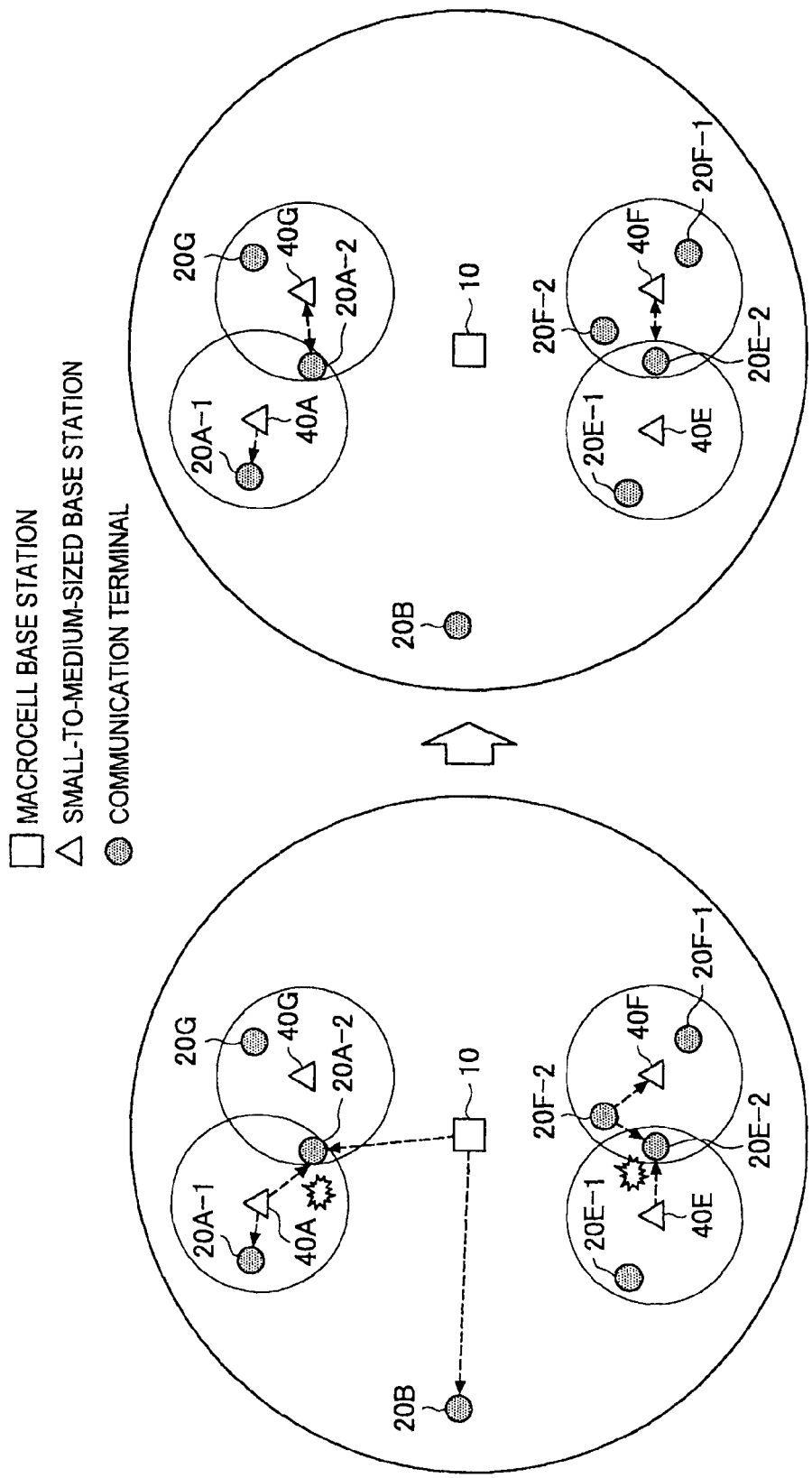
FIG. 35 is an explanatory diagram showing exemplary interference avoidance performed through handover.

FIG. 35 is an explanatory diagram showing exemplary interference avoidance performed through handover. In the left view of FIG. 35, a signal transmitted from the small-to-medium-sized base station 40A and a signal transmitted from the macrocell base station 10 interfere with each other at the communication terminal 20A-2. In this case, the interference can be eliminated by handing over the communication terminal 20A-2 from the small-to-medium-sized base station 40A to the small-to-medium-sized base station 40G whose transmission timing differs from that of the macrocell base station 10.

In addition, in the left view of FIG. 35, a signal transmitted from the small-to-medium-sized base station 40E and a signal transmitted from the communication terminal 20E-2 interfere with each other at the communication terminal 20E-2. In this case, the interference can be eliminated by handing over the communication terminal 20E-2 from the small-to-medium-sized base station 40E to the small-to-medium-sized base station 40F.

Note that handover between the small-to-medium-sized base stations 40 can be performed in accordance with the sequence of handover of a relay device 30 to another relay device 30 belonging to the same base station 10 described with reference to FIG. 19, for example. Meanwhile, handover between the small-to-medium-sized base stations 40 belonging to different macrocell base stations 10 can be performed in accordance with the sequence of handover described with reference to FIG. 20, for example. Herein, there are also cases in which the small-to-medium-sized base station 40 has an interface for communicating directly with the management server 16. However, as the small-to-medium-sized base station 40 is under the management of the macrocell base station 10, the small-to-medium-sized base station 40 communicates with the macrocell base station 10 for performing handover as shown in FIG. 19 and the like.

However, an interface between the macrocell base station 10 and the small-to-medium-sized base station 40 differs according to the type of the small-to-medium-sized base station 40. For example, when the small-to-medium-sized base station 40 is the hot zone base station 31, the small-to-medium-sized base station 40 and the macrocell base station 10 communicate with each other using an X2 interface. Alternatively, when an interface between the small-to-medium-sized base station 40 and the macrocell base station 10 is a wired interface, it is possible to use latency as the criteria for determining the quality of the communication link.

Figure 36:
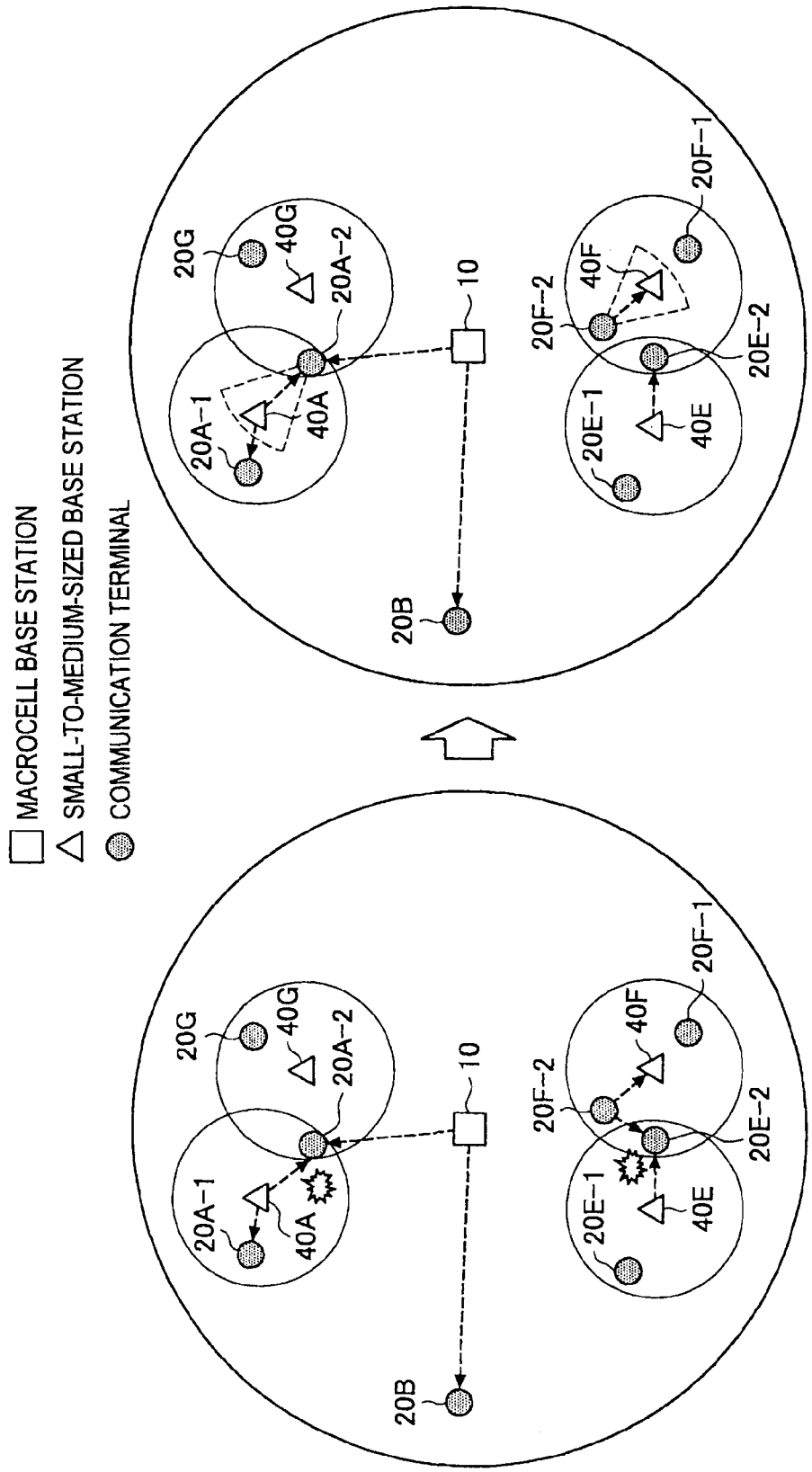
FIG. 36 is an explanatory diagram showing exemplary interference avoidance performed through beam forming.

FIG. 36 is an explanatory diagram showing exemplary interference avoidance performed through beam forming. In the left view of FIG. 36, a signal transmitted from the small-to-medium-sized base station 40A and a signal transmitted from the macrocell base station 10 interfere with each other at the communication terminal 20A-2. In this case, the communication terminal 20A-2 can eliminate the interference by making its reception directivity face the direction in which the small-to-medium-sized base station 40A is arranged.

In addition, in the left view of FIG. 36, a signal transmitted from the small-to-medium-sized base station 40 and a signal transmitted from the communication terminal 20E-2 interfere with each other at the communication terminal 20E-2. In this case, if the communication terminal 20E-2 makes its transmission directivity face the direction in which the small-to-medium-sized base station 40F is arranged, the signal transmitted from the communication terminal 20E-2 will no more reach the communication terminal 20E, whereby the interference can be eliminated.

Figure 37:
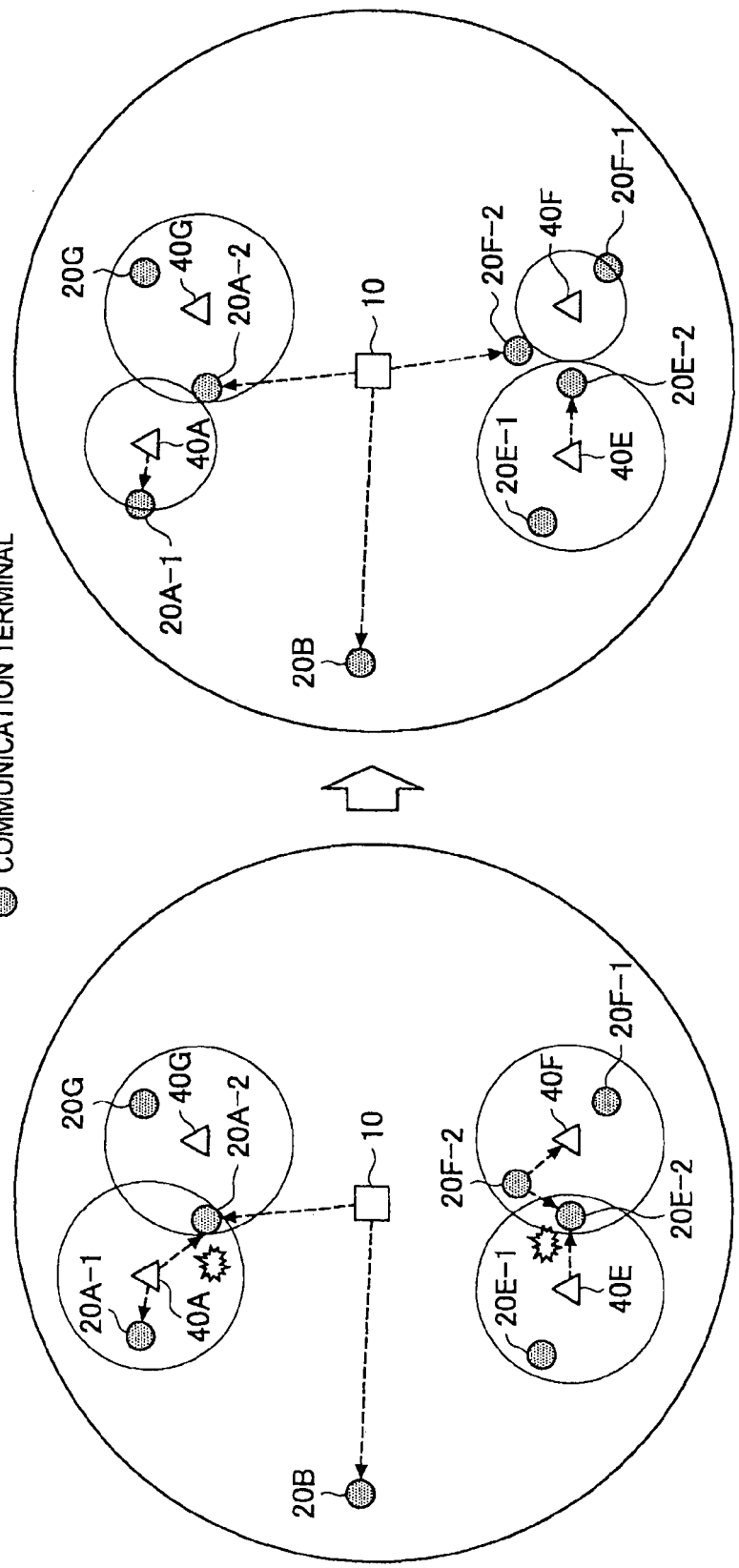
FIG. 37 is an explanatory diagram showing exemplary interference avoidance performed through transmission power control.

FIG. 37 is an explanatory diagram showing exemplary interference avoidance performed through transmission power control. In the left view of FIG. 37, a signal transmitted from the small-to-medium-sized base station 40A and a signal transmitted from the macrocell base station 10 interfere with each other at the communication terminal 20A-2. In this case, if the transmission power of the small-to-medium-sized base station 40A is lowered, the communication terminal 20A-2 will be out of the radio wave coverage of the small-to-medium-sized base station 40A. Thus, the connection between the communication terminal 20A-2 and the small-to-medium-sized base station 40A terminates. Accordingly, the communication terminal 20A-2 searches for a new target to connect to, and is then connected to the macrocell base station 10, for example. Thus, lowering the transmission power of the small-to-medium-sized base station 40A allows the interference to be eliminated.

In addition, in the left view of FIG. 37, a signal transmitted from the small-to-medium-sized base station 40 and a signal transmitted from the communication terminal 20E-2 interfere with each other at the communication terminal 20E-2. In this case, if the transmission power of the small-to-medium-sized base station 40F is lowered, the communication terminal 20E-2 will be out of the radio wave coverage of the small-to-medium-sized base station 40F. Thus, the connection between the communication terminal 20E-2 and the small-to-medium-sized base station 40F terminates. Accordingly, the communication terminal 20E-2 searches for a new target to connect to, and is then connected to the macrocell base station 10, for example. Thus, lowering the transmission power of the small-to-medium-sized base station 40F allows the interference to be eliminated.

<6. Conclusion>

As described above, according to the present embodiment, the control range granted for a small-to-medium-sized base station such as the relay device 30 can be selected from among a plurality of types of control range. In addition, according to the present embodiment, the management server 16 can implement centralized control for avoiding interference that would occur between cells formed by the base stations 10. Further, according to the present embodiment, a small-to-medium-sized base station such as the relay device 30 can autonomously determine the interference avoidance control and execute the interference avoidance control.

Although the preferred embodiments of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

For example, although an example in which the control range granted for the relay device 30 is dynamically selected is described above, the control range granted for the relay device 30 can be fixed. Thus, when the control range A is fixedly set on the relay device 30, interference avoidance control is performed in accordance with the procedures described in "3. Control Range A: Centralized Control by the Management Server." Meanwhile, when the control range B or C is fixedly set on the relay device 30, interference avoidance control is performed in accordance with the procedures described in "4. Control Ranges B and C: Autonomous Control by the Relay Device."

The steps in the process of the communication system 1 in this specification need not necessarily be processed in a time-series order in accordance with the order described in the sequence diagram. For example, the steps in the process of the communication system 1 can be performed in an order different from that described in the sequence diagram, or be processed in parallel.

It is also possible to create a computer program for causing built-in hardware in the base station 10, the management server 16, and the relay device 30, such as a CPU, ROM, and RAM, to exert a function that is equivalent to each of the aforementioned configurations of the base station 10, the management server 16, and the relay device 30. In addition, a storage medium having the computer program stored therein is also provided.

The invention claimed is:

1. A communication system comprising:
a relay device that relays communication between a base station and a communication terminal; and
a management server, the management server including
a receiving unit that receives from each base station information about a communication terminal belonging to the base station and about the relay device, and
a determination unit that determines, on the basis of the information received from each base station by the receiving unit, a relay device that is performing communication interfering with communication in an adjacent cell, wherein
when the relay device is determined as a relay device that is performing communication interfering with the communication in the adjacent cell, the relay device determines an interference avoidance control and executes the determined interference avoidance control.

2. The communication system according to claim 1, wherein the relay device determines as the interference avoidance control a handover to a base station that forms the adjacent cell.

3. The communication system according to claim 1, wherein the relay device determines as the interference avoidance control a handover of a communication terminal belonging to the relay device to a relay device belonging to the adjacent cell.

4. The communication system according to claim 3, wherein the relay device sets as a target to be handed over a communication terminal whose communication quality does not meet a predetermined criteria among communication terminals belonging to the relay device.

5. The communication system according to claim 4, wherein the relay device executes the handover when the number of the communication terminals belonging to the relay device is greater than or equal to a predetermined number.

6. A relay device comprising:
processing circuitry configured to:
receive from each base station information about a communication terminal belonging to the base station and about the relay device,
wherein a management server determines whether the relay device is performing communication interfering with communication in an adjacent cell on the basis of the information received from each base station;
determine an interference avoidance control when the relay device is performing the communication interfering; and
execute the determined interference avoidance control.

7. A management server comprising:
a receiving unit that receives from each base station information about a communication terminal belonging to the base station and about a relay device that relays communication between the base station and the communication terminal; and
a determination unit that determines, on the basis of the information received from each base station by the receiving unit, a relay device that is performing communication interfering with communication in an adjacent cell, wherein
the relay device, which is determined by the determination unit as a relay device that is performing communication interfering with the communication in the adjacent cell, determines an interference avoidance control and executes the determined interference avoidance control.

8. A communication terminal comprising:
circuitry configured to:
communicate with a base station via a relay device that determines an interference avoidance control, wherein a management server determines whether the relay device is performing communication interfering with the communication in an adjacent cell on the basis of information received from each base station about the communication terminal belonging to the base station and about the relay device, and the relay device executes the determined interference avoidance control when the relay device is performing the communication interfering in the adjacent cell.

9. A communication system comprising:
a small-to-medium-sized base station that communicates with a communication terminal; and
a management server, the management server including
a receiving unit that receives information about a communication terminal belonging to the small-to-medium-sized base station, and
a determination unit that determines, on the basis of the information received by the receiving unit, a small-to-medium-sized base station that is performing communication interfering with another communication, wherein
when the small-to-medium-sized base station is determined by the determination unit as a small-to-medium-sized base station that is performing communication interfering with another communication, the relay device determines an interference avoidance control and executes the determined interference avoidance control.

* * * * *